United States Patent
Kawai et al.

(10) Patent No.: US 10,060,530 B2
(45) Date of Patent: Aug. 28, 2018

(54) INTERNAL COMBUSTION ENGINE AND COVER MEMBER ATTACHMENT STRUCTURE FOR INTERNAL COMBUSTION ENGINE

(71) Applicant: AISIN SEIKI KABUSHIKI KAISHA, Kariya-shi, Aichi-ken (JP)

(72) Inventors: Yoshiyuki Kawai, Nagoya (JP); Yoshiharu Takeda, Kariya (JP); Hirotaka Kurita, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 127 days.

(21) Appl. No.: 15/036,271

(22) PCT Filed: Oct. 21, 2014

(86) PCT No.: PCT/JP2014/077921
§ 371 (c)(1),
(2) Date: May 12, 2016

(87) PCT Pub. No.: WO2015/072292
PCT Pub. Date: May 21, 2015

(65) Prior Publication Data
US 2016/0298766 A1  Oct. 13, 2016

(30) Foreign Application Priority Data

Nov. 13, 2013  (JP) .................................. 2013-234883
Nov. 25, 2013  (JP) .................................. 2013-242955
(Continued)

(51) Int. Cl.
*F16J 15/10*  (2006.01)
*F16J 15/06*  (2006.01)
(Continued)

(52) U.S. Cl.
CPC ........... *F16J 15/106* (2013.01); *F02F 7/0073* (2013.01); *F16J 15/062* (2013.01);
(Continued)

(58) Field of Classification Search
CPC ...... F16J 15/106; F16J 15/062; F16J 15/3268; F02F 7/0073; F02F 2007/0075; F02F 2007/0078
See application file for complete search history.

(56) References Cited

U.S. PATENT DOCUMENTS 5,329,898 A  7/1994  Nelson et al.
5,944,002 A  8/1999  Tracy et al.
(Continued)

FOREIGN PATENT DOCUMENTS

CN  201982201 U  9/2011
JP  57-121734 U  7/1982
(Continued)

OTHER PUBLICATIONS

Office Action dated Jun. 13, 2017, by the Japanese Patent Office in corresponding Japanese Patent Application No. 2013-242955, and a partial English Translation of the Office Action. (7 pages).
(Continued)

*Primary Examiner* — Jacob Amick
*Assistant Examiner* — Charles Brauch
(74) *Attorney, Agent, or Firm* — Buchanan Ingersoll & Rooney PC

(57) ABSTRACT

This internal combustion engine includes an oil seal attached to a crankshaft of an internal combustion engine main body, and a cover member including an oil seal securing portion for securing the oil seal attached to the crankshaft, the cover member including a first main body attachment portion which is arranged in a vicinity of the oil seal securing portion and which is for attaching the cover member to the
(Continued)

internal combustion engine main body by a first fastening member.

17 Claims, 16 Drawing Sheets

(30) Foreign Application Priority Data

Dec. 24, 2013 (JP) .................................. 2013-265157
Dec. 25, 2013 (JP) .................................. 2013-266499

(51) Int. Cl.
*F02F 7/00* (2006.01)
*F16J 15/3268* (2016.01)

(52) U.S. Cl.
CPC ... *F16J 15/3268* (2013.01); *F02F 2007/0075* (2013.01); *F02F 2007/0078* (2013.01)

(56) References Cited

U.S. PATENT DOCUMENTS

| 2006/0042585 | A1* | 3/2006 | Sanada | F16F 15/26 |
| | | | | 123/195 H |
| 2008/0203763 | A1* | 8/2008 | Ito | B60R 21/34 |
| | | | | 296/187.09 |
| 2011/0123316 | A1* | 5/2011 | Roberts | F01D 17/167 |
| | | | | 415/160 |
| 2012/0091665 | A1 | 4/2012 | Okuda et al. | |
| 2014/0137833 | A1 | 5/2014 | Buehler et al. | |

FOREIGN PATENT DOCUMENTS

| JP | H01-279105 A | 11/1989 | |
| JP | H04-124398 U | 11/1992 | |
| JP | 05-71542 U | 9/1993 | |
| JP | 7-055015 A | 3/1995 | |
| JP | 0783069 A | 3/1995 | |
| JP | 09-329246 A | 12/1997 | |
| JP | 2000-046196 A | 2/2000 | |
| JP | 3079856 B2 * | 8/2000 | ............. F02B 75/22 |
| JP | 2001-152966 A | 5/2001 | |
| JP | 2004-100582 A | 4/2004 | |
| JP | 2008190601 A | 8/2008 | |
| JP | 2010-249270 A | 4/2009 | |
| JP | 2010-242896 A | 10/2010 | |
| JP | 2011-052585 A | 3/2011 | |
| JP | 2011231845 A | 11/2011 | |

OTHER PUBLICATIONS

Office Action (First) dated Feb. 22, 2017, by the State Intellectual Property Office of Peoples Republic of China in corresponding Chinese Patent Office Application No. 201480062458.8, and an English translation of the Office Action. (17 pgs).

The extended European Search Report dated Oct. 12, 2016, by the European Patent Office in corresponding European Patent Application No. 14861983.6-1751 (8 pgs).

International Search Report (PCT/ISA/210) dated May 21, 2015, by the Japanese Patent Office as the International Searching Authority for International Application No. PCT/JP2014/ 077921 (five pages).

Written Opinion (PCT/ISA/237) dated May 21, 2015, by the Japanese Patent Office as the International Searching Authority for International Application No. PCT/JP2014/ 077921 (three pages).

Office Action (Notification of Reasons for Refusal) dated Sep. 5, 2017, by the Japanese Patent Office in corresponding Japanese Patent Application No. 2013-265157 and English translation of the Office Action. (8 pages).

\* cited by examiner (First embodiment)

Cross section at line 110-110

Cross section at line 120-120

When deformed (when thermally expanded)

Cross section at line 130-130

FIG. 12
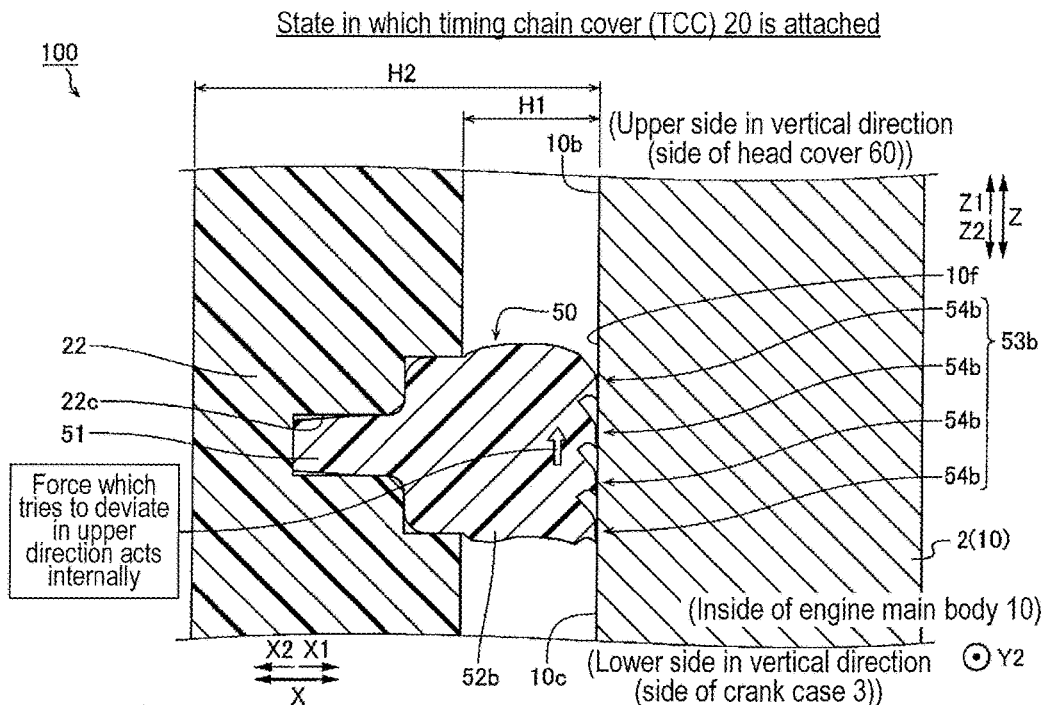
FIG. 13 Action of deviation force in upper and lower direction associated with periodical shape deformation of distal end portion 53b of seal member 50
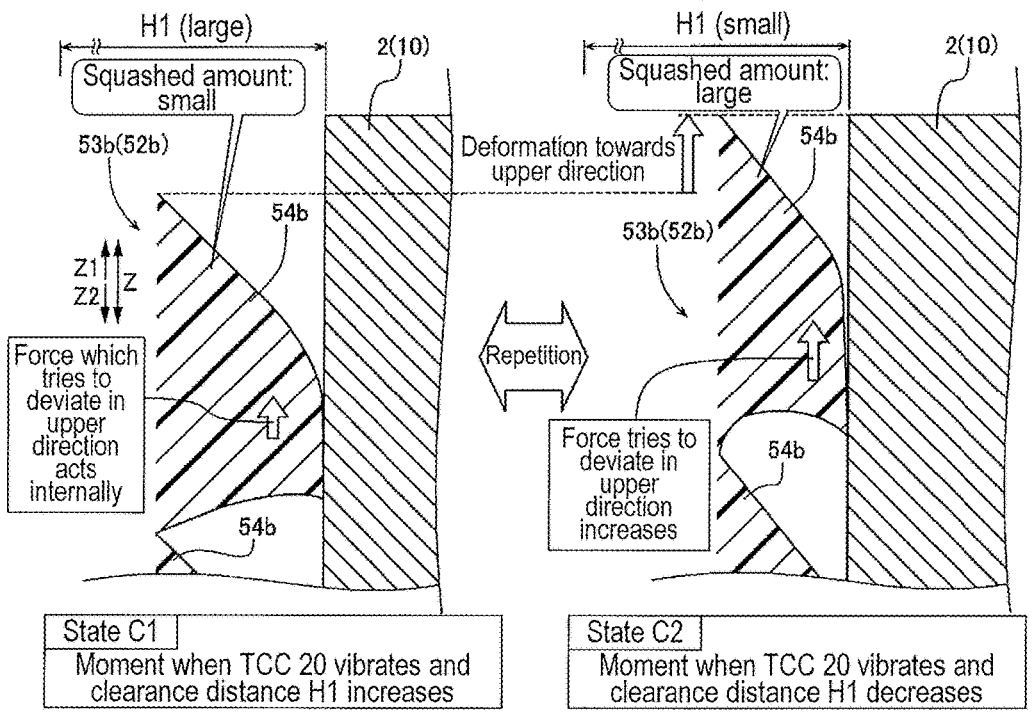

(Variation of first embodiment)

(Second embodiment)

Cross section at line 250-250

Cross section at line 260-260

Cross section at line 280-280

When attaching come-off prevention member

When engagement portion is elastically deformed

When detaching come-off prevention member

First variation

Second variation

INTERNAL COMBUSTION ENGINE AND COVER MEMBER ATTACHMENT STRUCTURE FOR INTERNAL COMBUSTION ENGINE

TECHNICAL FIELD

The present invention relates to an internal combustion engine and a cover member attachment structure for an internal combustion engine.

BACKGROUND ART

Conventionally, a structure including an oil seal securing portion for securing an oil seal attached to a crankshaft is known. Such a structure is disclosed in JP2000-46196A, for example.

In JP2000-46196A, an oil seal come-off prevention apparatus, which includes an oil seal attached to a rotational shaft (a crankshaft), a housing including an opening at which the oil seal attached to the rotational shaft is secured, and a lock ring fitted in an annular groove formed at an inner circumferential surface of the opening and thereby restricting the oil seal from falling off, is disclosed.

DOCUMENT OF PRIOR ART

Patent Document

Patent document 1: JP2000-46196A

OVERVIEW OF INVENTION

Problem to be Solved by Invention

However, in the oil seal come-off prevention apparatus described in JP2000-46196A, in a case where the housing is deformed due to a thermal strain (a strain caused by thermal expansion or thermal shrinkage), it can be considered that the opening of the housing is also deformed in association with the deformation of the housing. At this time, due to the deformation of the opening, a positional deviation occurs also to the oil seal secured at the opening of the housing, therefore there is a problem that a sufficient sealing performance by the oil seal is not assured.

The present invention is made to solve such a problem described above, and a purpose of the present invention is to provide an internal combustion engine and a cover member attachment structure for an internal combustion engine, which can assure a sufficient sealing performance by an oil seal.

Means for Solving Problem

To achieve the above-stated purpose, an internal combustion engine of a first aspect of this invention includes an oil seal attached to a crankshaft of an internal combustion engine main body, and a cover member including an oil seal securing portion for securing the oil seal attached to the crankshaft, the cover member including a first main body attachment portion which is arranged in a vicinity of the oil seal securing portion and which is for attaching the cover member to the internal combustion engine main body by a first fastening member.

In the internal combustion engine according to the first aspect of this invention, as described above, the cover member is provided with the first main body attachment portion which is arranged in the vicinity of the oil seal securing portion and which is for attaching the cover member to the internal combustion engine main body with the use of the first fastening member. Accordingly, even in a case where the cover member is deformed due to, for example, a thermal strain (a strain attributed to thermal expansion or thermal shrinkage), the cover member can be restricted from deforming in the vicinity of the oil seal securing portion because the first main body attachment portion of the cover member which is arranged in the vicinity of the oil seal securing portion is fastened to the internal combustion engine main body with the first fastening member. Consequently, a positional deviation of the oil seal which is attributed to the deformation of the cover member can be restricted, and accordingly a sufficient sealing performance by the oil seal can be assured.

The internal combustion engine according to the first aspect ideally further includes a seal material sealing between the first fastening member and a vicinity of the first main body attachment portion. According to the above-described configuration, oil can be prevented, by the seal material, from leaking out from between the first fastening member arranged in the vicinity of the oil seal securing portion and the first main body attachment portion.

In the internal combustion engine according to the first aspect, it is ideal that the first main body attachment portion of the cover member is arranged in the vicinity of the oil seal securing portion to be arranged at an inner side relative to an edge portion of the cover member. According to the above-described configuration, the first main body attachment portion can be arranged in the vicinity of the oil seal securing portion, unlike a case where the attachment portion relative to a main body of the internal combustion engine is formed at the edge portion of the cover member that is away from the oil seal securing portion. Accordingly, the deformation of the cover member at the oil seal securing portion can be restricted easily.

In this case, it is ideal that the first main body attachment portion includes plural first main body attachment portions provided in such a manner that the oil seal securing portion is interposed between the plural first main body attachment portions or in such a manner that the oil seal securing portion is surrounded by the plural first main body attachment portions. According to the above-described configuration, the vicinity of the oil seal securing portion can be fixed (fastened) more strongly, and thereby further restricting the deformation of the cover member in the vicinity of the oil seal securing portion. As a result, the positional deviation of the oil seal can be more restricted, and thus the sufficient sealing performance by the oil seal can be assured more reliably.

In the internal combustion engine according to the first aspect, it is ideal that the cover member further includes a second main body attachment portion which is arranged along the edge portion of the cover member and which is for attaching the cover member to the internal combustion engine main body with a second fastening member, and the first main body attachment portion is arranged in the vicinity of the oil seal securing portion at the inner side relative to the second main body attachment portion arranged at the edge portion of the cover member. According to the above-described configuration, the cover member is attached to the internal combustion engine main body not only at the first main body attachment portion but also at the second main body attachment portion, and thus the cover member can be fixed to the internal combustion engine main body more strongly. In addition, the cover member is attached to the internal combustion engine main body at the second main body attachment portion that is at the edge portion of the cover member. Consequently, even in a case where the cover member is deformed, the positional deviation not only in the vicinity of the oil seal securing portion of the cover member but also at the edge portion can be restricted.

In the internal combustion engine according to the first aspect, it is ideal that the oil seal securing portion includes a recessed portion, the oil seal is inserted in the recessed portion and is secured at the recessed portion, and a portion of the first fastening member which is in contact with a surface of the first main body attachment portion which is at a side opposite to the internal combustion engine main body is provided to project to cover at least part of a portion of the recessed portion of the oil seal securing portion into which the oil seal is inserted. According to the above-described configuration, the first fastening member for fastening the cover member to the internal combustion engine main body includes a function of restricting the oil seal from falling off from a side from which the oil seal is inserted into the recessed portion. Accordingly, there is no need to separately provide a dedicated oil seal fall-off prevention member, thereby simplifying the configuration.

In the internal combustion engine according to the first aspect, it is ideal that the cover member further includes a second main body attachment portion which is arranged along the edge portion of the cover member and which is for attaching the cover member to the internal combustion engine main body by a second fastening member, and an inner diameter of the second main body attachment portion of the cover member is set to include a size which generates a clearance between the second main body attachment portion and the second fastening member inserted in the second main body attachment portion, the clearance includes a size which is absorbable a positional deviation of the second main body attachment portion which is caused by at least one of thermal expansion of the cover member and thermal shrinkage of the cover member. According to the above-described configuration, even in a case where the cover member is subject to a thermal effect of the internal combustion engine main body in a state where the cover member made of resin is attached to the internal combustion engine main body via the seal member, the deformation (the thermal expansion and the thermal shrinkage) of the cover member, which is raised and floated by the seal member, can be released by utilizing a clearance provided between the second main body attachment portion and the second fastening member inserted in the second main body attachment portion. Therefore, unlike a case where the inner diameter of the second main body attachment portion is set without considering the above-described clearance and thus the second main body attachment portion is completely restrained by the second fastening member, the deformation of the cover member is absorbed at the second main body attachment portion by "the clearance" of the present invention. Accordingly, a component deformation force is not concentrated in the vicinity of the oil seal securing portion of the cover member. Consequently, even in case where the cover member is influenced by the thermal effect of the internal combustion engine main body and is deformed, the vicinity of the oil seal securing portion is not easily deformed, and accordingly the positional deviation of the oil seal relative to the crankshaft is restricted, thereby restricting the oil from leaking out.

In addition, the seal member is arranged between the cover member and the internal combustion engine main body, and thus vibrations of the internal combustion engine main body are not transmitted directly to the cover member made of the resin, and do not serve as a source of noise and a source of vibration. In addition, it is reliably prevented that the oil inside the internal combustion engine main body leaks to an outside from a gap between the cover member that is raised by the seal member and the internal combustion engine main body.

In the configuration in which the cover member further includes the second main body attachment portion, it is ideal that the inner diameter of the second main body attachment portion is set to include a size which generates the clearance between the second main body attachment portion and the second fastening member inserted in the second main body attachment portion, the clearance includes a size which is equal to or larger than an amount of the positional deviation of the second main body attachment portion which is caused by at least one of the thermal expansion of the cover member and the thermal shrinkage of the cover member made of resin. According to the above-described configuration, the positional deviation of the second main body attachment portion associated with the deformation (the thermal expansion and the thermal shrinkage) of the cover member can be reliably absorbed by using the clearance provided between the second main body attachment portion and the second fastening member inserted in the second main body attachment portion. Consequently, it is reliably prevented that the deformation is generated (concentrated) in the vicinity of the oil seal securing portion of the cover member.

In the configuration in which the cover member further includes the second main body attachment portion, it is ideal that the second main body attachment portion is provided along the edge portion of the cover member, and the second main body attachment portion is set in such a manner that the clearance becomes larger as a distance from the oil seal to the respective second main body attachment portion increases. According to the above-described configuration, even in a case where an amount of the deformation (warpage) of the cover member increases in association with an increment of the distance from the oil seal, the positional deviation associated with the deformation (the thermal expansion and the thermal shrinkage) of the cover member can be appropriately absorbed at each second main body attachment portion because the inner diameter of the second main body attachment portion is set so that the size of the clearance is adjusted in response to the increment of the amount of the deformation of the cover member (the amount of the positional deviation of the second main body attachment portion). Consequently, the deformation can be reliably prevented from occurring in the vicinity of the oil seal securing portion of the cover member.

The internal combustion engine according to the first aspect ideally further includes a seal member arranged between the internal combustion engine main body and the cover member, and including a seal portion that is in contact with a seal surface of the internal combustion engine main body, wherein at least part of the seal portion includes a configuration in which a component of an upward direction reaction force of a reaction force received from the seal surface of the internal combustion engine main body is larger than a component of a downward direction reaction force of the reaction force received from the seal surface of the internal combustion engine main body, a downward direction corresponds to a direction in which gravity force works and an upward direction corresponds to a direction which is opposite to the direction in which the gravity force works. According to the above-described configuration, even in a case where an opening portion formed at a vertical surface (a side wall) extending in the upper and lower direction of the internal combustion engine main body is closed with the cover member from a lateral side in a manner that the cover member is made to face the opening portion in the horizontal direction, the seal portion is prevented from deviating and moving (from deviating and sliding down) in the downward direction of gravitational force even at a portion (a seal region) at which the seal member is likely to deviate and thereby to decrease the sealing performance due to the vibrations of the internal combustion engine main body and/or an own weight of the cover member. This is because the seal member includes the seal portion formed in the configuration where the component of the reaction force, out of the reaction force received from the seal surface of the internal combustion engine main body, which acts in the upward direction is larger than the component of the reaction force, out of the reaction force received from the seal surface of the internal combustion engine main body, which acts in the downward direction in which the gravity force works. That is, the seal portion remains to be arranged at a position which maintains the sealing performance relative to the seal surface of the internal combustion engine main body. Consequently, the sealing performance can be sufficiently assured between the internal combustion engine main body and the cover member even in a case where the cover member is attached to the lateral side of internal combustion engine main body.

In the configuration further including the seal member, it is ideal that in a case where the seal member is elastically deformed in a state where the cover member is attached to a lateral side of the internal combustion engine main body via the seal member, at least part of the seal portion is configured to deform in such a manner that the part of the seal portion includes the configuration in which the component of the upward direction reaction force received from the seal surface of the internal combustion engine main body is larger than the component of the downward direction reaction force received from the seal surface. According to the above-described configuration, when the seal member is pressed and squashed into a predetermined configuration while being elastically deformed on the seal surface, the seal portion can be made to deform so that the component of the reaction force received from the seal surface of the internal combustion engine main body which acts in the upward direction is larger than the component of the reaction force which acts in the downward direction. Consequently, the seal portion can be easily prevented from being deviated and moved (from deviating and sliding down) in the downward direction of gravitational force.

In the internal combustion engine according to the first aspect, it is ideal that the cover member further includes a first engagement portion provided to surround the oil seal securing portion, an oil seal come-off prevention member is further provided, the oil seal come-off prevention member includes a second engagement portion engaging with the first engagement portion of the cover member, and an oil seal come-off prevention portion for preventing the oil seal from coming off, the first engagement portion of the cover member includes a first threaded portion, and the second engagement portion of the oil seal come-off prevention member includes a second threaded portion which threadedly engages with the first threaded portion, the second engagement portion is configured to be elastically deformable in a radial direction. According to the above-described configuration, only by inserting the second engagement portion of the oil seal come-off prevention member into the first engagement portion of the oil seal securing member, the second engagement portion comes to be engaged with the first engagement portion while being deflected in the radial direction automatically. Accordingly, the first threaded portion of the first engagement portion and the second threaded portion of the second engagement portion can be brought in a state of engagement (a state of threaded engagement) only by the insertion, without rotating the second threaded portions of the second engagement portion relative to the first threaded portion of the first engagement portion in a direction of screwing. Thus, an attachment operation of the oil seal come-off prevention member can be simplified. In addition, by allowing the first threaded portion and the second threaded portion to threadedly engage with each other, the oil seal securing member and the oil seal come-off prevention member can be fixed strongly compared to a case where the oil seal come-off prevention member is simply fitted in, for example, a groove portion. In consequence, for example, even in a case where an external force is applied, the oil seal come-off prevention member can be restricted from falling off the oil seal securing member.

In addition, when detaching the second threaded portion of the oil seal come-off prevention member from the first threaded portion of the cover member, the state of engagement of the first threaded portion and the second threaded portion can be released easily by rotating the second threaded portion. Thus, the oil seal come-off prevention member can be detached from the oil seal securing member readily in a case where the oil seal needs to be removed, for example, at a replacement of the oil seal. Accordingly, the oil seal that is prevented from coming off by the oil seal come-off prevention portion can be removed from the oil seal securing member easily.

In the configuration further including the oil seal come-off prevention member, it is ideal that a rotational direction when the second threaded portion of the oil seal come-off prevention member is detached relative to the first threaded portion is configured to be a direction which is opposite to a rotational direction of a rotational shaft to which the oil seal is attached. According to the above-described configuration, even in a case where such a force that rotates in the rotational direction of the rotational shaft is applied to the oil seal come-off prevention member due to a rotational vibration caused by the rotations of the rotational shaft, the state of engagement (the state of threaded engagement) of the first threaded portion and the second threaded portion can be restricted from being released. Consequently, the oil seal come-off prevention member can be effectively restricted from falling off the oil seal securing member.

In the internal combustion engine according to the first aspect, it is ideal that the cover member is made of resin. Even in a case where the cover member is subject to the deformation due to the thermal strain because the cover member is made of the resin including a relatively high coefficient of thermal expansion, the cover member can be restricted from being deformed in the vicinity of the oil seal securing portion since the cover member includes the first main body attachment portion which is arranged in the vicinity of the oil seal securing portion and which is for attaching the cover member to the internal combustion engine main body by the first fastening member. Consequently, the positional displacement of the oil seal that is caused by the deformation of the cover member can be restricted from occurring.

A cover member attachment structure for an internal combustion engine according to a second aspect of the present invention includes a cover member including an oil seal securing portion for securing an oil seal attached to a crankshaft of an internal combustion engine, the cover member including a first main body attachment portion which is arranged in a vicinity of the oil seal securing portion and which is for attaching the cover member to an internal combustion engine main body by a first fastening member.

In the cover member attachment structure for the internal combustion engine according to the second aspect, the cover member is provided with the first main body attachment portion which is arranged in a vicinity of the oil seal securing portion and which is for attaching the cover member to the main body of the internal combustion engine with the first fastening member, as described above. Accordingly, even in a case where the cover member is deformed attributed to, for example, the thermal strain (strain attributed to the thermal expansion or the thermal shrinkage), the cover member can be restricted from being deformed in the vicinity of the oil seal securing portion since the first main body attachment portion of the cover member which is arranged in the vicinity of the oil seal securing portion is fastened to the internal combustion engine main body with the first fastening member. Accordingly, the oil seal can be restricted from being positionally deviated due to the deformation of the cover member, thereby assuring the sufficient sealing performance provided by the oil seal.

Effect of the Invention

According to the present invention, as described above, an internal combustion engine and a cover member attachment structure for an internal combustion engine, which can assure a sufficient sealing performance by an oil seal can be provided.

BRIEF DESCRIPTION OF DRAWINGS

FIG. 12 is an enlarged cross-sectional view illustrating a state in which the timing chain cover is attached to the engine according to the first embodiment of the present invention via the seal member.

FIG. 13 is a view illustrating a state of a force acting internally in a state where a distal end portion of the seal member illustrated in FIG. 6 is deformed.

MODE FOR CARRYING OUT THE INVENTION

Embodiments of the present invention will be described hereunder on the basis of the drawings.

First Embodiment

First, a structure of an engine 100 according to a first embodiment of the present invention will be described with reference to FIGS. 1 to 13. In the description below, a direction in which a crankshaft 40 of the engine 100 extends corresponds to an X direction, a direction which is orthogonal to the crankshaft 40 in a horizontal plane corresponds to a Y direction, and a vertical direction in which a cylinder 2a extends corresponds to a Z direction. The engine 100 is an example of "an internal combustion engine" of the present invention.

Figure 1:
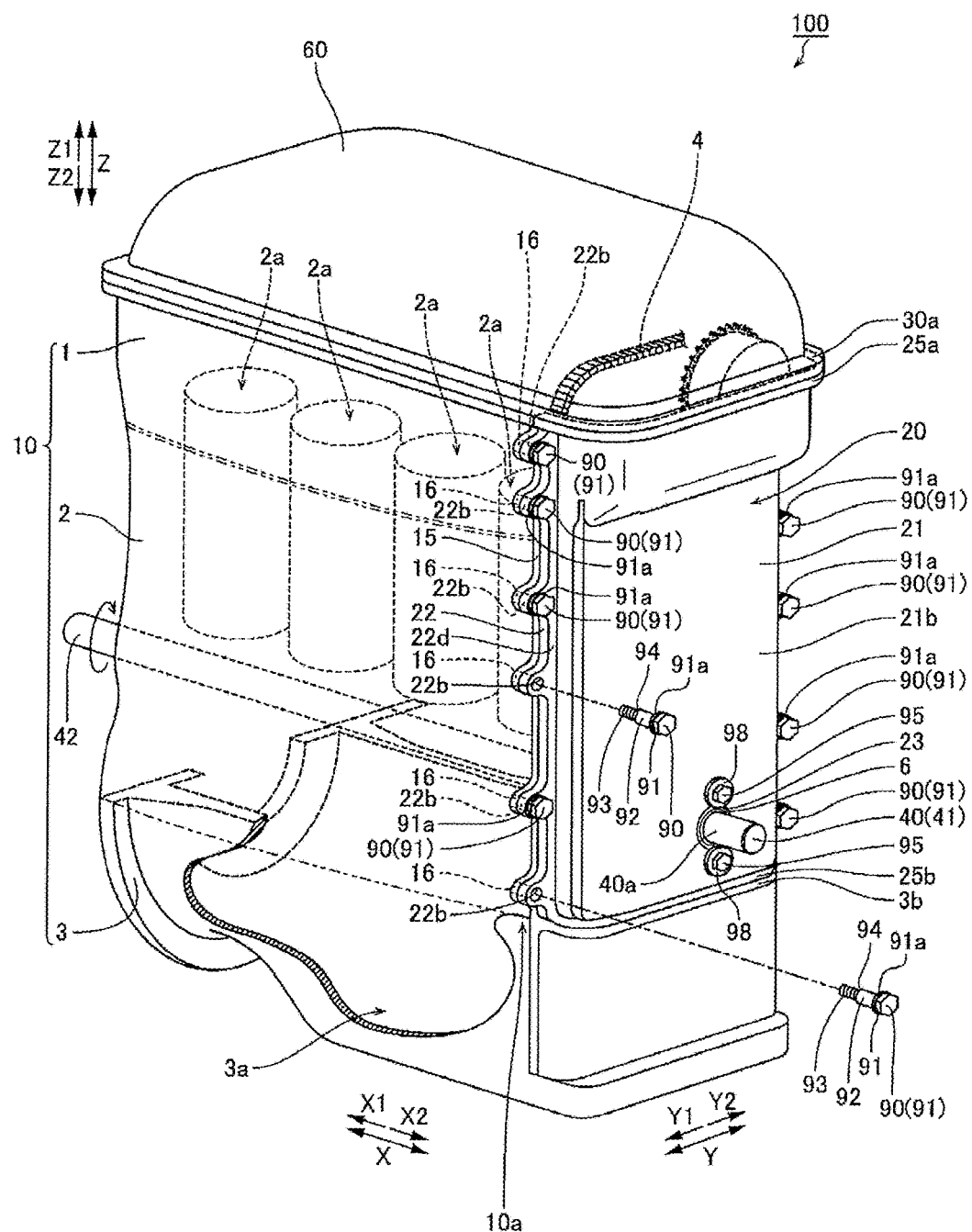
FIG. 1 is a perspective view illustrating a schematic structure of an engine according to a first embodiment of the present invention.

As illustrated in FIG. 1, the engine 100 is provided with an engine main body 10 which is made of aluminum alloy and includes a cylinder head 1, a cylinder block 2 and a crank case 3. In addition, the engine 100 which is formed by a gasoline engine and is for an automobile is provided with a timing chain cover 20 (which will be hereinafter referred to as a TCC20) assembled on a side end portion (an edge portion 2b) of the engine main body 10 at an X2 side and covering a valve train timing member including a timing chain 4 from a lateral side. In addition, the engine 100 is provided with a head cover 60 assembled on an upper side (a Z1 side) of the cylinder head 1. The timing chain cover (TCC) 20 is an example of "a cover member" of the present invention.

For example, a cam shaft and a valve mechanism (which are not shown) are arranged at an inside of the cylinder head 1. At an inside of the cylinder block 2 connected to a lower side (a Z2 side) of the cylinder head 1, the cylinders 2a (drawn with the broken lines) in which pistons (not shown) reciprocate are formed. In addition, an air-intake apparatus (not shown) is connected to the cylinder head 1 and the air-intake apparatus introduces intake air to each of the four cylinders 2a formed at the cylinder block 2. In addition, the crankshaft 40 is arranged at an inside of the crank case 3 connected to a lower side (a Z2 side) of the cylinder block 2, and the crankshaft 40 is rotatably connected via the piston and a corm-rod. The crankshaft 40 is illustrated to include a rod shape, however, the crankshaft 40 is actually formed by a crank pin including an eccentric rotational axis and balance weights sandwiching the crank pin, which are connected to a crank journal.

Figure 7:
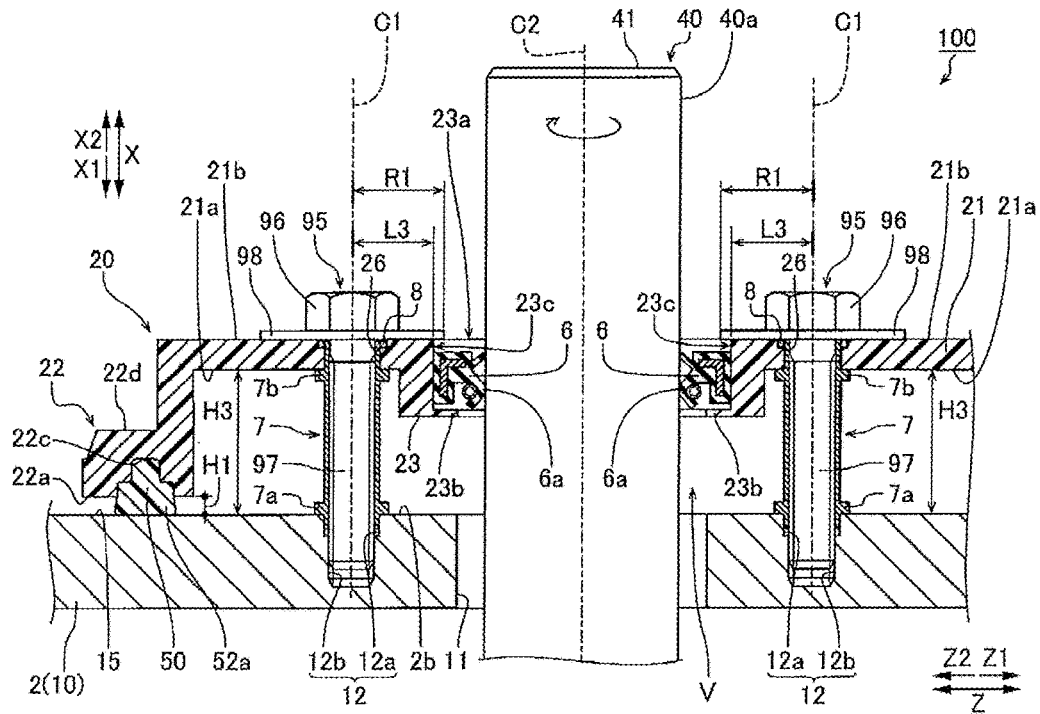
FIG. 7 is a cross-sectional view taken along line 130-130 in FIG. 2.
Figure 8:
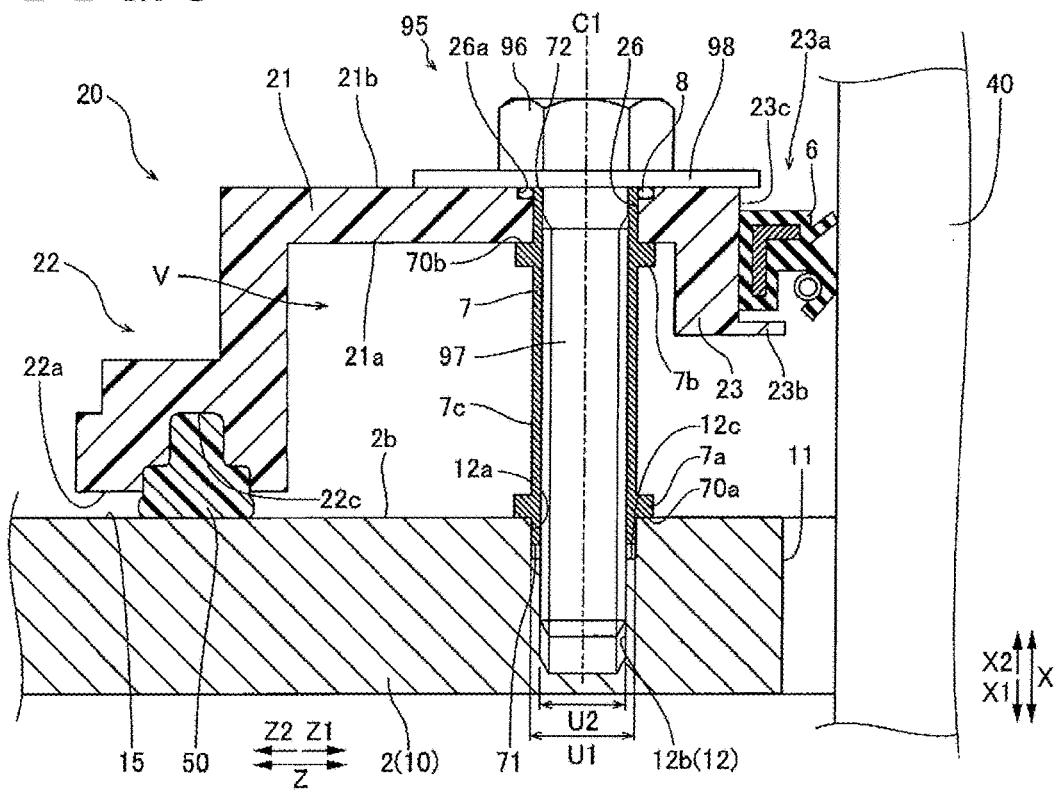
FIG. 8 is an enlarged cross-sectional view illustrating a vicinity of a through hole, in an enlarged manner, of the timing chain cover of the engine according to the first embodiment of the present invention.
Figure 9:
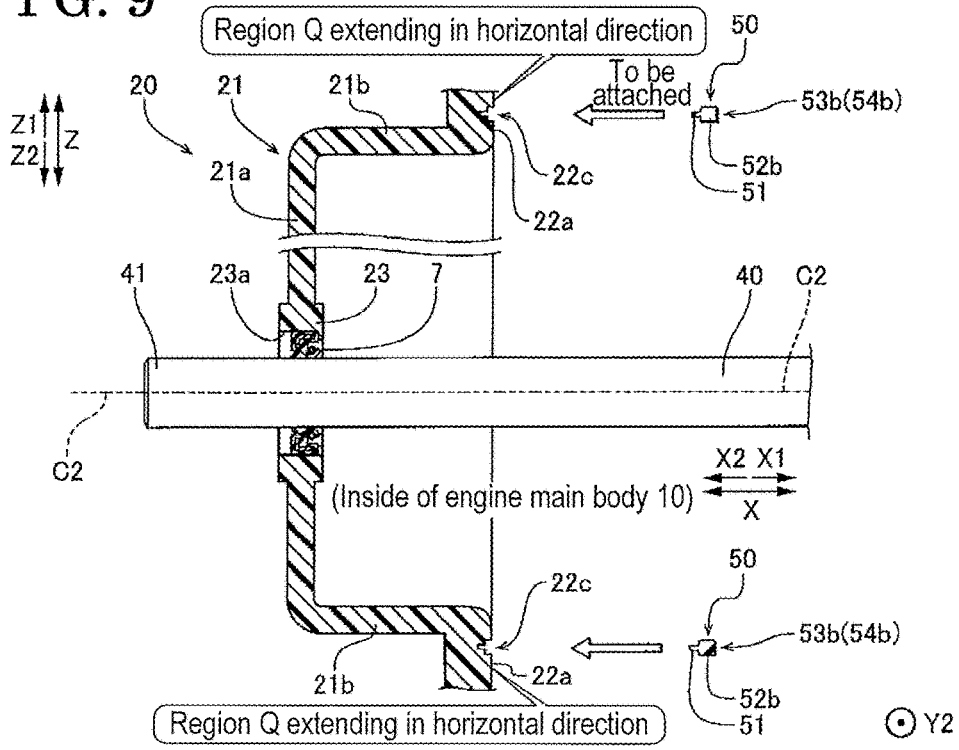
FIG. 9 is a cross-sectional view of the timing chain cover of the engine according to the first embodiment of the present invention.

As illustrated in FIG. 7, a through hole 11 is formed at a lower portion (the Z2 side) of the cylinder block 2, and the crank shaft 40 is inserted in (penetrates) the through hole 11. In addition, positioning recessed portions 12 are formed at a surface 2b of the cylinder block 2, at portions that correspond to a pair of through holes 26 of the TCC 20 which will be described below. The positioning recessed portions 12 are provided at the positions each of which is separated from the through hole 11 by a predetermined distance in an upper and lower direction (the Z direction) in order that positioning is conducted at a time of assembly of the TCC 20. Each of the positioning recessed portions 12 includes a cylindrical portion 12a at which a thread groove is not formed, and a threaded hole 12b of which a diameter is smaller than the cylindrical portion 12a and of which an inner surface is formed by a female thread. In addition, as illustrated in FIG. 8, a stepped portion 12c is formed at a border between the cylindrical portion 12a and the threaded hole 12b. In addition, the cylindrical portion 12a includes an inner diameter U1 that is larger than a diameter U2 of a thread root of the threaded hole 12b.

In addition, as illustrated in FIG. 1, an oil reservoir portion 3a collecting engine oil (which will be hereinafter referred to simply as oil) is provided at a lower portion (the Z2 side) of the crank case 3. The oil is pumped up from the oil reservoir portion 3a to an upper portion of an inside of the engine main body 10 by an oil pump that is not shown, and then, the oil is supplied to sliding portions including the cam shaft and/or an outer surfaces of the pistons, for example. Thereafter, the oil drops by its own weight to return to the oil reservoir portion 3a.

The engine main body 10 and the TCC 20 are fixed to each other via a seal member 50 that will be described below, in a state where the engine main body 10 and the TCC 20 come off from each other (separated from each other in the X direction) with a predetermined clearance provided therebetween. That is, as illustrated in FIG. 7, in a state where a front end portion 41 of the crank shaft 40 at the X2 side is inserted in a through hole 23a (an oil seal securing portion 23), the TCC 20 is attached to the engine main body 10 in such a manner that an attachment portion 22 formed at a peripheral edge portion is made to face a portion of an attachment section 15 of the cylinder block 2 in the X direction. Thus, vibrations of the engine main body 10 are restricted from being transmitted directly to the TCC 20. In addition, noise of the engine main body 10 is restricted from being transmitted to an outside.

Figure 2:
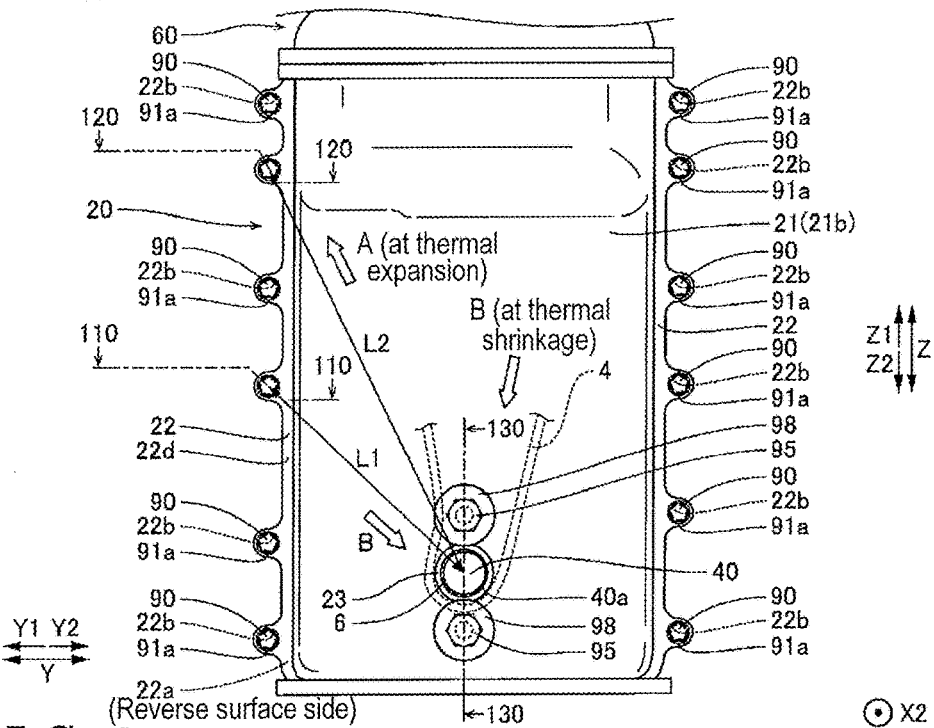
FIG. 2 is a lateral view viewing the engine according to the first embodiment of the present invention from a side at which a timing chain cover is attached.
Figure 3:
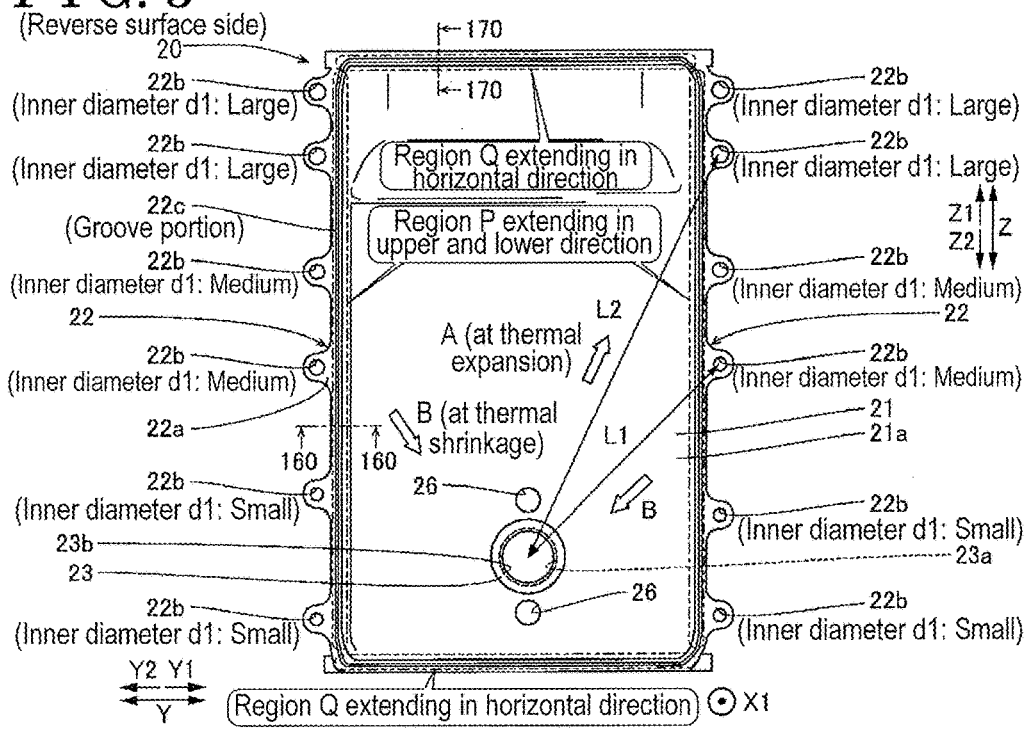
FIG. 3 is a plan view illustrating the timing chain cover, as a single unit, of the engine according to the first embodiment of the present invention, which is viewed from a reverse side (a side which is to be attached to an engine body).
Figure 10:
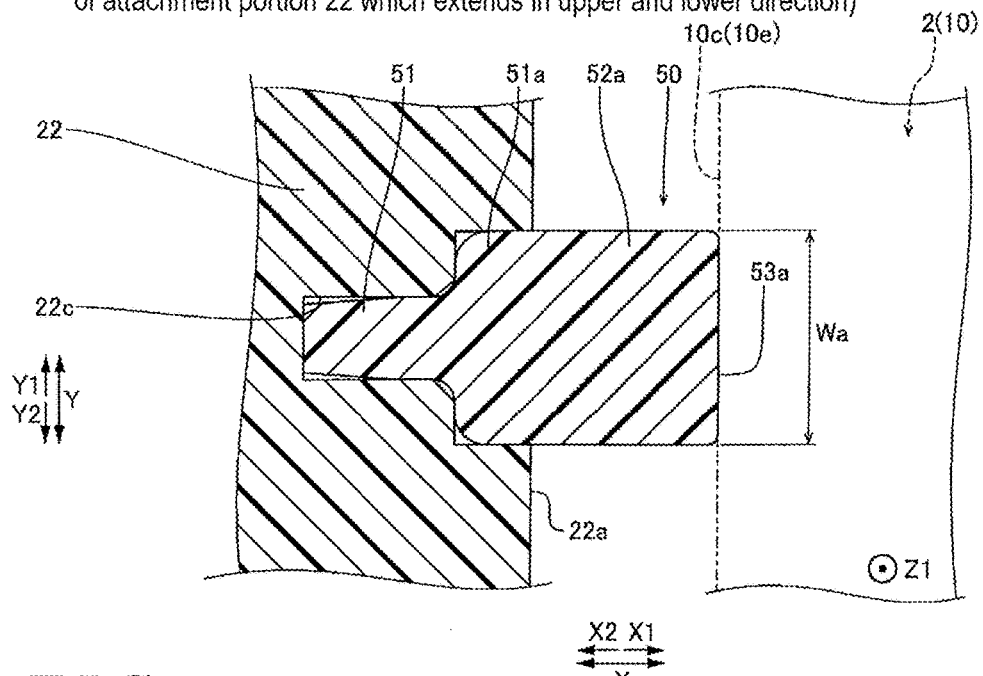
FIG. 10 is a view for explaining a cross-sectional configuration of a seal member used in the engine according to the first embodiment of the present invention.

As illustrated in FIG. 2, the TCC 20 includes a planar shape which overlaps the side end portion (a lateral cross-sectional shape) of the engine main body 10 at the X2 side (refer to FIG. 10). In addition, the TCC 20 includes a main body portion 21 and the attachment portions 22. The main body portion 21 includes an inner surface 21a (refer to FIG. 3) and expands towards the X2 side. The attachment portion 22 is formed, in a flange configuration, at respective end portions (at a Y1 side and a Y2 side) which extend along a long-side direction of the main body portion 21. As illustrated in FIG. 3, each attachment portion 22 includes a flat attachment surface 22a at a side of the inner surface 21a. At the attachment portion 22, plural through holes 22b are provided to penetrate the flat attachment surface 22a in a thickness direction (the X direction) and to be spaced from one another by a predetermined distance. A plane area (an amount of projection of the flange) of the attachment portion 22 is increased in the vicinity of each through hole 22b to be in accordance with a precise circular shape of the through hole 22b. In addition, the through holes 22b are formed at six positions at each of the right portion and the left portion of the attachment portion 22 each of which extends in the Z direction. Each of the through holes 22b is formed at a position corresponding to a respective screw hole 16 (refer to FIG. 1) formed at the attachment section 15 of the side end portion of the engine main body 10 (refer to FIG. 1). The attachment portion 22 is an example of "an edge portion" of the present invention. The through hole 22*b* is an example of "a second main body attachment portion" of the present invention.

Polyamide resin is used for the TCC 20 and for the head cover 60 (refer to FIG. 1). Such a resin material includes a linear expansion coefficient which is larger than a linear expansion coefficient of the aluminum alloy forming the engine main body 10. Thus, thermal expansion or thermal shrinkage (thermal strain) is more likely to occur at the TCC 20 and/or the head cover 60 than at the aluminum alloy of the engine main body 10. For example, at a temperature identical to a temperature of a state in which the TCC 20 is mounted on the engine main body 10 during manufacturing of the engine 100 (at factory shipment), the thermal expansion and the thermal shrinkage do not occur at the TCC 20. On the other hand, the TCC 20 is warmed up by the engine main body 10 (the cylinder head 1 and the cylinder block 2) that produces heat after start-up of the engine 100, and thus the thermal expansion occurs in the vicinity of the main body portion 21. In addition, as the engine main body 10 cools down after the engine 100 stops, the vicinity of the main body portion 21 of the TCC 20 thermally shrinks from the state in which the vicinity of the main body portion 21 is expanded. In addition, in a case where the engine 100 is subject to an outside air of a low temperature, further thermal shrinkage occurs in the vicinity of the main body 21 of the TCC 20.

Figure 4:
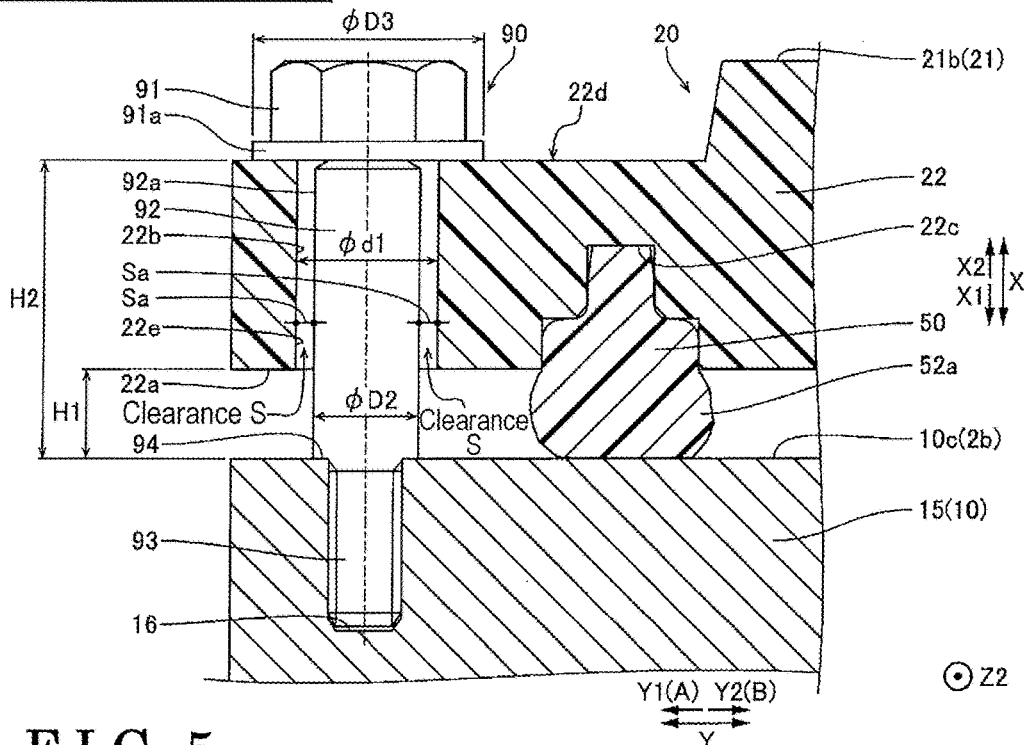
FIG. 4 is a cross-sectional view taken along line 110-110 in FIG. 2.

When the TCC 20 is viewed from a reverse surface side (a side to which the cylinder block 2 (refer to FIG. 1) is attached) in the direction of the arrow X2, a groove portion 22*c* is formed at a side of the attachment surface 22*a* of the attachment portion 22 as illustrated in FIG. 3. A side of a base portion (a root portion) of the seal member 50 (refer to FIG. 4) that is made of a material including elasticity is fitted in the groove portion 22*c*. Then, as illustrated in FIG. 4 and FIG. 7, a seal portion 52*a* of the seal member 50 which protrudes from the groove portion 22*c* is in contact with a seal surface 10*c*, which will be described below, of the attachment section 15 of the engine main body 10. In addition, as illustrated in FIG. 3, of the TCC 20 is provided with the oil seal securing portion 23 formed in a recessed configuration and including the through hole 23*a*. The seal securing portion 23 is formed at a lower portion side (the Z2 side) of the main body portion 21, in the vicinity of a central portion of the main body portion 21 in the Y direction. The seal securing portion 23 is an example of "a recessed portion" of the present invention.

As illustrated in FIG. 7, the through hole 23*a* of the oil seal securing portion 23 penetrates the main body portion 21 in the thickness direction (the X direction). In addition, an oil seal 6 including an annular shape is attached to the oil seal securing portion 23. An outer peripheral portion of the oil seal 6 is press-fitted to an inner surface 23*c* of the through hole 23*a*. In addition, the oil seal 6 includes a seal lip 6*a* which is in contact with an outer surface 40*a* of the crankshaft 40 and slides thereat. At the inner surface 23*c* of the through hole 23*a*, a come-off prevention portion 23*b* including an annular shape is formed to protrude in a diameter-reduction direction in which the diameter is reduced. An outer diameter of the oil seal 6 is larger, by a slight amount, than an inner diameter of the inner surface 23*c* of the oil seal securing portion 23. Accordingly, the oil seal 6 is press-fitted in the oil seal securing portion 23 and secured thereat. In a case where an internal pressure of a space portion V of the TCC 20 is smaller than an external pressure (atmospheric pressure), the oil seal 6 is in contact with the come-off prevention portion 23*b*, and thus the oil seal 6 is prevented from falling off inside the cylinder block 2 from the X1 side.

Figure 5:
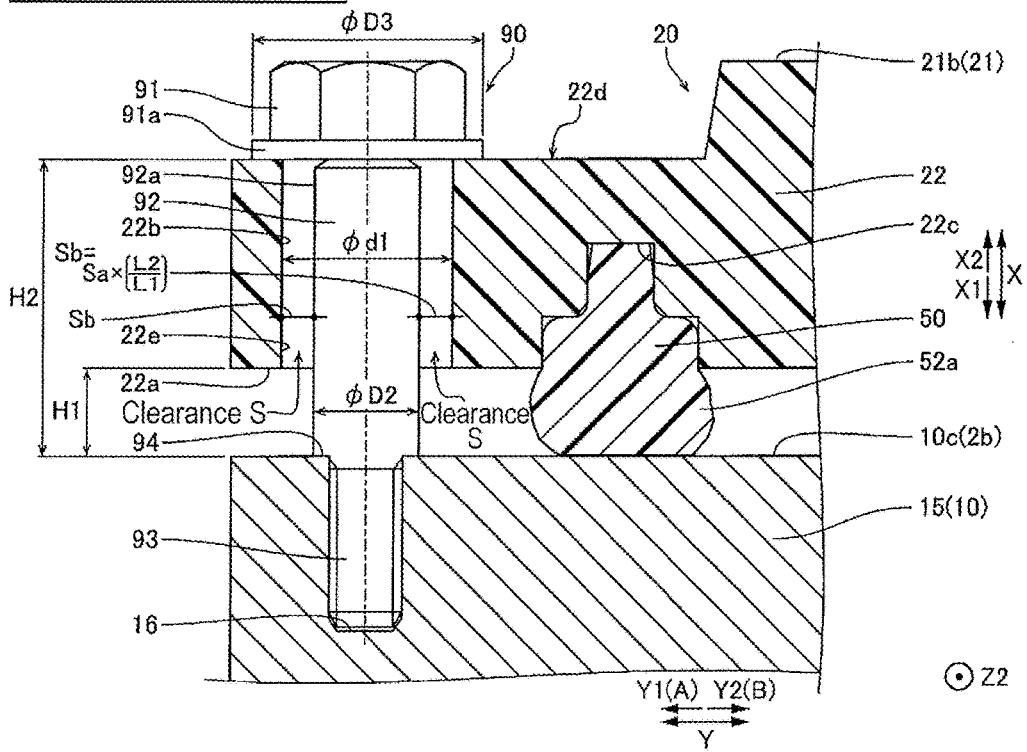
FIG. 5 is a cross-sectional view taken along line 120-120 in FIG. 2.
Figure 6:
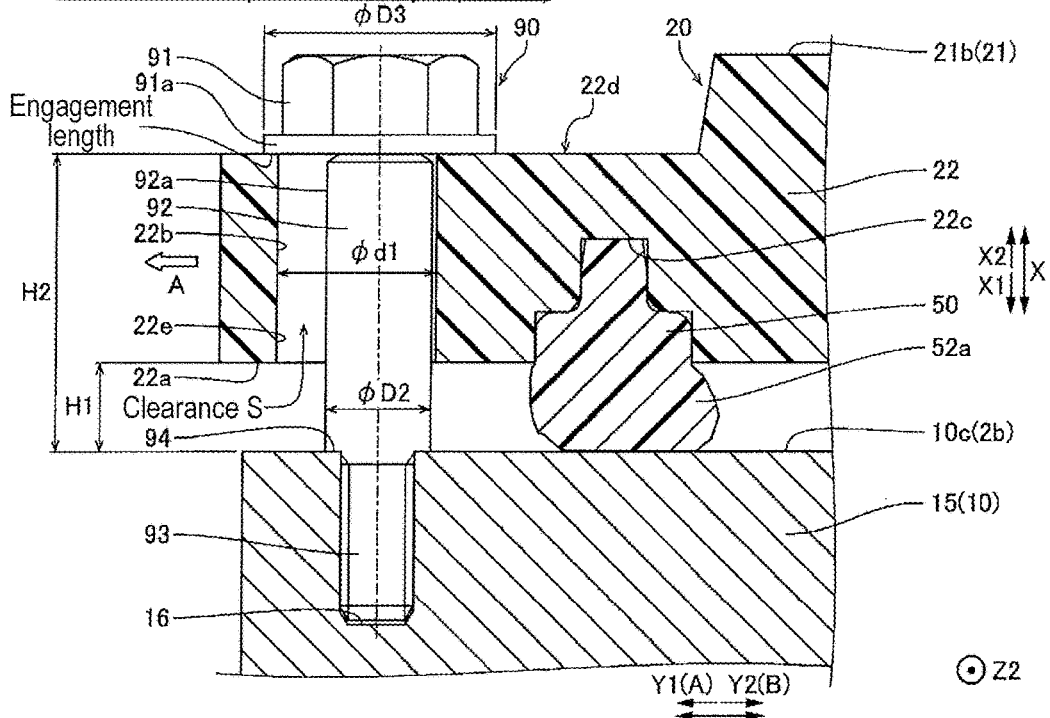
FIG. 6 is a cross-sectional view taken along line 120-120 in FIG. 2, in a case where the timing chain cover is deformed (thermally expanded).

As illustrated in FIG. 1, shoulder bolts 90 (twelve pieces in total) are screwed into the respective screw holes 16 via the respective through holes 22*b* in a state where the TCC 20 is applied to the side end portion of the engine main body 10 from a front side (the X2 side), and accordingly the TCC 20 is fixed to a lateral side of the engine main body 10. Here, as illustrated in FIGS. 4 to 6, each shoulder bolt 90 includes a head portion 91 including a flange-shaped portion 91*a*, a large diameter portion 92 connected to the head portion 91 and formed by a flat and smooth outer side surface 92*a*, and a threaded portion 93 of which a diameter is smaller than the large diameter portion 92. An outer diameter of the flange-shaped portion 91*a* is one size larger than an upper end portion of the head portion 91. The shoulder bolt 90 is an example of "a second fastening member" of the present invention.

When the shoulder bolt 90 is screwed into the screw hole 16 via the through hole 22*b*, as illustrated in FIG. 4, an end surface of a stepped portion 94 formed between the large diameter portion 92 and the threaded portion 93 is brought into contact with the seal surface 10*c* of the attachment section 15 circumferentially, and therefore a height H2 of the large diameter portion 92 from the seal surface 10*c* to a bottom surface of the head portion 91 (the flange-shaped portion 91*a*) is unambiguously determined. Thus, because the seal member 50 is sandwiched between the TCC 20 and the attachment section 15 (the engine main body 10), the TCC 20 is secured in a state where the attachment surface 22*a* of the attachment portion 22 rises from the seal surface 10*c* with a clearance distance H1 (equal to or larger than approximately 0.5 mm and equal to or smaller than approximately 3 mm) is provided between the attachment surface 22*a* and the seal surface 10*c*. In addition, in a state where the shoulder bolt 90 is inserted in the through hole 22*b*, the outer side surface 92*a* of the large diameter portion 92 faces an inner surface 22*e* of the through hole 22*b* throughout the thickness direction of the attachment portion 22 (the X direction). At this time, as illustrated in FIG. 7, in a state where the front end portion 41 of the crank shaft 40 is inserted in the through hole 23*a*, the oil seal 6 is attached to the crankshaft 40. In addition, due to the oil seal 6, it is configured in such a manner that oil inside the crank case 3 (refer to FIG. 1) does not leak to the outside of the engine main body 10 from a vicinity around the crankshaft 40.

Here, as illustrated in FIGS. 4 and 5, the first embodiment is configured in such a manner that a predetermined clearance S is generated between the inner surface 22*e* of the through hole 22*b* and the outer side surface 92*a* of the large diameter portion 92 of the shoulder bolt 90 inserted in the through hole 22*b*. The clearance S is determined by a size of an inner diameter d1 of the through hole 22*b* so that the clearance S includes a size which can absorb a positional deviation of the through hole 22*b* (the attachment portion 22) that is caused by at least one of the thermal expansion of the TCC 20 and the thermal shrinkage of the TCC 20. That is, the inner diameter d1 of each of the through holes 22*b* is preset at the size which ensures the clearance S to be provided between the inner surface 22*e* of the through hole 22*b* and the outer side surface 92*a* of the large diameter portion 92. The clearance S includes the size that is equal to or larger than an amount of a positional deviation (an amount of movement) of the through hole 22*b* within a Y-Z plane which is associated with elongation (shrinkage) of the attachment portion 22 in a case where at least one of the thermal expansion and the thermal shrinkage of the TCC 20 occurs due to a temperature change.

In addition, the sizes of the inner diameters d1 of the respective through holes 22b differ from one another depending on positions at which the through holes 22b are formed. As illustrated in FIG. 3, the size of the inner diameter d1 is set individually in accordance with a distance (a plane distance in the Y-Z plane) from the crankshaft 40 (the oil seal 6). In the first embodiment, the inner diameter d1 is set in such a manner that the clearance S between the inner surface 22e of the through hole 22b and the outer side surface 92a of the large diameter portion 92 becomes larger as the distance from the oil seal 6 to the corresponding through hole 22b. That is, as illustrated in FIGS. 3 and 4, at the through hole 22b positioned at a distance L1 from the oil seal 6, which is relatively close to the oil seal 6, the inner diameter d1 is set to include a relatively small dimension. In contrast, at the through hole 22b positioned at a distance L2 (L2>L1) from the oil seal 6, which is relatively far from the oil seal 6, the inner diameter d1 is set to include a relatively large dimension as illustrated in FIGS. 3 and 5.

The reason for each of the inner diameters d1 is set as described above is as follows. The TCC 20 made of the polyamide resin includes a linear expansion coefficient α that includes a certain magnitude. The linear expansion coefficient α is a physical property indicating a rate at which a length L of a member changes (expands) in a case where the temperature increases by 1 K (degree). In addition, an elongation amount ΔL is obtained from Elongation amount ΔL=Linear expansion coefficient α×Length L of the member×Temperature increment ΔT. At the through hole 22b that is away from the oil seal 6 by the distance L1, Elongation amount ΔLa=α×L1×ΔT is obtained. At the through hole 22b that is away from the oil seal 6 by the distance L2, Elongation amount ΔLb=α×L2×ΔT is obtained. In these cases, the elongation amounts ΔL at the respective through holes 22b increase in proportion to the respective distances from the oil seal 6.

On the basis of the above-described reason, the inner diameter d1 of the through hole 22b that is close to the oil seal 6 is relatively small, and the inner diameters d1 of the respective through holes 22b are formed to become larger in a step-by-step manner as the through holes 22b become farther from the oil seal 6. In a case where the size of the clearance S between the inner surface 22e of the through hole 22b and the outer side surface 92a of the large diameter portion 92 is a width Sa in FIG. 4 illustrating the through hole 22b which is away from the oil seal securing portion 23 by the distance L1, a width Sb of the clearance S between the inner surface 22e of the through hole 22b and the outer side surface 92a of the large diameter portion 92 in FIG. 5 illustrating the through hole 22b which is away from the oil seal securing portion 23 by the distance L2 includes a relationship of Width Sb=Width Sa×(Distance L2/Distance L1). Although not shown, at the closest through hole 22b of the attachment portion 22 which is the closet to the oil seal 6, the clearance S including a width which is smaller than the width Sa (refer to FIG. 9) is provided. In this case, the inner diameter d1 is the smallest.

In addition, as illustrated in FIG. 2, there is a case where the clearance S corresponds to the clearance S at a side of a direction of an arrow A that becomes farther away from the crankshaft 40 when the TCC 20 thermally expands. In this case, the clearance S can absorb the positional deviation of the through hole 22b in the direction of the arrow A that becomes away from the crankshaft 40. There is another case where the clearance S corresponds to the clearance S at a side of a direction of an arrow B that becomes closer to the crankshaft 40 when the TCC 20 thermally shrinks. In this case, the clearance S can absorb the positional deviation of the through hole 22b in the direction of the arrow B that becomes closer to the crankshaft 40. Consequently, as illustrated in FIGS. 4 and 5, the clearance S is ensured at both sides of the large diameter portion 92 (that is, at the side of the direction of the arrow A and the side of the direction of the arrow B in FIG. 2).

In addition, in the first embodiment, the shoulder bolt 90 of which a standard is unified (for example, "a size M8") is used for all of the through holes 22b. Consequently, in a case where an outer diameter of the large diameter portion 92 is ϕD2 (constant), in FIG. 4, the inner diameter d1 of the through hole 22b is set as Inner diameter d1=Outer diameter D2+2×Width Sa. In FIG. 5, the inner diameter d1 of the through hole 22b is set as Inner diameter d1=Outer diameter D2+2×Width Sb.

As an example, in a case of the polyamide resin, every time becoming away from the oil seal securing portion 23 by 100 mm, the width of the clearance S (the width Sa in FIG. 4) needs to be assured at equal to or larger than approximately 0.8 mm, equal to or smaller than approximately 1.0 mm. At a position that is away by 300 mm, it is ideal that a width of the clearance S is set to be three times as large as a width of the clearance S at a position that is away by 100 mm. In FIGS. 4 and 5, a state in which the thermal expansion or the thermal shrinkage does not occur to the TCC 20 (that is, a state in which the shoulder bolt 90 is simply screwed into the screw hole 16 and the TCC 20 is attached to the engine main body 10) and the TCC 20 is assembled on the engine main body 10 via the seal member 50. In this case, a state is shown, in which an axis of the shoulder bolt 90 (a center of the screw hole 16 (drawn with the long dashed short dashed line) and a center of the through hole 22b match with each other, and the clearance S is generated around the outer side surface 92a of the large diameter portion 92. Actually, as illustrated in FIG. 6, the through hole 22b is deviated and is moved in the Y-Z plane relative to the axis of the shoulder bolt 90 in a range of the width Sa or the width Sb according to the temperature change of the TCC 20.

In addition, in the first embodiment, the maximum value of the inner diameter d1 of the through hole 22b of the TCC 20 is smaller than an outer diameter D3 (refer to FIG. 6) of the flange-shaped portion 91a of the attachment portion 22 of the shoulder bolt 90, the flange-shaped portion 91a which is in contact with an upper surface 22d. More specifically, as illustrated in FIG. 6, the outer diameter D3 of the flange-shaped portion 91a is set to be equal to or larger than twice a difference between the inner diameter d1 of the through hole 22b of the TCC20 and a half of a size of the outer diameter D2 of the large diameter portion 92 of the shoulder bolt 90 (D3≥(d1−D2/2). Accordingly, in a case where the thermal expansion occurs to the TCC 20 and the through hole 22b which is positioned farther from the oil seal securing portion 23 is significantly positionally deviated together with the attachment portion 22 in the direction of the arrow A, the clearance S, which is large, occurs between the inner surface 22e of the through hole 22b and the outer side surface 92a of the large diameter portion 92. Even in this case, because the dimensional relationship of D3≥(d1−D2/2) is established, an end portion of the flange-shaped portion 91a having an outer diameter U3 is configured to be easily in contact with the upper surface 22d in the vicinity of the through hole 22b of the attachment portion 22, with a predetermined "engagement length" provided at the end portion of the flange-shaped portion 91a.

In addition, as illustrated in FIGS. 1 and 2, the TCC 20 and the head cover 60 are joined to each other with the use of a bolt (not shown), and the TCC 20 and the crank case 3 are joined to each other with the use of a bolt (not shown). At each of the joined portions, a seal member that is not shown is sandwiched.

In addition, in the first embodiment, as illustrated in FIG. 3, the pair of through holes 26 each penetrating the TCC 20 in the thickness direction (the X direction) is provided in the vicinity of the oil seal securing portion 23. Each of the through holes 26 is provided in order that the TCC 20 is attached to the engine main body 10 with a fastening bolt 95 (refer to FIG. 2). In addition, as illustrated in FIG. 7, each of the pair of through holes 26 is formed in the vicinity of the oil seal securing portion 23 in a state where a center line C1 of the through hole 26 is away from the inner surface 23c of the through hole 23a by a distance L3 along the Z direction. In addition, the through holes 26 sandwich therebetween the oil seal securing portion 23 (the crankshaft 40) from the Z1 side and the Z2 side in a manner that the through holes 26 are arranged at equal angular intervals of approximately 180 degrees (refer to FIG. 3) relative to a center line C2 of the crankshaft 40. The through hole 26 is an example of "a first main body attachment portion" of the present invention and the fastening bolt 95 is an example of "a first fastening member" of the present invention.

Each through hole 26 is configured in such a manner that a collar member 7 made of metal including stainless, for example, and the fastening bolt 95 are coaxially inserted in the through hole 26. As illustrated in FIG. 7, each collar member 7 includes flange portions 7a and 7b formed circumferentially at portions of the collar member 7 which are positioned at an inner side from the end portions in a long-side direction (the Z direction) by predetermined distances. Each of the flange portions 7a and 7b protrudes outwardly (in a direction away from the center line C1 of the through hole 26) from an outer circumferential surface of the collar member 7. The flange portion 7a is formed at an X1 side of the collar member 7 and the flange portion 7b is formed at an X2 side of the collar member 7. In addition, the fastening bolt 95 includes a head portion 96 and a threaded portion 97 connected to the head portion 96. A configuration of the through hole 26, the collar member 7 and the fastening bolt 95 in the vicinity of the oil seal securing portion 23 illustrated in FIG. 7 is common between the Z1 side and the Z2 side, and therefore FIG. 8 illustrates the configuration of the through hole 26, the collar member 7 and the fastening bolt 95 at the Z2 side only.

As illustrated in FIG. 8 in detail, a recessed portion 26a is formed at the X2 side of the through hole 26, and the recessed portion 26a is recessed towards the X1 side so as to surround circumferentially. In addition, the collar member 7 is formed in a cylindrical shape and is configured in such a manner that the fastening bolt 95 is inserted in an inside of the collar member 7. At an outer circumferential portion 7c of the collar member 7, the pair of flange portions 7a and 7b each circumferentially protruding in the direction away from the center line C1 of the through hole 26 is integrally formed. At the outer circumferential portion 7c of the collar member 7, the flange portions 7a and 7b are formed at the X1 side and the X2 side, respectively.

In addition, an outer diameter of the collar member 7 is formed to be smaller than the inner diameter U1 of the cylindrical portion 12a at the X2 side of the positioning recessed portions 12 of the engine main body 10. As a result, it is configured in such a manner that, as the collar member 70 is inserted into the positioning recessed portions 12, the collar member 7 is secured at the positioning recessed portions 12. At this time, the flange portion 7a at the X1 side is configured in such a manner that an end surface 70a at the side of the engine main body 10 (the X1 side) is in contact with the surface 2b of the engine main body 10. In addition, an end portion 71 of the collar member 7 at the X1 side is configured not to be in contact with the stepped portion 12c of the positioning recessed portions 12 of the engine main body 10. That is, a clearance is provided between the end portion 71 of the collar member 7 and the stepped portion 12c. In addition, a certain clearance (not shown) is provided between the collar member 7 and the cylindrical portion 12a.

In addition, at the X2 side, the outer diameter of the collar member 7 is larger than the inner diameter U1 of the through hole 26 of the TCC 20 by a small amount. As a result, it is configured in such a manner that the collar member 7 is secured at the through hole 26 as the collar member 7 is inserted (press-fitted) in the through hole 26. At this time, and end surface 70b of the flange portion 7b at a side opposite to the engine main body 10 (the X2 side) comes into contact with the inner surface 21a of the main body portion 21 of the TCC 20 (a surface at a side of the engine main body 10), and an end portion 72 of the collar member 7 at the X2 side and an outer surface 21b of the main body portion 21 of the TCC 20 comes to be substantially flush with each other.

In addition, as an end portion of the collar member 7 at the X1 side (a portion which is at the X1 side relative to the flange portion 7a) is inserted into the positioning recessed portions 12 and an end portion of the collar member 7 at the X2 side (a portion which is at the X2 side relative to the flange portion 7b) is inserted (press-fitted) into the through hole 26, the positioning of the TCC 20 relative to the engine main body 10 in an in-plane direction that is orthogonal to the crankshaft 40 (in the Y direction and the Z direction) is conducted. In addition, as the flange portion 7a is in contact with the surface 2b of the cylinder block 2 and the flange portion 7b is in contact with the inner surface 21a of the TCC 20, the TCC 20 is positioned relative to the engine main body 10 in the X direction in which the crankshaft 40 extends.

The fastening bolt 95 includes the head portion 96, the threaded portion 97 at which a male thread is formed, and a flange portion 98. In a state where the flange portion 98 is in contact with the outer surface 21b at the X2 side of the TCC 20, the fastening bolt 95 is configured so that the X1 side of the screw portion 97 threadedly engages with the threaded hole 12b of the positioning recessed portion 12 of the engine main body 10, the threaded hole 12 which includes the female thread.

In addition, as illustrated in FIG. 7, a radius R1 of the flange portion 98 is larger than the length L3 between the center line C1 of the through hole 26 and the inner surface 23c of the oil seal securing portion 23. In consequence, a vicinity of an outer edge portion of the flange portion 98, the outer edge portion which is at a side of the oil seal securing portion 23, is configured to project towards the crankshaft 40 so as to cover, from the X2 side, part of a portion of the oil seal securing portion 23, the portion in which the oil seal 6 is inserted. As a result, even in a case where inner pressure of the space portion V of the TCC20 is larger than outside pressure (atmospheric pressure) and thus the oil seal 6 is moved towards the X2 side, the oil seal 6 comes to be in contact with portions (two portions arranged at a 180 degree interval therebetween) of the flange portion 98, the portions which protrude to the through hole 23a. Consequently, the oil seal 6 is restricted from falling off from the X2 side.

In addition, as illustrated in FIG. 8, a seal member 8 formed in a ring shape is attached to a surface of the flange portion 98 at the X1 side. The seal member 8 is fitted in the recessed portion 26a, which is at an opening of the through hole 26 at the X2, thereby to seal between the flange portion 98 of the fastening bolt 95 and the outer surface 21b of the TCC 20 in the vicinity of the through hole 26. Accordingly, the oil inside the engine main body 10 is prevented from leaking out towards the outer surface 21b of the TCC 20 from a gap between a cylindrical portion of the collar portion 7 and the through hole 26. The seal member 8 is an example of "a seal material" of the present invention. In addition, as illustrated in FIG. 2, the pair of through holes 26 are formed at positions that are away from the timing chain 4 so that the collar members 7 and the fastening bolts 95 which are inserted in the respective through holes 26 do not interfere with (not to be in contact with) the timing chain 4.

In addition, it is configured in such a manner that a certain clearance is provided also between an inner surface of the collar member 7 and an outer circumferential portion of the fastening bolt 95 in a state where the collar member 7 is inserted in the through hole 26. In this case, an inner diameter of the collar member 7 is set in such a manner that a size of the clearance portion between the collar member 7 and the fastening bolt 95 is equal to or smaller than an allowable value of a positional deviation of the seal lip 6a relative to the crankshaft 40. Accordingly, in the vicinity of the oil seal securing portion 23, a deformation (the thermal expansion and the thermal shrinkage) of the TCC 20 is less likely to occur, and a deviation of an axis of the seal lip 6a relative to the crankshaft 40 is also kept to be equal to or smaller than an allowable value. As a result, the oil (lubricant) inside the engine main body 10 is restricted from leaking from the seal lip 6a to the outside, and the oil seal 6 (the seal lip 6a) is restricted from abrading excessively.

When the TCC 20 is assembled, first, the flange portion 7b of the collar member 7 is fitted into the through hole 26 of the TCC 20 from a side of the inner surface 21a. At this time, the end surface 70b of the flange portion 7b at the X2 side, which serves as a stopper portion, is brought into contact with the inner surface 21a of the main body portion 21. Then, by applying the TCC 20 to the cylinder block 2, the flange portion 7a of the collar member 7 is inserted into the positioning recessed portions 12 of the cylinder block 2. At this time, the cylindrical portion which is at a distal end side (the X1 side) relative to the flange portion 7a remains in the middle of the cylindrical portion 12a of the positioning recessed portions 12 and is inserted therein without generating a gap, and the end surface 70a of the flange portion 7a at the X1 side, which serves as a stopper portion, is brought into contact with the surface 2b of the cylinder block 2. Because a distance between the flange portions 7a and 7b in the X direction is uniform among the collar members 7, the TCC 20 remains to be at a certain clearance distance H3 relative to the cylinder block 2 (refer to FIG. 7). Then, the fastening bolt 95 is inserted into the collar member 7 and the threaded portion 97 is screwed into the threaded hole 12b of the positioning recessed portion 12.

As described above, the portion of the main body portion 21 in the vicinity of the seal securing portion 23 of the TCC 20 made of resin is fastened to the cylinder block 2 accurately with the two fastening bolts 95. At this time, not only that the through hole 23a includes the positional accuracy relative to the crankshaft 40 in the Y-Z plane, but also that the main body portion 21 is restrained so that the positional deviation (the thermal expansion or the thermal shrinkage) does not occur to the portion in the vicinity of the oil seal securing portion 23 in an axial direction of the crankshaft 40 (the X direction). On the other hand, the attachment portions 22 corresponding to the edge portions of the body portion 21 are assembled on the engine main body 10 with the twelve pieces of shoulder bolts 90 in a manner that the attachment portions 22 can be positionally deviated relative to the engine main portion 10. That is, as illustrated in FIG. 2, while the main body portion 21 is restrained in the vicinity of the oil seal securing portion 23, the deformation of the body portion 21 is appropriately absorbed by the clearances S provided inside the respective through holes 22b (refer to FIG. 4) even in a case where the body portion 21 receives a thermal effect of the engine main body 10 (refer to FIG. 1) and then is thermally expands or thermally shrinks. Accordingly, no matter what environment of usage the engine 100 (refer to FIG. 1) is in, regardless of a start-up and stop of the engine 100, the attachment positional accuracy of the oil seal 6 relative to the crankshaft 40 is maintained, and the body portion 21 does not swell or is not dented in the axial direction of the crankshaft 40 (the X direction) even at a portion that is away from the crankshaft 40, and a state in which the body portion 21 is assembled appropriately by the twelve shoulder bolts 90 and the seal member 50 arranged at an inner side relative to the shoulder bolts 90 (a cover attachment structure) is maintained.

In addition, the cylinder block 2 includes a side end portion 10a (refer to FIG. 1) formed in a rectangular shape of which the long-side direction is the Z direction and of which a short-side direction is the Y direction, and opening towards the TCC 20. In addition, the attachment section 15 of the side end portion 10a includes the seal surface 10c (refer to FIG. 1) which is formed from a side of the head cover 60 to the crank case 3 so as to include a coplanar configuration and a circumferential shape.

Figure 11:
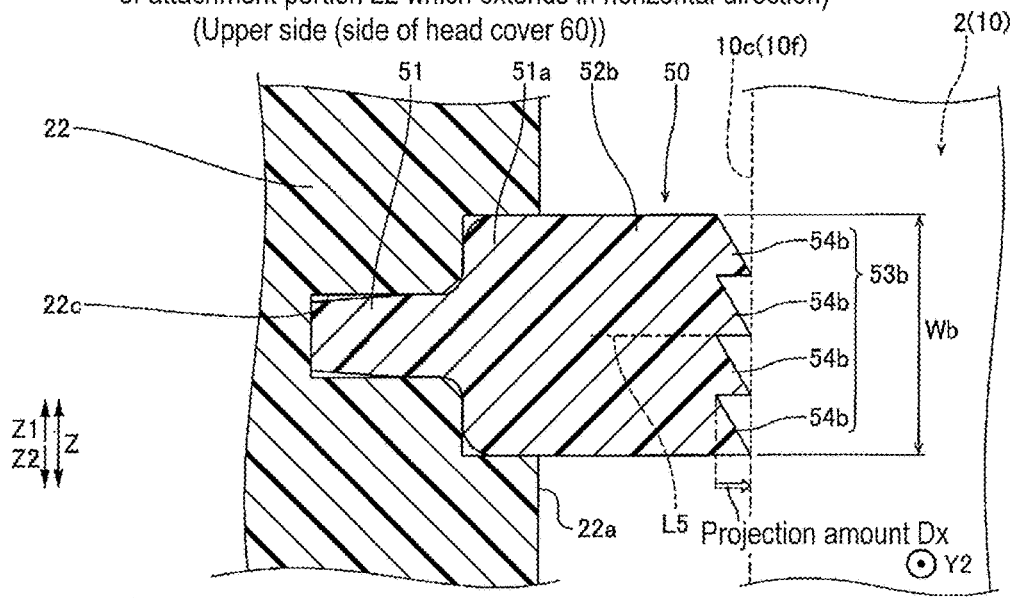
FIG. 11 is a view for explaining a cross-sectional configuration of the seal member used in the engine according to the first embodiment of the present invention.

In the first embodiment, as illustrated in FIGS. 10 and 11, the seal member 50 is formed in an annular shape in a seamless manner. The seal member 50 is formed by a base portion 51 including two-staged widths, a seal portion 52a (refer to FIG. 10) and a seal portion 52b (refer to FIG. 11). The seal portion 52a is formed by integrally extending a wide portion 51a of the base portion 51. Each of the FIGS. 10 and 11 illustrates a cross-sectional configuration of the seal member 50 in a normal state in which the seal member 50 is not pressed against towards the cylinder block 2.

The seal member 50 includes different cross-sectional configurations between in a long-side direction (an upper and lower direction of the side end portion 10a (refer to FIG. 1)) and in a short-side direction (a horizontal direction) that is orthogonal to the long-side direction. As illustrated in FIG. 10, as the cross-sectional configuration in the long-side direction, the seal portion 52a including a distal end portion 53a formed by a flat surface is connected to the wide portion 51a of the base portion 51. In addition, a portion protruding beyond the attachment surface 22a is the seal portion 52a, and the seal portion 52a includes a width Wa. In FIG. 3, the seal portion 52a is a portion which is to be attached to a region P of the attachment surface 22a, the region P which extends in the upper and lower direction at each of the Y1 side and the Y2 side. FIG. 10 illustrates a cross-sectional configuration taken along a line 160-160 in a case where the seal member 50 is attached to the groove portions 22c of the regions P extending in the upper and lower direction in FIG. 3.

In contrast, as the cross-sectional configuration of the seal member 50 in the short-side direction (the horizontal direction of the side end portion 10a (refer to FIG. 1)), the seal portion 52b connected to the wide portion 51a of the base portion 51 includes a distal end portion 53b as illustrated in FIG. 11. The distal end portion 53b includes a protrusion-and-recess configuration in which a saw-tooth configuration is repeated constantly for plural times (four times) from an end portion at an upper side (the Z1 side) to an end portion at a lower side (the Z2 side) in a width direction (in this case, the Z direction). Here, the distal end portion 53b is formed in the protrusion-and-recess configuration including the saw-tooth configurations (a shape of four-tiered eaves) that are asymmetric in the Z direction relative to a vertical line L5 (the long dashed short dashed line) to the seal surface 10c of the engine main body 10 (drawn with the long dashed double-short dashed line). In this case, each of saw-tooth portions 54b forming the distal end portion 53b is formed in a cross-sectional configuration in which a projection amount Dx projecting to the side of the seal surface 10c in the X1 direction increases towards a lower end portion of the seal portion 52b, that is, towards the Z2 side. In addition, the distal end portion 53b of the seal portion 52b is constituted by the four ridges of saw-tooth portions 54b that are parallel with one another in the horizontal direction and are extended continually while maintaining the cross-sectional configuration illustrated in FIG. 11. In addition, the seal portion 52b includes a width Wb.

In FIG. 3, the seal portion 52b is a portion which is to be attached to a region Q of the attachment surface 22a of the TCC 20, the region Q which extends in the horizontal direction at each of the Z1 side and the Z2 side. FIG. 11 illustrates a cross-sectional configuration taken along a line 170-170 in a case where the seal member 50 is attached to the groove portions 22c of the regions Q extending in the horizontal direction in FIG. 3. In regard to the four-tiered saw-tooth portions 54b, "the protrusion-and-recess configuration including the saw-tooth configuration" of the distal end portion 53b may be set in accordance with the self-weight of the TCC 20. That is, the protrusion-and-recess configuration including the saw-tooth configuration can be a configuration that can restrict the TCC 20 from moving unintentionally in a downward direction of gravitational force by utilizing a reaction force in an upper direction which is received by the seal surface 10c, or can be a configuration that can set a size of such a reaction force.

The seal member 50, as a whole, is in contact with the circumferential seal surface 10c of the engine main body 10 facing the TCC 20 via the seal portion 52a (refer to FIG. 10) protruding from the circumferential attachment surface 22a and the seal portion 52b (refer to FIG. 11). That is, in association with the fastening by the shoulder bolts 90, the seal member 50 is in close contact with the portion of the groove portion 22c and with the seal surface 10c in a state where each of the seal portion 52a including the distal end portion 53a and the seal portion 52b including the distal end portion 53b is squashed in the X1 direction. In this case, as illustrated in FIG. 10, the seal portion 52a arranged so as to correspond to the region P of the attachment portion 22 (refer to FIG. 3) is in contact with a seal region 10e of the seal surface 10c extending in the upper and lower direction. In addition, as illustrated in FIG. 11, the seal portion 52b arranged so as to correspond to the region Q of the attachment portion 22 (refer to FIG. 3) is in contact with a seal region 10f of the seal surface 10c extending in the horizontal direction.

Here, in the first embodiment, as illustrated in FIG. 12, it is configured in such a manner that the seal portion 52b including the four saw-tooth portions 54b is squashed in the X1 direction, and accordingly the seal portion 52b is in contact with the seal surface 10c (the seal region 10f) in a state where the seal portion 52b is deformed into a configuration where a component of an upward direction reaction force, out of the reaction force received from the seal surface 10c of the engine main body 10, is larger than a component of a downward direction reaction force, out of the reaction force received from the seal surface 10c. The downward direction is a direction in which gravity force works, and the upward direction is a direction opposite to the direction in which the gravity force works. In other words, in a case where the portion of the seal portion 52b is elastically deformed, the seal member 50 is configured to remain in the shape (the shape illustrated in FIG. 12) where the component of the reaction force towards the upper direction which is received by the seal surface 10c is larger than the component of the reaction force towards the lower direction which is received by the seal surface 10c, due to the deformation of the distal end portion 53b of the seal portion 52b. Therefore, in a state where the TCC 20 is fixed to the engine main body 10 via the portion of the seal member 50 extended in the short-side direction (the horizontal direction) while the clearance distance H1 is provided between the TCC 20 and the engine main body 10, the seal portion 52 is deformed by a fastening force of the shoulder bolts 90. At this time, the seal portion 52b is in (close) contact with the seal region 10f of the seal surface 10c, while maintaining the deformed configuration, in a state where the force by which the distal end portion 53b of the seal portion 52 always tries to deviate in the upper direction (the Z1 direction), but not in the lower direction, works in an inside.

In addition, in a state where the TCC 20 is fastened to the engine main body 10 at a fixed dimension with the use of the shoulder bolts 90 via the seal member 50 (refer to FIG. 12), when the engine 100 is started, the engine main body 10 vibrates in small motions. At this time, the TCC 20 is in a state of rising from the engine main body 10 via the seal member 50 by the clearance distance H1, and a position of the TCC 20 relative to the engine main body 10 in the X direction is periodically changed (increased and decreased) with a slight vibration amplitude (amplitude of vibration) in association with the elastic deformation of the seal member 50. That is, as illustrated in FIG. 13, a vibration (a fine reciprocating motion) of the TCC 20 in the X direction repetitively increases and decreases a force that pushes and squashes the seal portion 52b in the X1 direction. The seal portion 52b is repetitively deformed between a state C1 corresponding to the instant when the clearance distance H1 becomes relatively large and a state C2 corresponding to the instant when the clearance distance H1 becomes relatively small relative to the state C1. During this, the seal portion 52b receives the reaction force from the seal surface 10c, the reaction force which repeats the increment and decrement periodically.

Also in this case, the force included in the reaction force received from the seal surface 10c, the force whose reaction force component towards the upper direction (the Z1 direction) is larger than the reaction force component towards the lower direction (the Z2 direction) acts to the inside of the seal portion 52b because the four saw-tooth portions 54b provided at the distal end portion 53b are formed in the protrusion-and-recess configuration including the saw-tooth configuration that is asymmetric in the Z direction relative to the vertical line L5 (the long dashed short dashed line) of the seal surface 10c. Accordingly, even when the TCC 20 vibrates in small motions, the force where the distal end portion 53b (the four saw-tooth portions 54b) tries to deviate in the upper direction is always acting to the inside of the squashed seal portion 52b while repeating the increment and the decrement. In other words, the portion of the seal member 50 extended in the short-side direction (the horizontal direction) remains in contact with the seal region 10*f* of the seal surface 10*c*, while the seal portion 52*b* always tries to move up in the upper direction and maintains the dynamic deformation of the configuration on the seal surface 10*c*, and the seal portion 52*b* does not at least deviate or does not slide down in the lower direction from the seal surface 10*c*, due to the small vibrations of the TCC 20.

As stated above, regardless of whether the engine 100 is being started or stopped, the seal portion 52*b* of the seal member 50 which is extended in the short-side direction (the horizontal direction) is in contact with the seal region 10*f* of the seal surface 10*c* in a state where the seal portion 52*b* includes the potential force therein, the potential force which tries to deviate in the upper direction from the corresponding portion of the seal surface 10*c* extended in the horizontal direction.

At the seal portion 52*a* including the distal end portion 53*a* formed by the flat surface (refer to FIG. 10), the force deviating in the upper direction (the Z1 direction) which exists inside the seal portion 52*b* (refer to FIG. 12) does not act to the inside of the seal portion 52*a* even when the seal portion 52*a* is deformed by the fastening force of the shoulder bolts 90 (refer to FIG. 1). Even in a case where the seal portion 52*a* is positionally deviated downwardly from the seal region 10*e* of the seal surface 10*c* extended in the upper and lower direction, a sealing property is maintained because the direction in which the seal portion 52*a* is displaced and the direction in which the seal surface 10*c* is extended are same as each other. In addition, the seal portion 52*a* and the seal portion 52*b* are connected to each other in the seamless manner at corner portions of the seal member 50. In addition, originally, the seal portion 52*a* formed in the flat surface configuration is formed to include such a protruding amount (in the X direction) that is squashed in the X1 direction with the clearance distance H1 left, similarly to the state in which the seal portion 52*b* is squashed in the X1 direction at the clearance distance H1. Accordingly, it is configured in a manner that the oil does not leak out also at the portions at which the respective seal portion 52*a* and the seal portion 52*b* are joined to each other.

In addition, in the first embodiment, the width Wb (refer to FIG. 11) of the seal portion 52*b* that causes the force deviating in the upper direction to act to the inside of the seal portion 52*b* when the seal portion 52*b* is squashed in the X1 direction is configured to be larger than the width Wa (refer to FIG. 10) of the seal portion 52*a* that is not provided with the seal portion 52*b* and that does not need to cause the force deviating in the upper direction to act to the inside when being deformed (that is, Width Wb>Width Wa is established). This is because the distal end portion 53*b* of the seal portion 52*b* includes the saw-tooth portions 54 of which distal ends are pointed, and thus a contact area relative to the seal surface 10*c* is originally smaller than the distal end portion 53*a* formed by the flat surface. Accordingly, the seal portion 52*b* is formed to include the larger width Wb to ensure the contact area after the deformation (after being sealed).

In addition, in the first embodiment, as illustrated in FIG. 12, the TCC 20 is attached to the engine main body 10 with the use of the shoulder bolts 90 that can keep the clearance distance H1. Here, each shoulder bolt 90 includes the head portion 91 with which a tool (not shown) engages, the large diameter portion 92 for defining the clearance distance H1, and the threaded portion 93 of which the diameter is smaller than the diameter of the large diameter portion 92. When the shoulder bolt 90 is screwed into the screw hole 16 via the through hole 22*b*, the end surface of the stepped portion 94 between the large diameter portion 92 and the threaded portion 93 is brought into circumferentially contact with the attachment section 15 (the seal surface 10*c*). Accordingly, the fastened state at the fixed dimension, in which the height H2 of the large diameter portion 92 from the seal surface 10*c* to the bottom surface of the head portion 91 is uniquely defined, is established. The TCC 20 is secured in a state where the attachment portion 22 is off the engine main body 10 by the clearance distance H1 because the seal member 50 is sandwiched between the engine main body 10 and the TCC 20. The seal portion 52*b* of the seal member 50 is squashed in the X1 direction by a predetermined amount (an appropriate amount), and thus the seal member 50 pushes out the attachment portion 22 in the X2 direction and presses the attachment portion 22 against the bottom surface of the head portion 91. The configuration around the engine 100 and the TCC 20 according to the first embodiment is formed as described above.

In the first embodiment, the following effects can be obtained.

In the first embodiment, as described above, the pair of through holes 26, by which the TCC 20 is attached to the engine main body 10 with the use of the fastening bolts 95, are provided in the vicinity of the oil seal securing portion 23 (the through hole 23*a*) of the TCC 20 (the positions at which the center lines C2 of the through holes 26 are away from the inner surface 23*c* of the oil seal securing portion 23 by the length L3, respectively). Thus, even in a case where the TCC 20 is deformed due to, for example, the thermal strain (strain attributed to the thermal expansion or the thermal shrinkage), the TCC 20 can be restricted from being deformed in the vicinity of the oil seal securing portion 23 since the through holes 26 arranged in the vicinity of the oil seal securing portion 23 are fastened to the engine main body 10 with the fastening bolts 95. Accordingly, the oil seal 6 (the seal lip 6*a*) can be restricted from being positionally deviated due to the deformation of the TCC 20, thereby assuring a sufficient sealing performance provided by the oil seal 6. In addition, the seal lip 6*a* can be restricted from abrading excessively.

In addition, in the first embodiment, the seal member 8 sealing between the flange portion 98 of the fastening bolt 95 and the outer surface 21*b* of the TCC 20 in the vicinity of the through holes 26. Accordingly, the seal member 8 can restrict the leakage of the engine oil from between the collar member 7 and the fastening bolt 95 which are arranged in the vicinity of the oil seal securing portion 23, and the through hole 26.

In addition, in the first embodiment, the through holes 26 are formed at the inner side (at the side of the oil seal securing portion 23) relative to the attachment portions 22. Thus, unlike a case where the attachment portions to be attached to the engine main body 10 are formed only at the attachment portions 22 that are away from the oil seal securing portion 23, the through holes 26 are arranged in the vicinity of the oil seal securing portion 23. Consequently, the deformation of the TCC 20 at the oil seal securing portion 23 can be restricted easily.

In addition, in the first embodiment, the through holes 26 are provided, as the pair, to sandwich the oil seal securing portion 23 therebetween in the Z direction. Thus, the vicinity of the oil seal securing portion 23 can be secured (fastened) more strongly, and accordingly the TCC 20 can be further restricted from being deformed in the vicinity of the oil seal securing portion 23. As a result, the oil seal 6 can be restricted from positionally deviating, thereby assuring the sealing performance more reliably.

In addition, in the first embodiment, the plural through holes 22b into which the respective shoulder bolts 90 are inserted are provided, and the through holes 26 are arranged in the vicinity of the oil seal securing portion 23 at an inner side relative to the through holes 22b arranged at the attachment portions 22 of the TCC 20. Accordingly, the TCC 20 can be fixed to the engine main body 10 more strongly not only at the through holes 26 but also at the through holes 22b. In addition, because the TCC 20 is attached to the engine main body 10 at the through holes 22b, the positional deviation can be restricted from occurring not only in the vicinity of the oil seal securing portion 23 of the TCC 20 but also at the attachment portion 22, even in a case where the TCC 20 is deformed.

In addition, in the first embodiment, the flange portion 98 of the fastening bolt 95 is provided to project towards the crankshaft 40 so as to partly cover, from the X2 side, the portion of the oil seal securing portion 23 in which the oil seal 6 is inserted. Thus, the flange portion 98 of the fastening bolt 95 is given a function of restricting the oil seal 6 from dropping off from the X2 side at which the oil seal 6 is inserted into the oil seal securing portion 23. Accordingly, there is no need to separately provide a dedicated oil seal fall-off prevention member, thereby simplifying the configuration.

In addition, in the first embodiment, the TCC 20 is formed by the polyamide resin of which the linear expansion coefficient is larger than the linear expansion coefficient of the aluminum alloy forming the engine main body 10. Accordingly, even in a case where the TCC 20 is easily deformed by the thermal strain due to that the linear expansion coefficient of the TCC 20 is larger than the linear expansion coefficient of the engine main body 10, the TCC 20 can be restricted from being deformed in the vicinity of the oil seal securing portion 23 because the through holes 26 arranged in the vicinity of the oil seal securing portion 23 and fastened to the engine main body 10 with the fastening bolts 95 are provided. Consequently, the positional displacement of the oil seal 6 that is caused by the deformation of the TCC 20 can be restricted from occurring.

In addition, in the first embodiment, the collar member 7 is provided. The collar member 7 includes the outer circumferential portion 7c which is integrally provided with the pair of flange portions 7a and 7b circumferentially protruding in the direction away from the center line C2 of the through hole 26, and the fastening bolt 95 is inserted in the collar member 7. Thus, by inserting the threaded portion 97 of the fastening bolt 95 into the collar member 7 provided with the flange portions 7a and 7b and attaching the TCC 20 to the engine main body 10, the positioning, in the vicinity of the oil seal securing portion 23, of the TCC 20 relative to the engine main body 10 in the direction in which the crankshaft 40 is extended can be conducted easily.

In addition, in the first embodiment, the fastening bolt 95 is fastened in a state where the flange portion 7b is in contact with the inner surface 21a of the main body portion 21 of the TCC 20. Accordingly, the positioning, in the vicinity of the oil seal securing portion 23, of the TCC 20 relative to the engine main body 10 in the direction in which the crankshaft 40 is extended can be conducted more easily.

In addition, in the first embodiment, by causing the flange portion 7b to be in contact with the inner surface 21a and causing the flange portion 7a to be in contact with the surface 2b of the cylinder block 2, the positioning, in the vicinity of the oil seal securing portion 23, of the TCC 20 relative to the engine main body 10 in the X direction can be completed only with the collar member 7. That is, there is no need to consider tolerance of other members (the engine main body 10 and the TCC 20) other than the collar member 7, thereby enhancing accuracy in the positioning. Accordingly, also the positioning in the X direction of the oil seal 6 secured at the oil seal securing portion 23 of the TCC 20 can be conducted accurately.

In addition, in the first embodiment, it is configured in such a manner that the positioning of the TCC 20 relative to the engine main body 10 is conducted by inserting the end portion 71 at the X1 side of the collar member 7 into the positioning recessed portion 12 and inserting the end portion 72 at the X2 side of the collar member 7 into the through hole 26 of the TCC 20. Accordingly, the oil seal 6 secured by the oil seal securing portion 23 can be reliably arranged at a predetermined position in the in-plane direction that is orthogonal to the crankshaft 40.

In addition, in the first embodiment, the fastening bolt 95 and the collar member 7 are separately used for the fastening and the positioning, respectively, and therefore there is no need to perform the fastening and the positioning at the same time unlike a case where the fastening bolt 95 is used not only for the fastening but also for the positioning. Accordingly, the positioning of the TCC 20 can be conducted easily.

In addition, in the first embodiment, the size of the inner diameter of the through hole 22b of the TCC 20 is set in such a manner that the clearance S (the width Sa or the width Sb), which includes the size that can absorb the planar positional deviation of the through hole 22b caused by the thermal expansion (the thermal shrinkage) of the TCC 20, is generated between the inner surface 22e of the through hole 22b and the outer side surface 92a of the large diameter portion 92 of the shoulder bolt 90 inserted in the through hole 22. Thus, even in a case where the TCC 20 is subject to the thermal effect of the engine main body 10 in a state where the TCC 20 made of the polyamide resin is attached to the engine main body 10 via the seal member 50, the deformation (the thermal expansion and the thermal shrinkage) of the TCC 20, which is raised by the seal member 50 to be floated, is released by utilizing the clearances S provided between the inner surfaces 22e of the through holes 22b and the outer side surfaces 92a of the large diameter portions 92 of the shoulder bolts 90 inserted in the respective through holes 22b. Therefore, unlike a case where the inner diameter of the through hole 22b is set out of consideration of the above-described clearance S and thus a neighborhood of the through hole 22b is completely restrained by an axial force of the shoulder bolt 90, the deformation of the TCC 20 is absorbed around the through hole 22b by the clearance S. Accordingly, a component deformation force is not concentrated in the vicinity of the oil seal securing portion 23 of the TCC 20. Consequently, even in case where the TCC 20 is subject to the thermal effect of the engine main body 10 and is deformed, the vicinity of the oil seal securing portion 23 is not easily deformed, and accordingly the positional deviation of the oil seal 6 relative to the crankshaft 40 is restricted, thereby restricting the oil from leaking out.

In addition, in the first embodiment, the seal member 50 is arranged between the TCC 20 and the engine main body 10, and thus the vibrations of the engine main body 10 are not transmitted directly to the TCC 20 made of the resin to become a source of noise and a source of vibration. In addition, it is reliably prevented that the oil inside the engine main body 10 leaks to the outside from the gap between the TCC 20 raised by the seal member 50 and the engine main body 10.

In addition, in the first embodiment, the size of the inner diameter d1 of each of the plural through holes 22b is set in such a manner that the clearance S having the size that is equal to or larger than the amount of the positional deviation of the through hole 22b due to at least one of the thermal expansion and the thermal shrinkage of the resin-made TCC 20 is generated between the inner surface 22e of the through hole 22b and the outer side surface 92a of the large diameter portion 92 of the shoulder bolt 90 inserted in the through hole 22b. Accordingly, by using the clearance S provided between the inner surface 22e of the through hole 22b and the outer side surface 92a of the large diameter portion 92 of the shoulder bolt 90, the positional deviation of the through hole 22b associated with the deformation (the thermal expansion and the thermal shrinkage) of the TCC 20 can be reliably absorbed. Consequently, it is reliably prevented that the deformation is generated (concentrated) in the vicinity of the oil seal securing portion 23 of the TCC 20.

In addition, in the first embodiment, the plural through holes 22b are provided along the attachment portions 22 of the TCC 20. The inner diameter d1 of each of the through holes 22b is set in such a manner that the clearance S becomes larger as the distance from the oil seal 6 to the respective through hole 22b increases. Thus, even in a case where the amount of the deformation (warpage) of the TCC 20 increases in association with the increment of the distance from the oil seal 6, the positional deviation associated with the deformation (the thermal expansion and the thermal shrinkage) of the TCC 20 can be appropriately absorbed at each of the through holes 22b because the inner diameter d1 of the through hole 22b is set so that the size of the clearance S is adjusted depending on the increment of the amount of the deformation of the TCC 20 (the amount of the positional deviation of the through hole 22). In consequence, it can be reliably prevented that the deformation is generated in the vicinity of the oil seal securing portion 23 of the TCC 20.

In addition, in the first embodiment, the outer diameter D3 of the flange-shaped portion 91a of the shoulder bolt 90 is set to be equal to or larger than twice the difference between the inner diameter d1 of the through hole 22b of the TCC20 and a half of the size of the outer diameter D2 of the large diameter portion 92 of the shoulder bolt 90 (D3≥(d7−D2/2). Accordingly, even in a case where the positional deviation occurs to the through hole 22b in association with the deformation (the thermal expansion and the thermal shrinkage) of the TCC 20 and the shoulder bolt 90 relatively comes into contact with the vicinity of the inner surface 22e at one side of the through hole 22b, the flange-shaped portion 91a of the shoulder bolt 90 reliably straddles the clearance S (the maximum clearance S) between the shoulder bolt 90 and the inner surface 22e at the opposite side of the through hole 22b and comes into contact with the upper surface 22d of the TCC 20 (the attachment portion 22), because the outer diameter D3 of the flange-shaped portion 91a of the shoulder bolt 90 includes the above-described dimensional relationship relative to the through hole 22b and relative to the large diameter portion 92 of the shoulder bolt 90. Accordingly, it is prevented that the flange-shaped portion 91a of the shoulder bolt 90 falls into inside the through hole 22b. Consequently, even in a state where the through hole 22b is positionally deviated, the TCC 20 made of resin can be attached to the engine main body 10 reliably without sacrificing the fastening force of the shoulder bolt 90.

In addition, in the first embodiment, the clearance S includes the clearance S at the side of the direction of an arrow A that becomes farther away from the crankshaft 40. In this case, the clearance S can absorb the positional deviation of the through hole 22b in the direction of the arrow A that becomes away from the crankshaft 40 in association with the resin-made TCC 20 thermally expands. There is another case where the clearance S includes the clearance S at the side of the direction of an arrow B that becomes closer to the crankshaft 40. In this case, the clearance S can absorb the positional deviation of the through hole 22b in the direction of the arrow B that becomes closer to the crankshaft 40 in association with the resin-made TCC 20 thermally shrinks. Accordingly, in both cases where the TCC 20 thermally expands and the TCC 20 thermally shrinks as a consequence of the thermal effect of the engine main body 10, the deformation of the TCC 20 can be released appropriately by utilizing the clearance S which can absorb the positional deviation of the through hole 22b towards the direction of the arrow A in which the through hole 22b becomes farther from the crankshaft 40 due to the thermal expansion or by utilizing the clearance S which can absorb the positional deviation of the through hole 22b towards the direction of the arrow B in which the through hole 22b becomes closer to the crankshaft 40 due to the thermal shrinkage.

In addition, in the first embodiment, the engine main body 10 includes the screw holes 16 which are formed at the positions corresponding to the respective through holes 22b of the TCC 20 and into which the respective shoulder bolts 90 are inserted. The six through holes 22b are arranged at each of the right side and the left side of the TCC 20. The TCC 20 is configured to be mounted onto the engine main body 10 with the shoulder bolts 90 in a state where the center (the axis) of each of the shoulder bolts 90 matches the center of the corresponding screw hole 16. Accordingly, in a state where the shoulder bolts 90 are screwed into the respective screw holes 16 and the TCC 20 is mounted on the engine main body 10, the clearance S between the shoulder bolt 90 and the inner surface 22e of the through hole 22b can be easily generated around the outer side surface 92a of the large diameter portion 92 of the shoulder bolt 90. Consequently, the deformation of the TCC 20 which is attributed to the thermal expansion or the thermal shrinkage of the TCC 20 can be reliably released with the use of the clearance S.

In addition, in the first embodiment, the shoulder bolt 90 includes the threaded portion 93 and the large diameter portion 92 of which the outer diameter is larger than the threaded portion 93. The attachment section 15 of the engine main body 10 includes the screw holes 16 formed at the positions corresponding to the respective plural through holes 22b of the TCC 20. It is configured in such a manner that the clearance S of which the size can absorb the positional deviation of the through hole 22b due to at least one of the thermal expansion or the thermal shrinkage of the TCC 20 is generated between the outer side surface 92a of the through hole 22b and the outer side surface 92a of the large diameter portion 92 of the shoulder bolt 90 in a state where the threaded portion 93 of the shoulder bolt 90 is screwed into the screw hole 16. Accordingly, the fastening force of the TCC 20 relative to the engine main body 10 in a state where the threaded portion 93 of the shoulder bolt 90 is screwed into the screw hole 16 of the engine main body 10 with the seal member 50 interposed is obtained. On the other hand, the clearance S that can absorb the positional deviation of the through hole 22b is reliably assured also between the large diameter portion 92 formed by the flat outer side surface 92a including no thread groove and the inner surface 22e of the through hole 22b, along a depth direction of the through hole 22b (the X direction).

In addition, in the first embodiment, the seal member 50 includes the seal portion 52a and the seal portion 52b which are in contact with the seal surface 10c of the engine main body 10. The distal end portion 53b of the seal portion 52b is configured in the configuration (the configuration illustrated in FIG. 12) where the component of the reaction force which is included in the reaction force received from the seal surface 10c and acts in the upward direction opposite to the downward direction in which the gravity works is larger than the component of the reaction force acting in the downward direction in which the gravity works. Accordingly, even in a case where an opening portion formed at a vertical surface (the side end portion 10a) extending in the upper and lower direction of the engine main body 10 is closed with the TCC 20 from a lateral side in a manner that the TCC 20 is made to face the opening portion in the horizontal direction, the seal portion 52b is prevented from deviating and moving in the downward direction of gravitational force even at a portion (the seal region 10f extended in the horizontal direction) of the annular-shaped seal surface 10c at which the seal member 50 is likely to deviate and thereby is likely to decrease the sealing performance due to the vibrations of the engine main body 10 and/or the own weight of the TCC 20. This is because the seal member 50 includes the seal portion 52b formed in the configuration where the component of the reaction force, out of the reaction force received from the seal surface 10c of the engine main body 10, which acts in the upward direction is larger than the component of the reaction force, out of the reaction force received from the seal surface 10c of the engine main body 10, which acts in the downward direction in which the gravity works. That is, the seal portion 52b remains to be arranged at a position which maintains the sealing performance relative to the seal surface 10c of the engine main body 10. Consequently, the sealing performance can be sufficiently assured even in a case where the TCC 20 is attached to the engine main body 10 in a state where the TCC 20 is made to face the engine main body 10 in the horizontal direction.

In addition, in the first embodiment, the distal end portion 53b of the seal portion 52b is configured to be deformed into the configuration (the configuration illustrated in FIG. 12) where the component of the reaction force acting in the upward direction, out of the reaction force received from the seal surface 10c of the engine main body 10, is larger than the component of the downward reaction force acting in the downward direction, in a case where the seal member 50 is elastically deformed in a state where the TCC 20 is attached to the lateral side of the engine main body 10 via the seal member 50. Thus, when the seal member 50 is pressed and squashed in the X direction while being elastically deformed on the seal surface 10c, the seal portion 52b can be deformed so that, the component of the reaction force acting in the upward direction which is received from the seal surface 10c is larger than the component of the downward reaction force acting in the downward direction. Consequently, the seal portion 52b can be easily prevented from being deviated and moved in the downward direction of gravitational force (the direction of the arrow Z2).

Figure 14:
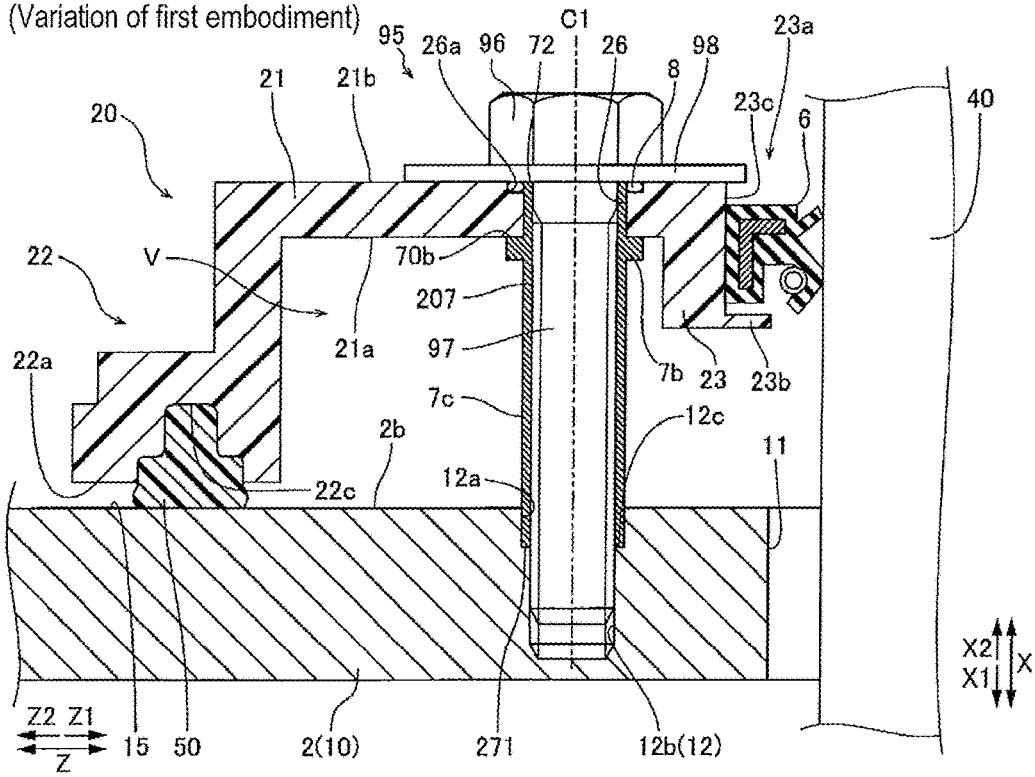
FIG. 14 is an enlarged cross-sectional view illustrating a vicinity of a through hole, in an enlarged manner, of a timing chain cover of an engine according to a variation of the first embodiment of the present invention.

(Variation of the first embodiment) Next, a variation of the first embodiment will be described with reference to FIG. 14. As illustrated in FIG. 14, a collar member 207 of the variation of the first embodiment is integrally formed with the flange 7b at the X2 side, while the collar member 207 is not formed with the flange portion at the X1 side. In addition, an end portion 271 of the collar member 207 at the X1 side is configured to be in contact with the stepped portion 12c of the positioning recessed portions 12 of the engine main body 10. Accordingly, it is configured in such a manner that the end portion 271 is in contact with the stepped portion 12c and the flange portion 7b is in contact with the inner surface 21a of the TCC 20, and thus the positioning of the TCC 20 relative to the engine main body 10 in the direction in which the crankshaft 40 is extended (the X direction) is conducted.

Second Embodiment

Next, a second embodiment will be described with reference to FIGS. 15 to 28. In the second embodiment, the inner diameters d1 of all through holes 222b are set to be identical to one another, while a TCC 220 is assembled with the use of three kinds of shoulder bolts 201 to 203 including respective shank portions 291 to 293 of which outer diameters are different from one another. The TCC 220 is an example of "the cover member" of the present invention. The shoulder bolts 201 to 203 are an example of "the second fastening member" of the present invention.

Figure 15:
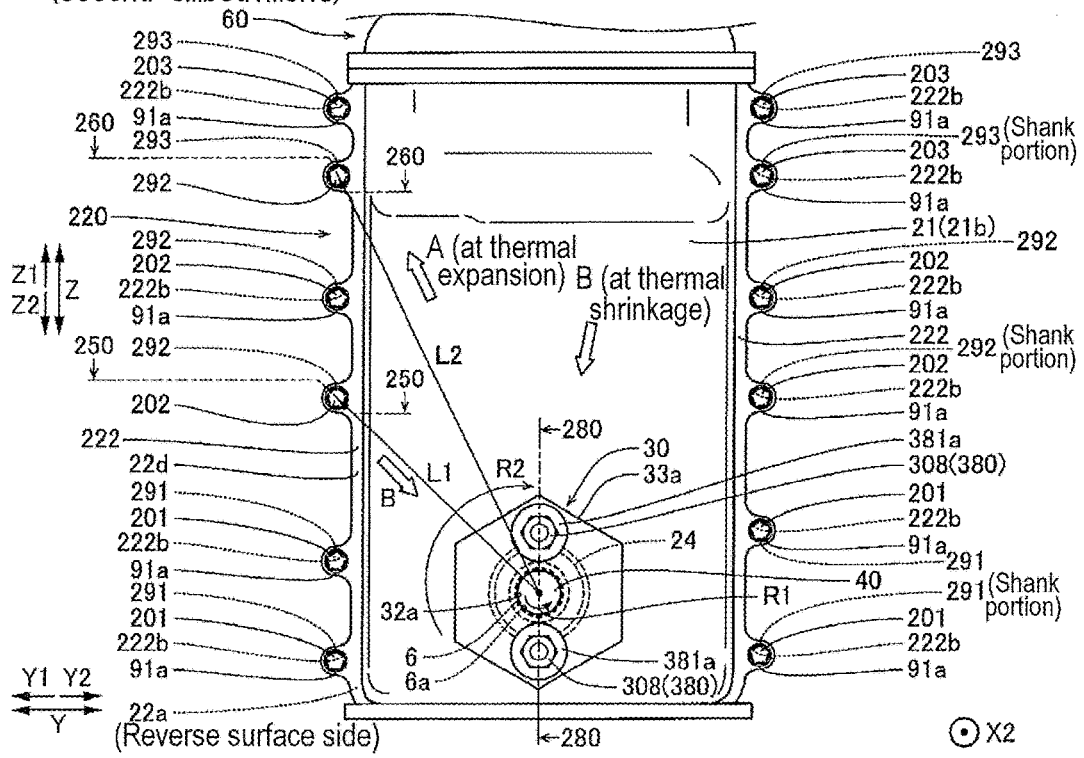
FIG. 15 is a lateral view viewing an engine according to a second embodiment of the present invention from a side at which a timing chain cover is attached.

At the engine according to the second embodiment, as illustrated in FIG. 15, the TCC 220 is assembled onto a lateral end portion of the engine main body 10 (refer to FIG. 16) via the seal member 50 (refer to FIG. 16) in a state where the TCC 220 is off the engine main body 10. The TCC 220 includes an attachment portion 222, and all the through holes 222b include the diameter d1 of the unified size. The TCC 220 is configured to be fixedly attached to the engine main body 10 (refer to FIG. 16) with the use of the shoulder bolts 201 to 203 including the respective shank portions 291 to 293 (the broken lines) of which the outer diameters are different from one another.

Figure 16:
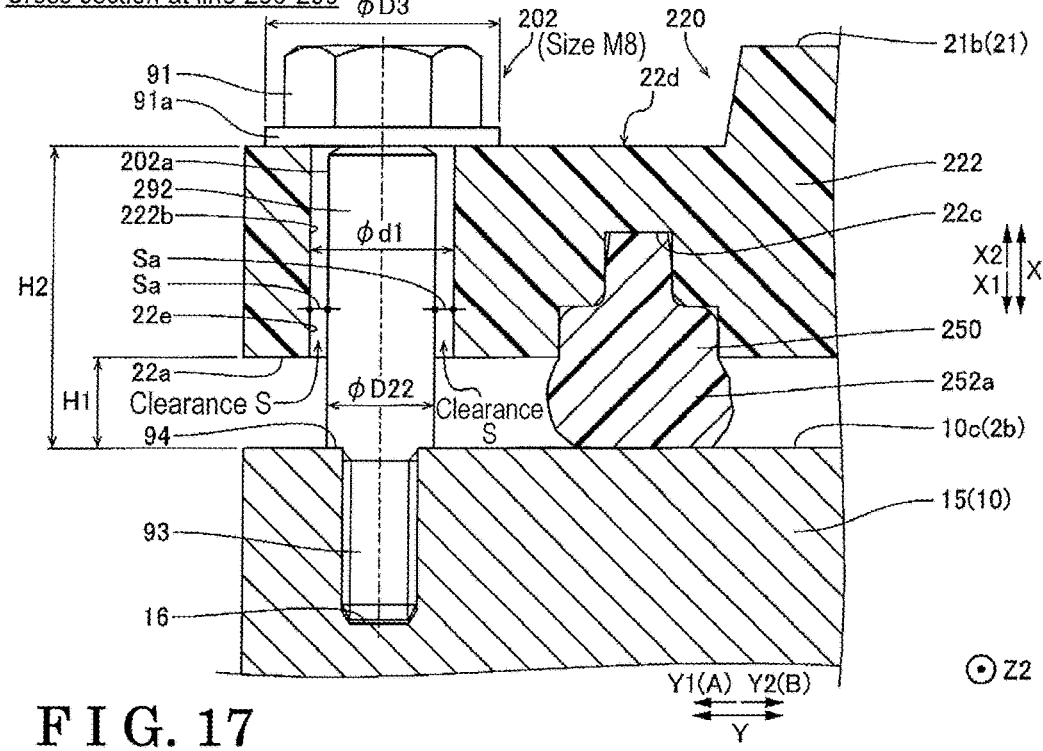
FIG. 16 is a cross-sectional view taken along line 250-250 in FIG. 15.
Figure 17:
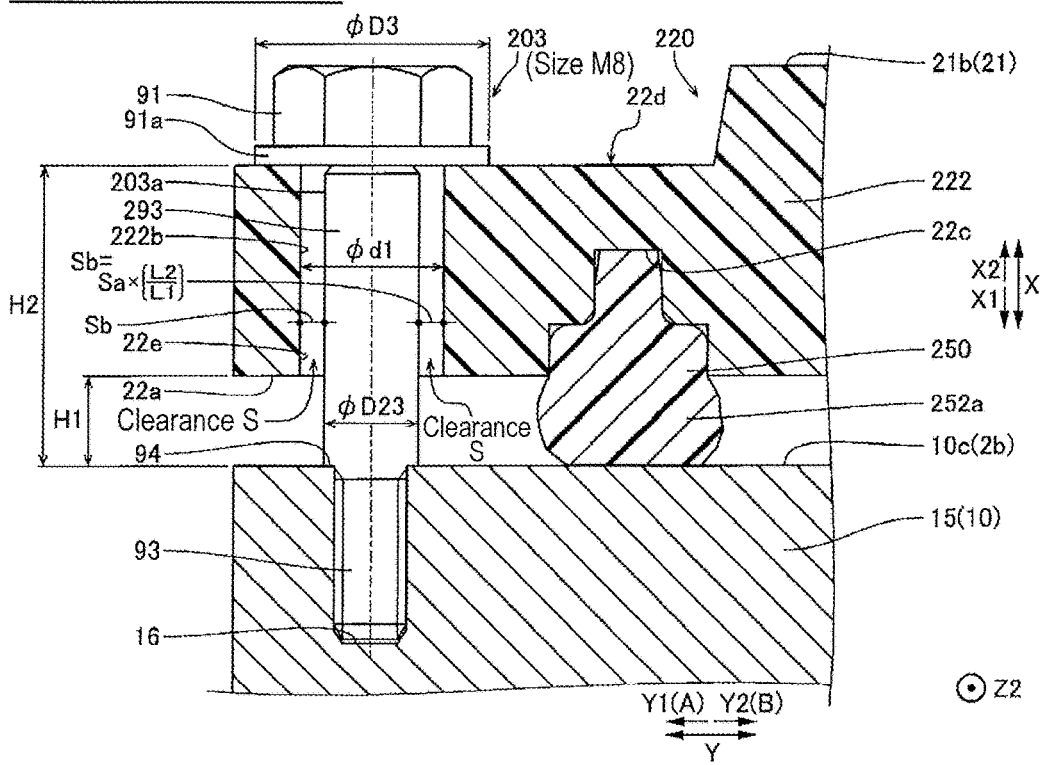
FIG. 17 is a cross-sectional view taken along line 260-260 in FIG. 15.

Specifically, nominal of the thread of each of the shoulder bolts 201 to 203 is "M8" size. On the other hand, the respective outer diameters of the shank portion 291 of the shoulder bolt 201, the shank portion 292 of the shoulder bolt 202 and the shank portion 293 of the shoulder bolt 203 are set to be smaller in a step-by-step manner in the mentioned order. The shoulder bolt 201 including the thickest shank portion 291 is inserted in the through hole 222b which is positioned relatively close to the oil seal 6. The shoulder bolt 202 including the shank portion 292 of a medium thickness and the shoulder bolt 203 including the thinnest shank portion 293 are inserted in the through holes 222b which are positioned relatively far from the oil seal 6, depending on how far the through holes 222b are from the oil seal 6. Accordingly, at the through hole 222b arranged at the distance L1 that is relatively close to the oil seal 6 (refer to FIG. 15), the clearance S between the inner surface 22e and an outer side surface 202a of the shank portion 292 of the shoulder bolt 202 is set at the width Sa as illustrated in FIG. 16. In contrast, at the through hole 222b arranged at the distance L2 that is relatively far from the oil seal 6 (refer to FIG. 15), the clearance S between the inner surface 22e and an outer side surface 203a of the shank portion 293 of the shoulder bolt 203 is set at the width Sb as illustrated in FIG. 17.

Here, the shank portion 292 of the shoulder bolt 202 (refer to FIG. 16) includes an outer diameter D22 and the shank portion 293 of the shoulder bolt 203 (refer to FIG. 17) includes an outer diameter D23 (D22>D23). In addition, because each of the through holes 222b includes the inner diameter of a fixed value, there is a relationship that Width Sa (=Inner diameter d1−Outer diameter D22)<Width Sb (=Inner diameter d1−Outer diameter D23). At the through hole 222b in which the shoulder bolt 201 including the thickest shank portion 291 (refer to FIG. 15) is inserted, the clearance S including a smaller width than the width Sa (refer to FIG. 16) is provided, which is not shown.

Thus, in the second embodiment, by using the shoulder bolts 202 and 203 including the outer diameter D22 of the shank portion 292 and the diameter 23 of the shank portion 293, which differ from each other, the size of the clearance S (the width Sa or the width Sb) between the inner surface 22e of the through hole 222b and the outer side surface 202a (203a) of the shank portion 292 (293) of the shoulder bolt 202 (203) inserted in the through hole 222b is set at the size that can absorb the positional deviation of the attachment portion 222 which is caused by the thermal expansion/the thermal shrinkage of the TCC 220, depending on the distance from the oil seal 6 to the through hole 222b.

The sizes of the shank portions 291 to 293 of the fastening members that are inserted in the respective through holes 222b are varied in the three stages depending on the distance from the oil seal 6. Accordingly the clearance S having the size that can absorb the positional deviation of the attachment portion 222 which is caused by at least one of the thermal expansion and the thermal shrinkage of the TCC 220 is appropriately provided in the inner diameter d1 of the through hole 222b even though the inner diameter d1 of the through holes 222b is the fixed value.

Figure 18:
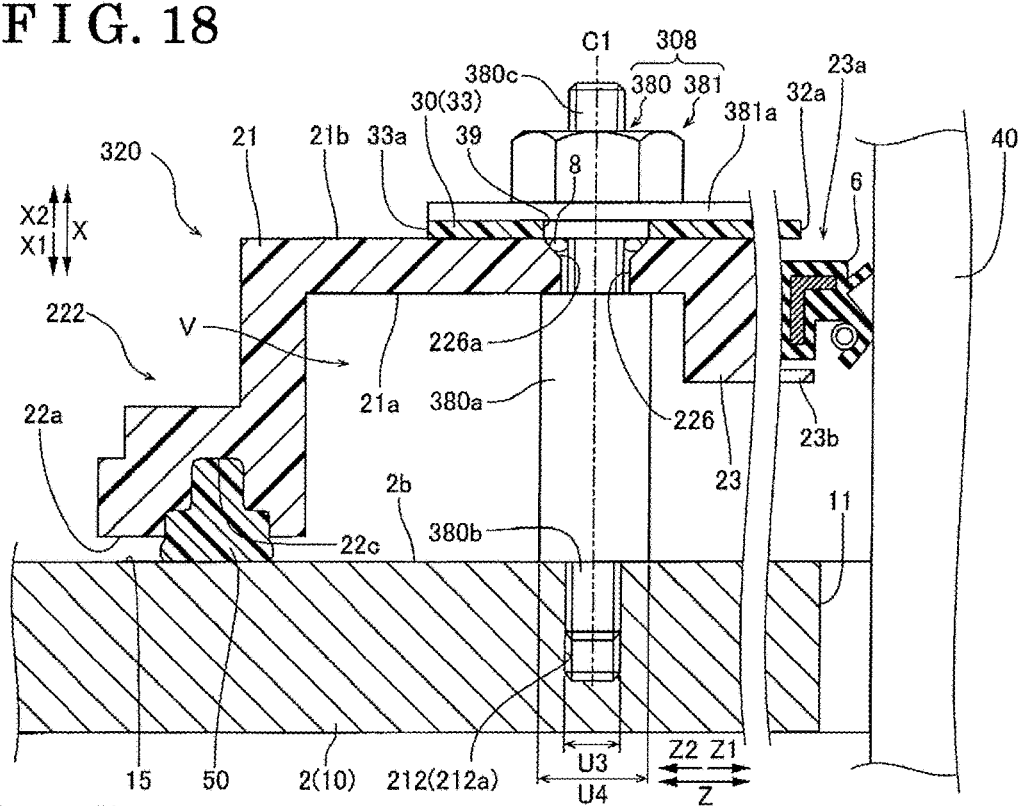
FIG. 18 is an enlarged cross-sectional view illustrating a vicinity of a through hole, in an enlarged manner, of the timing chain cover of the engine according to the second embodiment of the present invention.

In addition, as illustrated in FIG. 18, a fastening member 308 including a stud bolt 380 and a flange nut 381 is used in the second embodiment. The stud bolt 380 includes a shank portion 380a that is not provided with a male thread, and threaded portions 380b and 380c each provided with a male thread. The threaded portions 380b and 380c are formed at the X1 side and at the X2 side, respectively, so as to sandwich the shank portion 380a from both sides in the X direction. The fastening member 308 is an example of "the first fastening member" of the present invention.

Each of the threaded portions 380b and 380c of the stud bolt 380 includes a substantially identical diameter of a thread ridge (a diameter U3), while a diameter U4 of the shank portion 380a is larger than the diameter U3 of the threaded portions 380b and 380c. Further, an end surface at the X1 side of the shank portion 380a is configured to be in contact with the surface 2b of the engine main body 10 and an end surface at the X2 side of the shank portion 380a is configured to be in contact with the inner surface 21a (the surface at a side of the engine main body 10) of the main body portion 21 of the TCC 220. Thus, the positioning of the TCC 220 relative to the engine main body 10 in the X direction in which the crank shaft 40 extending is conducted by the shank portion 380a. As a result, the positioning of the TCC 220 relative to the engine main body 10 in the direction in which the crank shaft 40 extending can be completed only by the stud bolt 380, and thus there is no need to consider tolerance of other members (the engine main body 10 and the TCC 220) other than the stud bolt 380.

In addition, the threaded portion 380b of the stud bolt 380 is configured to threadedly engage with a positioning recessed portion 212 of the engine main body 10. The positioning recessed portion 212 includes an internal thread 212a to which the threaded portion 380b is engageable. In addition, the threaded portion 380c at the X2 side of the stud bolt 380 is configured to threadedly engage with the flange nut 381 in a state where the threaded portion 380c is inserted in a through hole 226 of which an inner diameter is slightly larger than the outer diameter U3 of the threaded portion 380c. The through hole 226 is an example of "the first main body attachment portion" of the present invention.

The flange nut 381 includes a flange portion 381a arranged at a side of the outer surface 21b of the TCC 220. A radius of the flange portion 381a is formed to be larger than a length between the center line C1 of the through hole 226 and the inner surface 23c of the oil seal securing portion 23. Thus, a vicinity of an outer edge portion of the flange portion 381a, the outer edge portion which is at a side of the oil seal securing portion 23, is configured to project towards the crankshaft 40 so as to cover, from the X2 side, the part of the portion of the oil seal securing portion 23, the portion in which the oil seal 6 is inserted. Consequently, by the flange portion 381a of the flange nut 381, the oil seal 6 can be reliably restricted from falling off from the X2 side at which the oil seal 6 is inserted in the oil seal fastening portion 23.

In addition, a recessed portion 226a is formed in the vicinity of an opening portion, at the X2 side, of the through hole 226 of the TCC 220. An opening width (an inner diameter) of the recessed portion 226a is formed to increase gradually from the X1 side towards the X2 side. The seal member 8 is arranged in the recessed portion 226a. The seal member 8 seals between the flange portion 381a of the flange nut 380 and the outer surface 21b in the vicinity of the through hole 226.

In addition, the flange nut 381 threadedly engages with the threaded portion 380c at the X2 side of the stud bolt 380 so that the flange portion 381a of the flange nut 381 is in contact with the outer surface 21b in a state where the threaded portion 380b of the stud bolt 380 is threadedly engaged with the positioning recessed portion 212 of the engine main body 10 and the threaded portion 380c is inserted in the through hole 226 of which the inner diameter is slightly larger than the outer diameter U3. At this time, as described above, the end surface at the X1 side of the shank portion 380a is in contact with the surface 2b and the end surface at the X2 side is in contact with the inner surface 21a. Consequently, the TCC 220 is positioned relative to the engine main body 10 in the in-plane direction that is orthogonal to the crankshaft 40 (in the Y direction and the Z direction), and the TCC 220 is positioned relative to the engine main body 10 in the direction in which the crankshaft 40 extends (the X1 direction).

In addition, a seal material which is not shown is applied to a surface of the threaded portion 380c. The seal material is provided so as to fill in thread roots of the respective threaded portion 380c and the flange nut 381 when the threaded portion 380c threadedly engages with the flange nut 381, and thereby sealing between the threaded portion 380c and the flange nut 381. Accordingly, with the use of both the seal member 8 arranged at the recessed portion 226a of the TCC220 and the seal material applied to the surface of the threaded portion 380c of the stud bolt 380, the oil is restricted from leaking to the outside more reliably.

Figure 19:
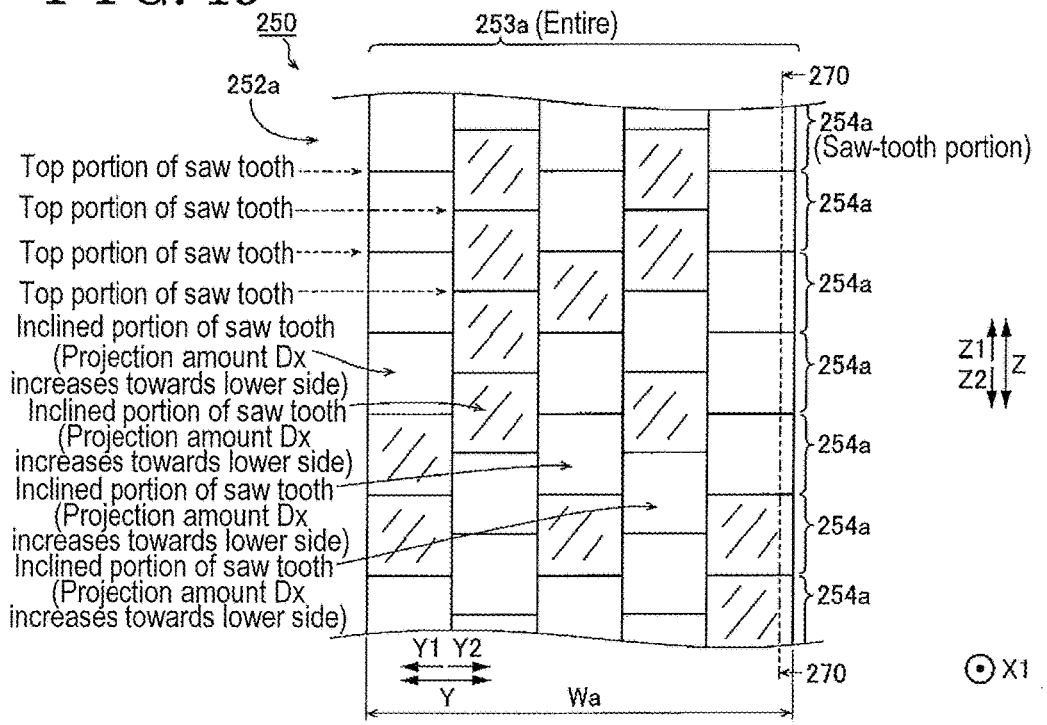
FIG. 19 is an enlarged plan view illustrating a seal member used in the engine according to the second embodiment of the present invention.

In addition, in the second embodiment, the TCC 220 is attached to the engine main body 10 with the use of a seal member 250. The seal member 250 includes the seal portion 52b (refer to FIG. 11) in the short-side direction (the horizontal direction), while the seal member 250 includes a seal portion 252a in the long-side direction (the upper and lower direction) as illustrated in FIG. 19. FIG. 19 illustrates a state of a surface of the seal portion 252a when viewed from a side of the seal surface 10c (refer to FIG. 16) along the X2 direction. That is, the base portion 51 extending in the Z direction (the upper and lower direction) is positioned at the deep side of the paper surface.

The seal portion 252a includes a distal end portion 253a including the width Wa (in the Y direction) and formed in saw-tooth configurations. The distal end portion 253a includes a surface configuration in which a total of five rows of the saw-tooth configurations are sequentially connected to one another in the Y direction. The five rows are arranged in such a manner that phases of the saw-tooth configurations are shifted by an approximately half (a half of a length of a saw-tooth portion 254a in the Z direction) relative to one another in the Z direction. The saw-tooth configuration (the saw-tooth configuration from a valley portion to the next valley portion via a top portion) is repeated in the direction of the arrow Z2. Consequently, each valley portion (the lowest portion of an inclined portion) of each row comes to a side surface of the inclined portion of the saw-tooth in the adjacent row, and thus the valley portion terminates thereat. Accordingly, even in a case where the valley portions (a width of the valley portion=Wa/5) extending in the Y direction (the horizontal direction) are formed in each of the rows, the valley portions of the respective rows do not continue along the width direction of the seal portion 252a through from one side (the Y1 side) to the other side (the Y2 side) of the seal portion 252a, when the seal portion 252a is viewed as a whole.

Figure 20:
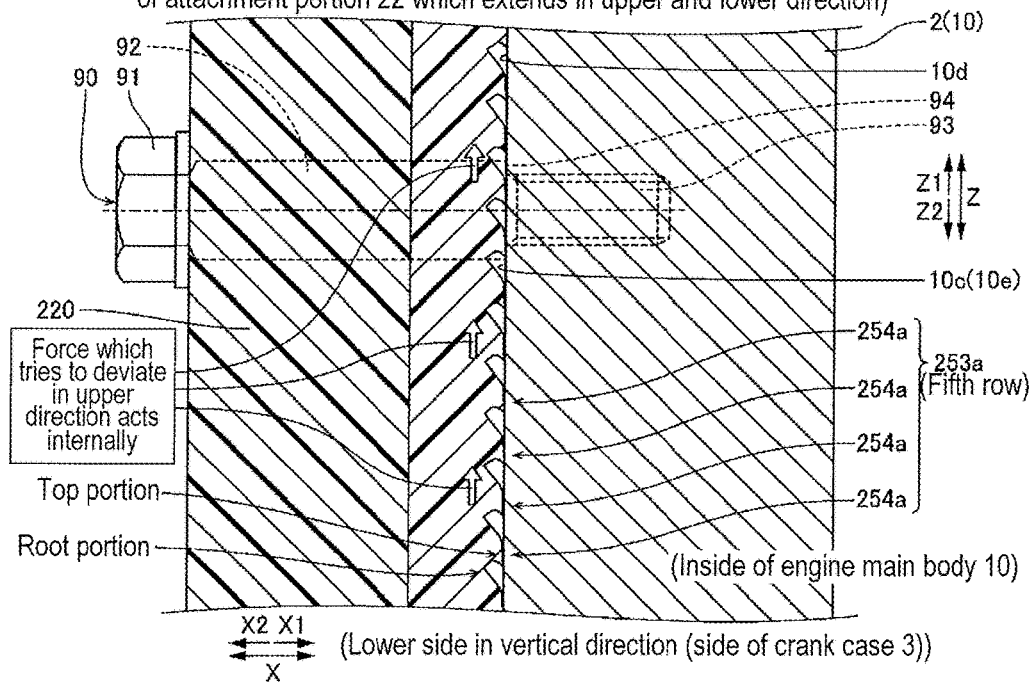
FIG. 20 is an enlarged cross-sectional view illustrating a state in which the timing chain cover is attached to the engine according to the second embodiment of the present invention via the seal member.

Consequently, as illustrated in FIG. 20, when the seal portion 252a including plural saw-tooth portions 254a is squashed in the X1 direction by the fastening force of the shoulder bolt 90, the seal portion 252a is in contact with the seal region 10e in a state of being deformed in the shape where the component of the upward direction reaction force of the reaction force received from the seal surface 10c (the seal region 10e) is larger than the component of the downward direction reaction force of the reaction force received from the seal surface 10c (the seal region 10e). The downward direction is the direction in which the gravity works and the upward direction is the direction opposite to the direction in which the gravity works. FIG. 20 illustrates a cross-sectional configuration taken along a line 270-270 of FIG. 19. In regard to the other adjacent rows in the Y direction, the portion of the seal portion 252a corresponding each row is deformed in a similar configuration illustrated in FIG. 20.

As a result, in a state where the TCC 220 is fastened to the engine main body 10 via the seal member 250 with the clearance distance H1 is provided therebetween (fastened at a fixed dimension), the seal portion 252a extending not only in the short-side direction (the horizontal direction) but also in the long side-direction (the upper and lower directions) is (closely) in contact with the seal surface 10c while remaining in the deformed configuration in a state where the seal portion 252a is deformed in the X1 direction and where the force by which the distal end portion 253a tries to deviate in the upper direction (the Z1 direction), but not in the lower direction, is always working internally, due to the fastening force of the shoulder bolt 90. In the above description, the five rows of saw-tooth configurations are provided at the distal end portion 253a, however, the number of rows connected to one another in the horizontal direction may be other numbers than five as long as three or more rows.

In addition, in the second embodiment, as illustrated in FIG. 15, a come-off prevention member 30 which is made of resin and is attached to the TCC 220 is further provided. A come-off prevention configuration of an oil seal is formed by the TCC 220 and the come-off prevention member 30. The come-off prevention member 30 is an example of "an oil seal come-off prevention member" of the present invention.

Figure 21:
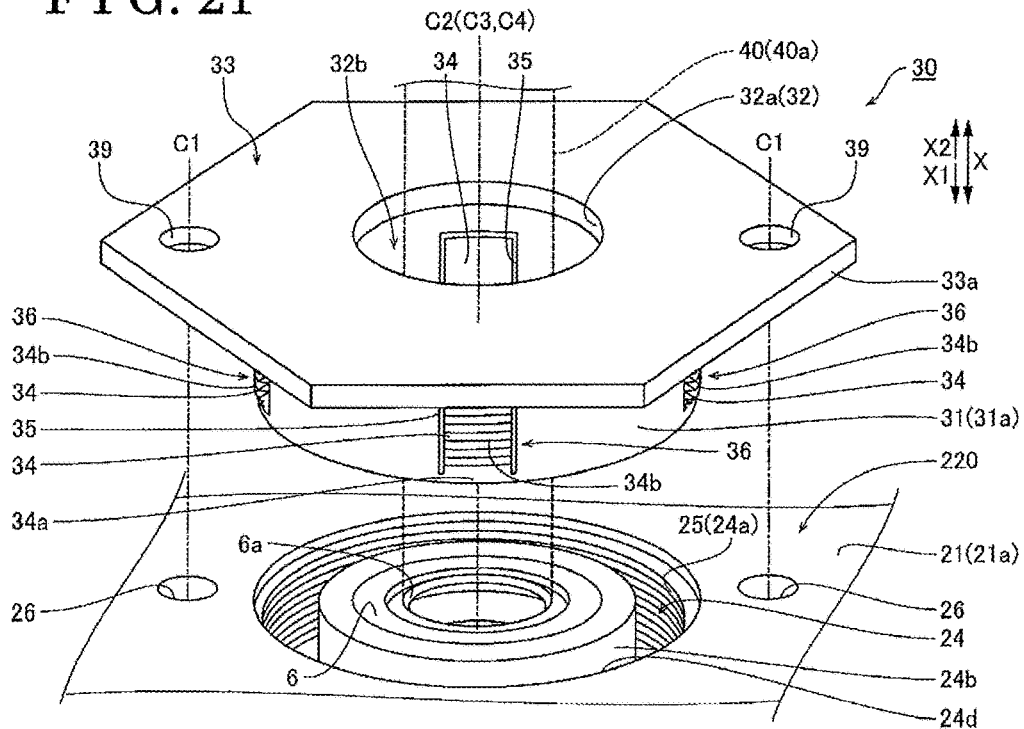
FIG. 21 is an exploded perspective view illustrating a come-off prevention member and the timing chain cover according to the engine of the second embodiment of the present invention.
Figure 22:
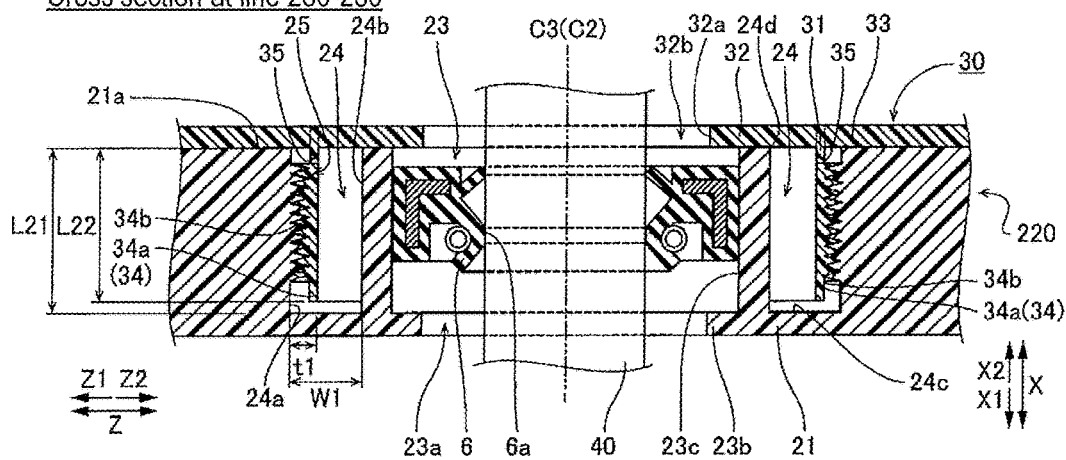
FIG. 22 is a cross-sectional view taken along line 280-280 in FIG. 15.

Specifically, is illustrated in FIGS. 21 and 22, a circumferential groove 24 is provided at the outer surface 21b of the main body portion 21 of the TCC 220 to be recessed towards the X1 side. The circumferential groove 24 is provided to surround the oil seal securing portion 23 (the through hole 23a). The circumferential groove 24 is provided to include a fixed groove width W1 and a fixed depth L21 in a depth direction (the X direction) as illustrated in FIG. 22. A central axis C3 of the circumferential groove 24 is configured to substantially match the through hole 23a (refer to FIG. 22) and the central axis C2 of the crankshaft 40. The circumferential groove 24 is an example of "a first engagement portion" of the present invention.

In addition, the circumferential groove 24 includes an inner circumferential surface 24a at an outer side in the radial direction (a side opposite to the crankshaft 40) which is formed with a threaded portion 25, an inner circumferential surface 24b at an inner side in the radial direction (a side of the crankshaft 40) and which is not formed with a threaded portion, and a bottom surface 24c connecting the inner circumferential surface 24a at the outer side and the inner circumferential surface 24b at the inner side to each other at the X1 side. The threaded portion 25 is formed in a manner that a thread ridge and a thread root of the thread extend around the central axis C3 at the inner circumferential surface 24a, and that the threaded portion 25 is formed over the entire circumference. In addition, the threaded portion 25 is formed throughout a substantially entire region of the inner circumferential surface 24a in the depth direction (the X direction) except for in the vicinity of the bottom surface 24c of the circumferential groove 24 and in the vicinity of an opening portion 24d of the circumferential groove 24 at the X2 side. In addition, the thread ridges of the threaded portion 25 protrude from the inner circumferential surface 24a vertically towards the radially inner direction, and angles of the thread ridges (flank angles) and heights of the thread ridges are formed to be substantially constant. The threaded portion 25 is an example of "a first threaded portion" of the present invention.

Figure 23:
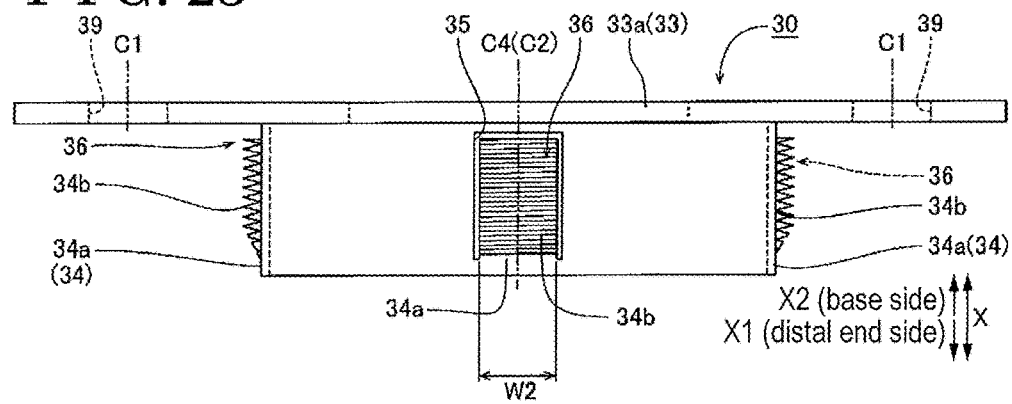
FIG. 23 is a lateral view illustrating the come-off prevention member according to the engine of the second embodiment of the present invention.

As illustrated in FIGS. 22 and 23, the come-off prevention member 30 includes a body portion 31 including a cylindrical shape formed around a central axis C4, an inner side flange portion 32 (refer to FIG. 22) formed to extend from an end portion of the radially inner side of the body portion 31 towards the radially inner side, and an outer side flange portion 33 formed to extend from an end portion of the radially outer side of the body portion 31 towards the radially outer side. In addition, the central axis C4 of the body portion 31 is configured to substantially match the central axis C2.

As illustrated in FIG. 22, the body portion 31 is configured to be insertable into the circumferential groove 24. That is, a thickness t1 of the body portion 31 including the thread ridge which will be described below is formed to be smaller than the groove width W1 of the circumferential groove 24. In addition, a length L22 in the X direction from surfaces at the X1 side of the inner side flange portion 32 and the outer side flange portion 33 to a distal end portion at the X1 side of the body portion 31 is smaller than the depth L21 of the circumferential groove 24 in the X direction. In addition, an inner edge portion 32a of the inner side flange portion 32 at the radially inner side defines an opening portion 32b including a circular shape as viewed in a plane from the X2 side. The come-off prevention member 30 is configured to be inserted into the crankshaft 40 as the crankshaft 40 penetrates the opening portion 32b and the inside of the body portion 31.

In addition, the inner edge portion 32a of the inner side flange portion 32 is formed to be positioned at the radially inner side relative to the inner surface 23c of the through hole 23a when the come-off prevention member 30 is attached to the TCC 220. Accordingly, a vicinity of the inner edge portion 32a projects to cover, throughout the entire circumference, the part of the inner surface 23c of the oil seal securing portion 23 in which the oil seal 6 is fixedly press-fitted. In addition, the oil seal 6 comes to be in contract with the inner side flange portion 32 when moving towards the X2 side, and therefore the oil seal 6 is restricted from falling off from the X2 side. The inner side flange portion 32 is an example of "an oil seal come-off prevention portion" of the present invention.

In addition, as illustrated in FIG. 21, an outer edge portion 33a of the outer side flange portion 33 is formed in a regular hexagonal shape as viewed in a plane. The outer edge portion 33a is configured such that a tool including an adjustable wrench, for example, can engage with the outer edge portion 33a. It is configured in such a manner that, by turning the come-off prevention member 30 in a direction R2 (a detaching direction) with the use of the tool, the come-off prevention member 30 can be removed from the TCC 220. Also, the come-off prevention member 30 can be rotated manually without using the tool to remove the come-off prevention member 30 from the TCC 220.

In addition, in the second embodiment, as illustrated in FIGS. 21 and 23, four engagement portions 34 are integrally provided at the come-off prevention member 30 to be arranged at equal angular intervals of approximately 90 degrees around the central axis C4. Each of the four engagement portions 34 is surrounded by a notch groove 35 formed at three sides except for at the X1 side (that is, at the X2 side and at both sides of an outer circumferential surface 34b in the circumferential direction). Accordingly, the engagement portion 34 made of resin is configured in such a manner that a base side (the X2 side) is elastically deformable radially inwardly and outwardly while a distal end portion 34a formed at the X1 side serving as a fulcrum point. In addition, the engagement portions 34 are connected to the body portion 31 at the respective distal end portions 34a. The engagement portion 34 is configured to curve along the circumferential direction into an arc shape and to include an elongated shape elongated in the X direction when viewed from a side surface. The engagement portion 34 is an example of "a second engagement portion".

In addition, a threaded portion 36 is formed at the outer circumferential surface 34b. The threaded portion 36 is formed in such a manner that a thread ridge and a thread root extend along the circumferential direction on the arc-shaped outer circumferential surface 34b of the engagement portion 34. In addition, the threaded portion 36 is formed over a substantially entire region in the depth direction (the X direction) except for the distal end portion 34a. A thread ridge of the threaded portion 36 corresponds to the thread root of the threaded portion 25. That is, the thread ridge of the threaded portion 36 projects vertically from the arc-shaped outer circumferential surface 34b towards the radially outer side and angles of the thread ridges (flank angles) of the threaded portion 36 are configured to be substantially constant. The threaded portion 36 is an example of "a second threaded portion" of the present invention.

Figure 24:
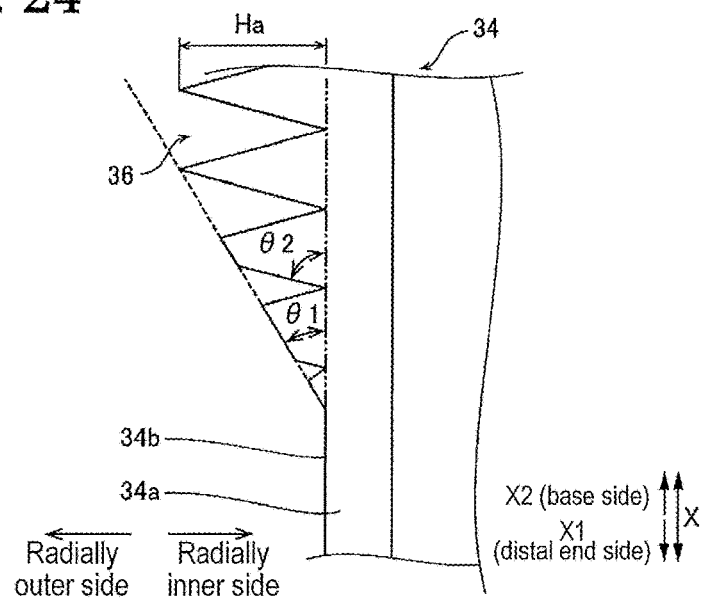
FIG. 24 is an enlarged view illustrating a distal end-side of an engagement portion of the come-off prevention member according to the engine of the second embodiment of the present invention.

In addition, as illustrated in FIG. 24, at plural (three) thread ridges at a distal end side of the threaded portion 36, top portions of the respective thread ridges are cut off. Specifically, in regard to the thread ridges at the distal end portion (the X1 side) of the threaded portion 36, portions of the thread ridges, the portions which are positioned at the radially outward side relative to a half line extending to the outer circumferential surface 34b at an angle θ1, are removed. The half line is inclined, at the angle θ1, from a connection portion at which the X1 side of the thread ridge positioned at the most distal end of the threaded portion 36 and the outer circumferential surface 34b are connected to each other. The angle θ1 is smaller than an angle θ2 formed by the outer circumferential surface 34b and the thread ridge of the threaded portion 36. As a result, it is configured in such a manner that heights of the respective three thread ridges of which the top portions are removed at the distal end (the X1 side) of the threaded portion 36 are smaller than a height Ha of the thread ridges at the base side (the X2 side). In addition, as illustrated in FIG. 23, a width W2 of the engagement portion 34 in the circumferential direction is formed to be small so that the engagement portion 34 is allowed to be elastically deformable and to be large so that the engagement portion 34 is restricted from, for example, being damaged at the elastic deformation due to an insufficient strength of the engagement portion 34.

In addition, as illustrated in FIG. 15, by rotating the come-off prevention member 30 relative to the TCC 220 in an R1 direction in which the crankshaft 40 rotates, the threaded portion 25 and the threaded portion 36 are configured to (threadedly) engage with each other (refer to FIG. 22). In addition, by rotating the come-off prevention member 30 relative to the TCC 220 in the R2 direction that is opposite to the R1 direction, a state of (threadedly) engagement of the threaded portion 25 and the threaded portion 36 is configured to be released. A pair of through holes 39 (refer to FIG. 21) is formed at the outer side flange portion 33 at intervals of 180 degrees at an outer side relative to the body portion 31. In addition, the through holes 39 are formed at positions corresponding to the respective through holes 26 of the TCC 220. Accordingly, in a state where the come-off prevention member 30 is attached to the TCC 220 as illustrated in FIG. 15, it is configured in such a manner that the fastening members 308 (the stud bolts 380) are inserted into the corresponding through holes 39 and 26 in the direction of the arrow X1 and are screwed into the positioning recessed portions 212 of the cylinder block 2.

Figure 25:
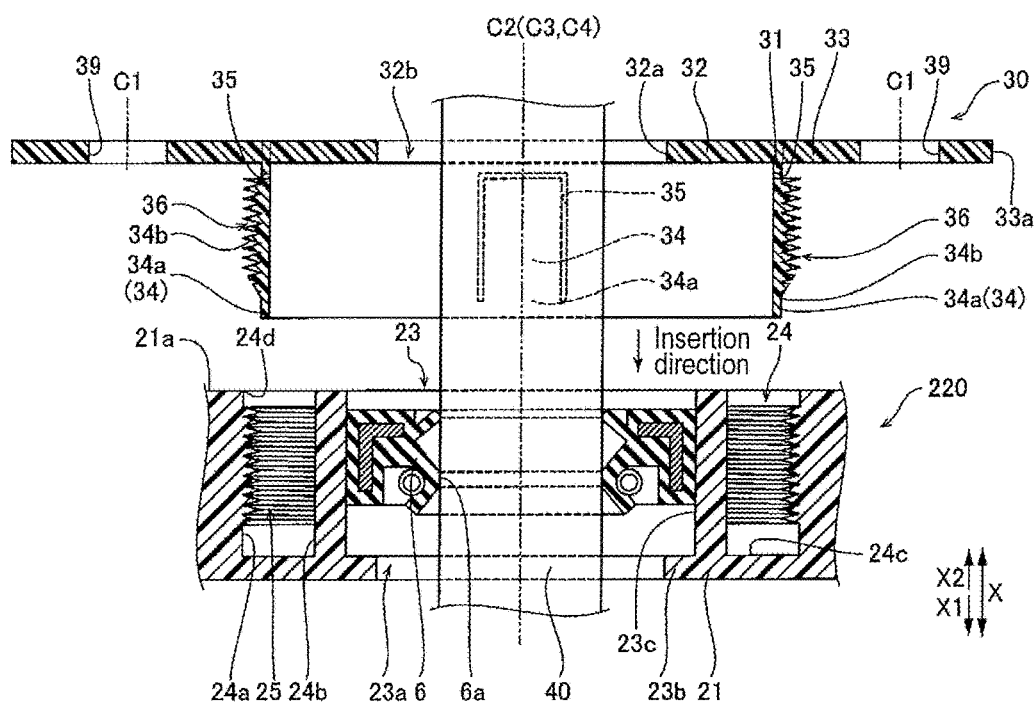
FIG. 25 is a cross-sectional view illustrating a state before the come-off prevention member is attached according to the engine of the second embodiment of the present invention.

Next, an attaching operation of the come-off prevention member 30 to the TCC 220 will be described with reference to FIG. 22 and FIGS. 25 to 28. As illustrated in FIG. 25, at the attachment to the TCC 220, first, the crankshaft 40 is inserted into the through hole 23a of the TCC 220, and thereafter the oil seal 6 is positioned at the X2 side of the oil seal securing portion 23 while the oil seal 6 is being attached to the crankshaft 40. Then, by inserting (press-fitting) the oil seal 6 in the X1 direction, the oil seal 6 is fixed at the inner surface 23c. Thereafter, in a state where the crankshaft 40 is inserted in the opening portion 32b of the come-off prevention member 30, the come-off prevention member 30 is arranged at the X2 side relative to the TCC 220. Then, the body portion 31 of the come-off prevention member 30 is inserted into the circumferential groove 24 of the TCC 220 along the central axis C3.

Figure 26:
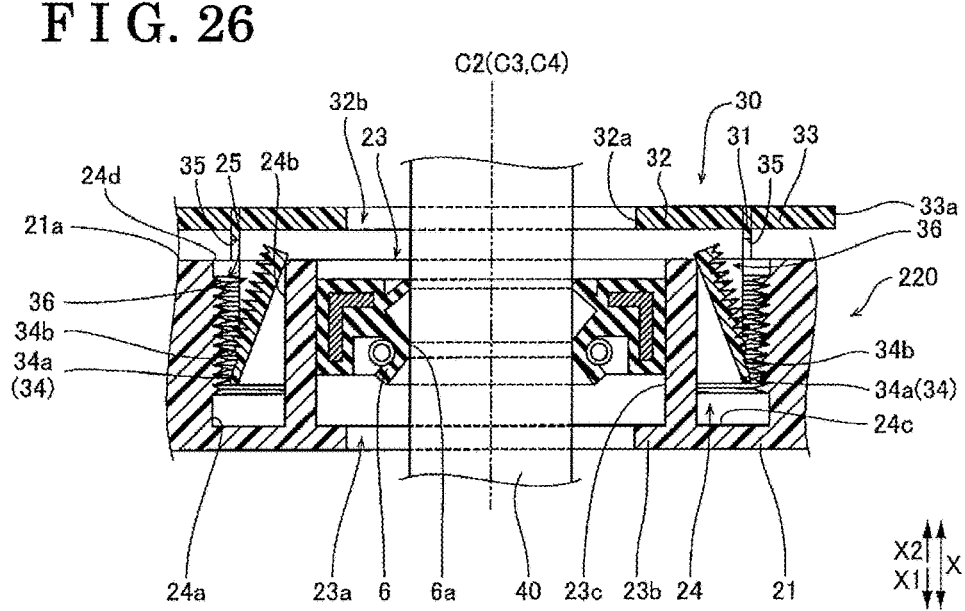
FIG. 26 is a cross-sectional view illustrating a state in which the come-off prevention member is being attached according to the engine of the second embodiment of the present invention.
Figure 27:
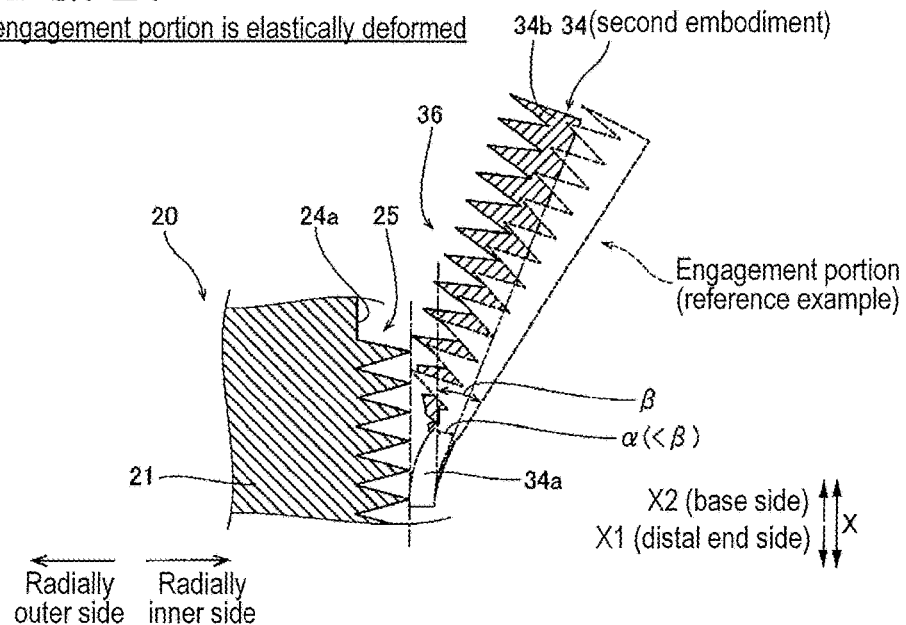
FIG. 27 is a cross-sectional view illustrating a state in which the engagement portion is elastically deformed while the come-off prevention member is being attached according to the engine of the second embodiment of the present invention.

Here, in the second embodiment, the thread ridges of the respective threaded portions 36 of the four engagement portions 34 formed at the body portion 31 of the come-off prevention member 30 are in contact with the thread ridges of the threaded portion 25 formed at the circumferential groove 24 of the TCC 220. Then, as illustrated in FIG. 26, by inserting the body portion 31 of the come-off prevention member 30 further into the circumferential groove 24 towards the X1 direction, the top portion of the thread ridge of the threaded portion 36 moves in the X1 direction beyond the top portion of the thread ridge of the threaded portion 25. Accordingly, the four engagement portions 34 elastically deform towards the radially inner side while the distal end portions 34a at the X1 side serving as the fulcrum points, as illustrated in FIG. 27. At this time, at the engagement portions 34 (the solid lines), because the thread ridges at the distal end side (the X1 side) of the threaded portion 36 are cut off, an inclination (an angle of deformation) a at the base side relative to the distal end portions 34a due to the elastic deformation is smaller than an inclination β of an engaged portion (the broken lines) illustrated as an reference example at which threaded portions are not cut off. That is, according to the engagement portions 34 of the second embodiment, a degree of the elastic deformation (the angle of deformation α) is smaller than at the engagement portion of the reference example.

Then, the engagement portions 34 of the come-off prevention member 30 are inserted into the circumferential groove 24 to a degree at which the lower surfaces of the inner side flange portion 32 and the outer side flange portion 33 come into contact with the outer surface 21b of the TCC 20. Then, the insertion of the engagement portions 34 of the come-off prevention member 30 into the circumferential groove 24 is stopped at a position at which the threaded portion 25 of the TCC 220 and the threaded portion 36 of the come-off prevention member 30 are engaged (screwed) with each other. Accordingly, the elastic deformation of the engagement portions 34 is released, and as illustrated in FIG. 22, the threaded portion 25 of the TCC 220 and the threaded portion 36 of the come-off prevention member 30 are (threadedly) engaged with each other. As a result, only by inserting the engagement portions 34 of the body portion 31 of the come-off prevention member 30 into the circumferential groove 24 of the TCC 220, the come-off prevention member 30 is attached to the TCC 220 and fixed thereat. By rotating the come-off prevention member 30 in the R1 direction at a predetermined torque after the attachment, the engagement of the TCC 220 and the come-off prevention member 30 can be strengthened further. Then, the fastening members 308 are inserted into the respective through holes 39 and the through holes 26, and then screwed into the respective positioning recessed portions 212.

Figure 28:
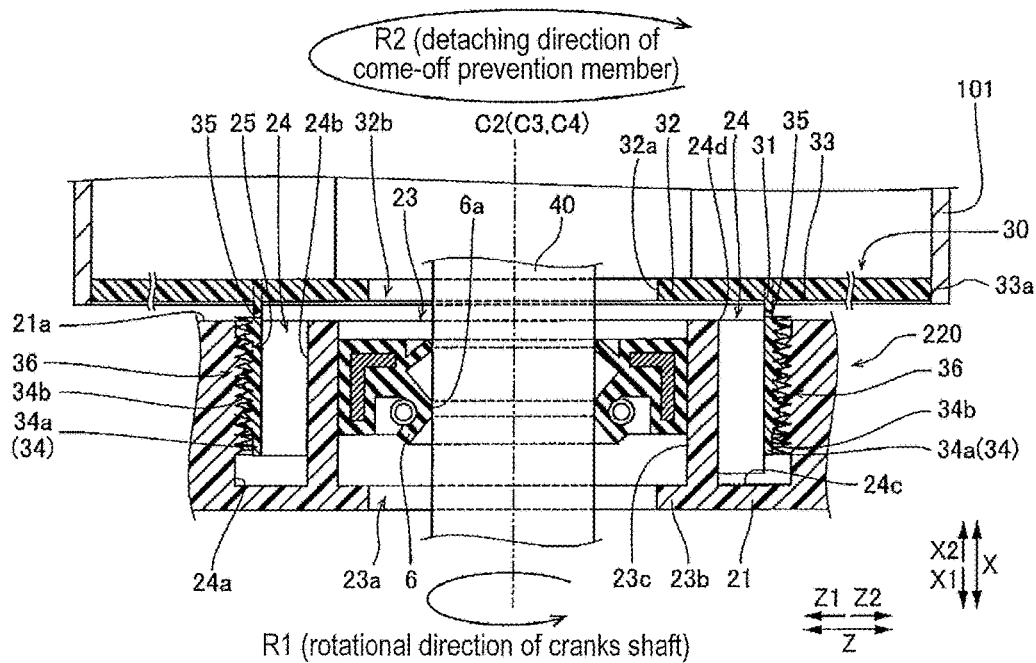
FIG. 28 is a cross-sectional view illustrating a state in which the come-off prevention member is being detached according to the engine of the second embodiment of the present invention.

Next, a detaching operation of the come-off prevention member 30 from the TCC 220 will be described with reference to FIGS. 21 and 28. At the detachment from the TCC 220, first, the fastening member 308 screwed into the positioning recessed portions 212 is removed. Thereafter, as illustrated in FIG. 28, a predetermined tool 101 including an adjustable wrench, for example, is made to be engaged with the outer edge portion 33a of the outer flange portion 33 of the come-off prevention member 30. Then, the come-off prevention member 30 is rotated in the R2 direction (the detaching direction) that is opposite to the R1 direction in which the crankshaft 40 rotates with the use of the tool 101. Thus, the engagement of the threaded portion 25 of the TCC 220 and the threaded portion 36 of the come-off prevention member 30 is released, and the come-off prevention member 30 is removed from the TCC 220 as illustrated in FIG. 21. The detaching operation can be performed even in a state where the crankshaft 40 is inserted in the opening portion 32b of the come-off prevention member 30.

In the second embodiment, the following effects can be obtained.

In the second embodiment, as described above, by providing the through holes 226, which are for attaching the TCC 220 to the engine main body 10 with the flange nuts 381 via the stud bolts 380, in the vicinity of the oil seal securing portion 23 (the through hole 23a) of the TCC 220, the positional deviation of the oil seal 6 which is attributed to the deformation of the TCC 220 can be restricted. Thus, the sufficient sealing performance by the oil seal 6 can be assured.

In addition, in the second embodiment, the flange nut 381 threadedly engages with the threaded portion 380c at the X2 side of the stud bolt 380 so that the flange portion 381a of the flange nut 381 is in contact with the outer surface 21b of the TCC 220 in a state where the threaded portion 380b at the X1 side of the stud bolt 380 is threadedly engaged with the positioning recessed portion 212 of the engine main body 10. Thus, the positioning of the TCC 220 relative to the engine main body 10 in the in-plane direction (the Y direction and the Z direction) is conducted, and accordingly the oil seal 6 secured at the oil seal securing portion 23 of the TCC 220 can be arranged at the predetermined position in the in-plane direction reliably. In addition, the number of components of the engine can be reduced because there is no need to use a collar.

In addition, in the second embodiment, the sizes of the outer diameters of the shank portions 291 to 293 of the shoulder bolts 201 to 203 relative to the inner diameter d1 of each of the through holes 222b are made different from one another so that the clearance S is generated between the respective through holes 222b and the shoulder bolts 201 to 203 inserted in the through holes 222b, the clearance S of which the sizes are equal to or larger than the amounts of the positional deviations of the through holes 222b caused by at least one of the thermal expansion and the thermal shrinkage of the resin TCC 220. Thus, by using the clearances S provided between the inner surfaces 22e of the through holes 222b and the shank portions 291 to 293 of the shoulder bolts 201 to 203, respectively, the positional deviations of the through holes 222b associated with the deformation (the thermal expansion and the thermal shrinkage) of the TCC 220 can be reliably absorbed, while, the bolt fastening forces (axial forces fixing the TCC 220) of the shoulder bolts 201 to 203 are maintained at steady levels. Consequently, the deformation can be reliably prevented from occurring in the vicinity of the oil seal securing portion 23 of the TCC 220. The other effects of the second embodiment are same as the effects of the first embodiment.

In addition, in the second embodiment, the seal member 250 includes the seal portion 252a extending in the upper and lower direction (the Z direction) and the seal portion 52b extending in the horizontal direction (the Y direction). Not only the seal portion 52b but also the distal end portion 253a of the seal portion 252a is formed in the configuration where the component of the reaction force received by the seal surface 10c of the engine main body 10 the component which is towards the upper direction is larger than the component of the reaction force towards the lower direction. Thus, at the seal portion 252a of the seal member 250 which extends in the upper and lower direction, the component of the reaction force, out of the reaction force received from the seal surface 10c of the engine main body 10, which is towards the upper direction is made larger than the component of the reaction force, out of the reaction force received from the seal surface 10c of the engine main body 10, which is towards the lower direction. Consequently, even at the portion of the seal surface 10c which extends in the upper and lower direction, the seal member 250 (the seal portion 252a) can be reliably prevented from deviating downwardly from the seal surface 10c.

In addition, in the second embodiment, the distal end portion 253a of the seal portion 252a is configured to include the surface configuration in which the total of the five rows from a first row to a fifth row of the saw-tooth configurations are sequentially connected in the Y direction. The five rows are arranged in such a manner that the phases of the saw-tooth configurations are shifted by half (a half of the length of the saw-tooth portion 254a in the Z direction) relative to one another in the Z direction. The saw-tooth configuration (the saw-tooth configuration from the valley portion to the next valley portion via the top portion) is repeated in the direction of the arrow Z2. Accordingly, even in a case where the seal surface 10c of the engine main body 10, which extends in the upper and lower direction (the Z direction), is sealed with the use of the seal portion 252a including the saw-tooth configuration repeated in the direction of the arrow Z2, the valley portions of one saw-tooth portion 254a do not penetrate in the horizontal direction from one side (the Y1 side) to the other side (the Y2 side) of the seal portion 252a along the width direction (the Y direction) of the seal portion 252a. Therefore, the sealing performance between the engine main body 10 and the TCC 220 can be reliably provided with the use of the seal portion 252a. The other effects of the second embodiment are same as the effects of the first embodiment.

In addition, in the second embodiment, the threaded portion 25 is provided at the circumferential groove 24 of the TCC 220 and the threaded portions 36 which threadedly engage with the threaded portion 25 are provided at the four engagement portions 34 of the come-off prevention member 30. In addition, the four engagement portions 34 of the come-off prevention member 30 are configured be elastically deformable towards the radially inner side (the direction towards the central axis C4) and towards the radially outer side (the direction away from the central axis C4). Thus, only by inserting the engagement portions 34 of the come-off prevention member 30 into the circumferential groove 24 of the TCC 220, the engagement portions 34 are engaged with the circumferential groove 24 while being deflected at the radially inner side automatically. Accordingly, the threaded portion 25 of the circumferential groove 24 and the threaded portions 36 of the engagement portions 34 are made to be in the state of engagement (the state of threaded engagement) only by the insertion, without rotating the threaded portions 36 of the engagement portions 34 relative to the threaded portion 25 of the circumferential groove 24 in a direction of screwing. Thus, the attachment operation of the come-off prevention member 30 can be simplified, thereby enhancing an assembling performance of the engine 100 including the come-off prevention configuration of the oil seal. In addition, by allowing the threaded portion 25 and the threaded portions 36 to threadedly engage with each other, the TCC 220 and the come-off prevention member 30 can be fixed to each other strongly when compared to a case where the come-off prevention member 30 is simply fitted in, for example, a groove portion. In consequence, for example, even in a case where an external force is applied, the come-off prevention member 30 can be restricted from falling off the TCC 220, and the come-off prevention member 30 can be restricted from rattling due to an insufficient engagement of the threaded portion 25 and the threaded portions 36.

In addition, in the second embodiment, when disengaging the threaded portions 36 of the come-off prevention member 30 from the threaded portion 25 of the TCC220, the state of engagement (the state of threaded engagement) of the threaded portion 25 and the threaded portions 36 can be released easily by rotating the threaded portions 36 in the R2 direction. Thus, the come-off prevention member 30 can be removed from the TCC 220 readily in a case where the oil seal 6 needs to be removed, for example, at a replacement of the oil seal 6. Consequently, the oil seal 6 that has been prevented by the inner side flange portion 32 from coming off can be detached from the TCC 20 easily.

In addition, in the second embodiment, the rotational direction for detaching the threaded portions 36 of the come-off prevention member 30 from the threaded portion 25 of the TCC 220 is the R2 direction that is opposite to the R1 direction in which the crankshaft 40 rotates. Therefore, even in a case where such a force that rotates in the R1 direction in which the crankshaft 40 rotates is applied to the come-off prevention member 30 due to a rotational vibration caused by the rotations of the crankshaft 40, the state of engagement (the state of threaded engagement) of the threaded portion 25 and the threaded portions 36 can be restricted from being released. Consequently, the come-off prevention member 30 can be effectively restricted from falling off the TCC 220.

The aforementioned embodiments are disclosed as examples and are not provided to intend to be limitative in all aspects. The scope of the present invention is indicated by the scope of patent claims but not by the description of the aforementioned embodiment, and includes meanings in a range of equivalents of the scope of patent claim and all the changes (variations) within the range.

Figure 29:
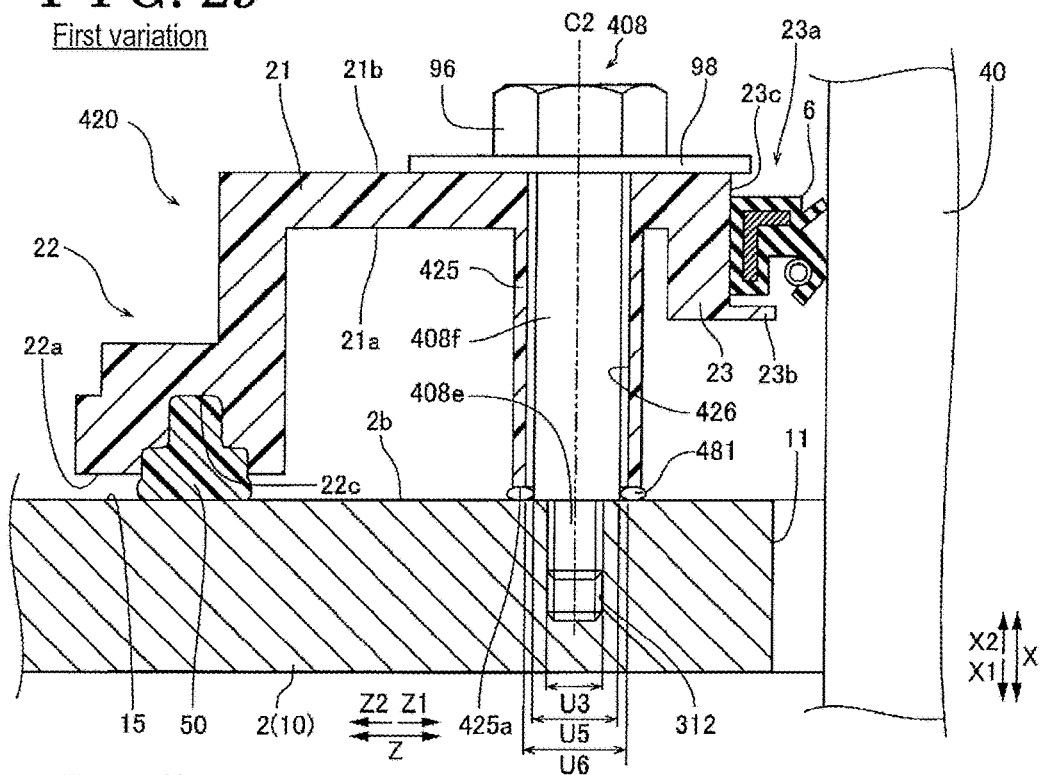
FIG. 29 is an enlarged cross-sectional view illustrating a vicinity of a through hole, in an enlarged manner, of a timing chain cover of an engine according to a first variation of the present invention.

For example, in a first variation illustrated in FIG. 29, unlike the TCC 20 of the first embodiment, a cylindrical portion 425 in which a fastening bolt 408 is inserted and which is extended in the X can be integrally provided at a TCC 420. In this case, a through hole 426 extended in the thickness direction (the X direction) is provided inside the cylindrical portion 425. In addition, in a state where the TCC 420 is attached to the engine main body 10, an end portion 425a of the cylindrical portion 425 and the surface 2b of the cylinder block 2 are away from each other by a predetermined clearance, and a seal member (an O-ring) 481 is arranged in the clearance. The seal member 481 is in close contact with the end portion 425a of the cylindrical portion 425 and the surface 2b of the cylinder block 2 in a state of being squashed in the X1 direction. In addition, in a state where a threaded portion 408e of the fastening bolt 408 is threadedly engaged with a positioning recessed portion 312 including a thread groove (a female thread) of the engine main body 10, an end surface at the X1 side of a shank portion 408f is in contact with the surface 2b and the flange portion 98 is in contact with the outer surface 21b. In the first variation, the cylindrical portion 425 including the through hole 426 inside thereof is integrally provided at the TCC 420, and thus the positioning in the X direction can be conducted by the cylindrical portion 425 without providing the collar member. Consequently, the number of the components of the engine can be reduced.

Figure 30:
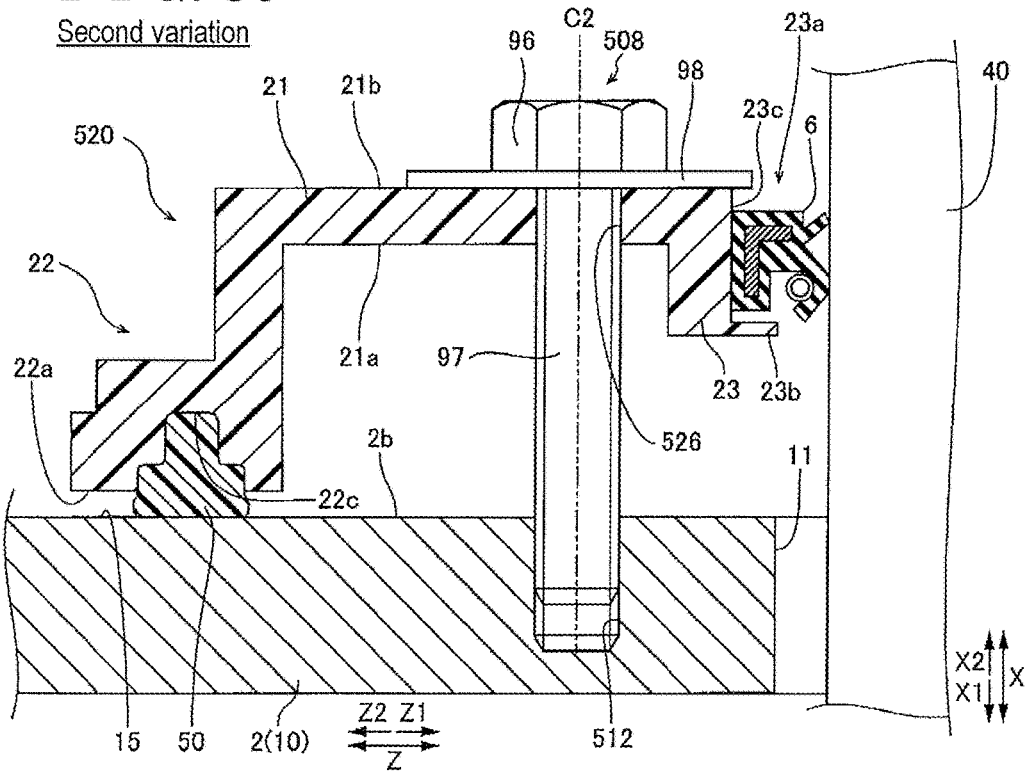
FIG. 30 is an enlarged cross-sectional view illustrating a vicinity of a through hole, in an enlarged manner, of a timing chain cover of an engine according to a second variation of the present invention.

In addition, in a second variation illustrated in FIG. 30, unlike the first embodiment, a fastening bolt 508 can be threadedly engaged directly with a TCC 520 and the engine main body 10. That is, a through hole 526 including a female thread formed at an inner circumferential surface thereof is provided in the vicinity of the oil seal securing portion 23 of the TCC 520. In addition, a positioning recessed portion 512 including a female thread formed at an inner circumferential surface thereof is provided at a portion of the surface 2b of the engine main body 10, the portion which faces the through hole 526. A seal material is applied to the threaded portion 97 of the fastening bolt 508. In the second variation, the threaded portion 97 of the fastening bolt 508 is threadedly engaged with the through hole 526 of the TCC 520 and the positioning recessed portion 512 of the engine main body 10, the positioning of the TCC 520 relative to the engine main body 10 in the X direction, the Y direction and the Z direction is conducted without providing the collar member.

Figure 31:
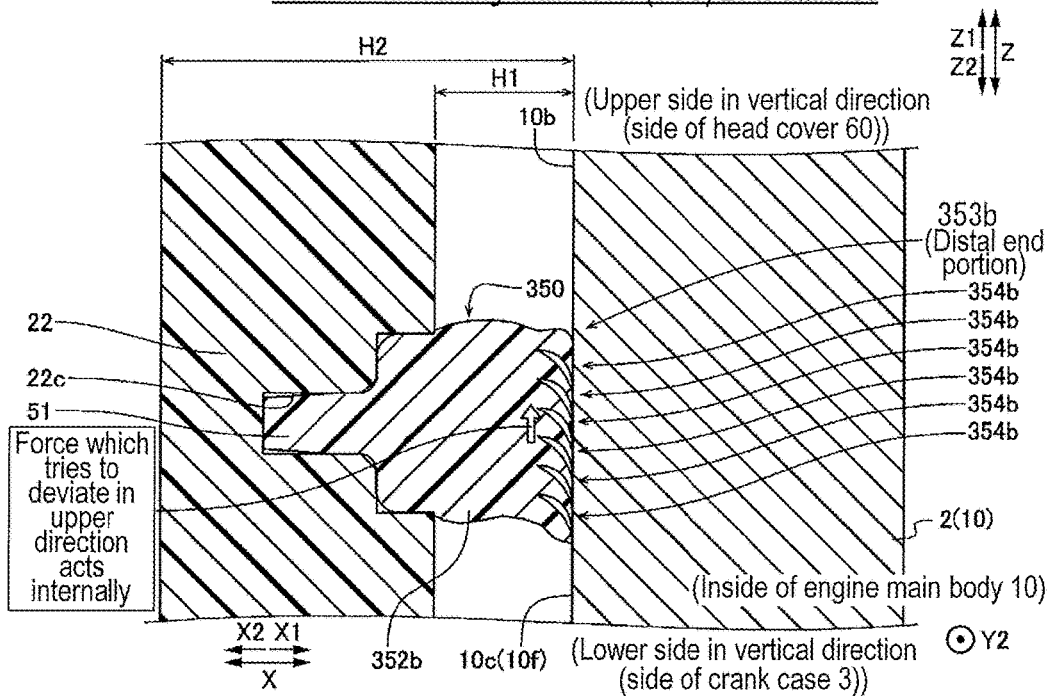
FIG. 31 is an enlarged cross-sectional view illustrating a state in which a timing chain cover is attached to an engine via a seal member according to a third variation of the present invention.

In addition, in a third variation illustrated in FIG. 31, unlike the seal member 50 of the first embodiment, a seal member 350 can be configured in such a manner that plural slits (cuts) 354*b* are formed at a distal end portion 353*b*. That is, a seal portion 352*b* extended in the short-side direction is provided with the distal end portion 353*b* formed with six slits 354*b* each extended obliquely downwardly from the upper side to the lower side in a width direction (the Z direction). Thus, when the distal end portion 353*b* including the six slits 354*b* deforms, the slits 354*b* open and the protrusion-and-recess configuration is formed. Accordingly, the seal portion 352*b* including the distal end portion 353*b* formed with the six pieces of slit 354*b* is pushed and squashed in the X1 direction by the fastening force of the shoulder bolt 90, and thus the seal portion 352*b* is in contact with the seal region 10*f* of the seal surface 10*c* in a state of being deformed into the protrusion-and-recess configuration where the component of the upward direction reaction force of the reaction force received from the seal surface 10*c* of the engine main body 10 is larger than the component of the downward direction reaction force of the reaction force received from the seal surface 10*c*. The downward direction is the direction in which the gravity works and the upward direction is the direction opposite to the direction in which the gravity works. Also the third variation includes the distal end portion 353*b* formed with the six slits 354*b*, and accordingly the seal portion 352*b* where the component of the reaction force towards the upper direction which is received by the seal surface 10*c* is larger than the component of the reaction force towards the lower direction which is received by the seal surface 10*c* can be provided easily. The lower direction corresponds to the direction in which the gravity works.

Figure 32:
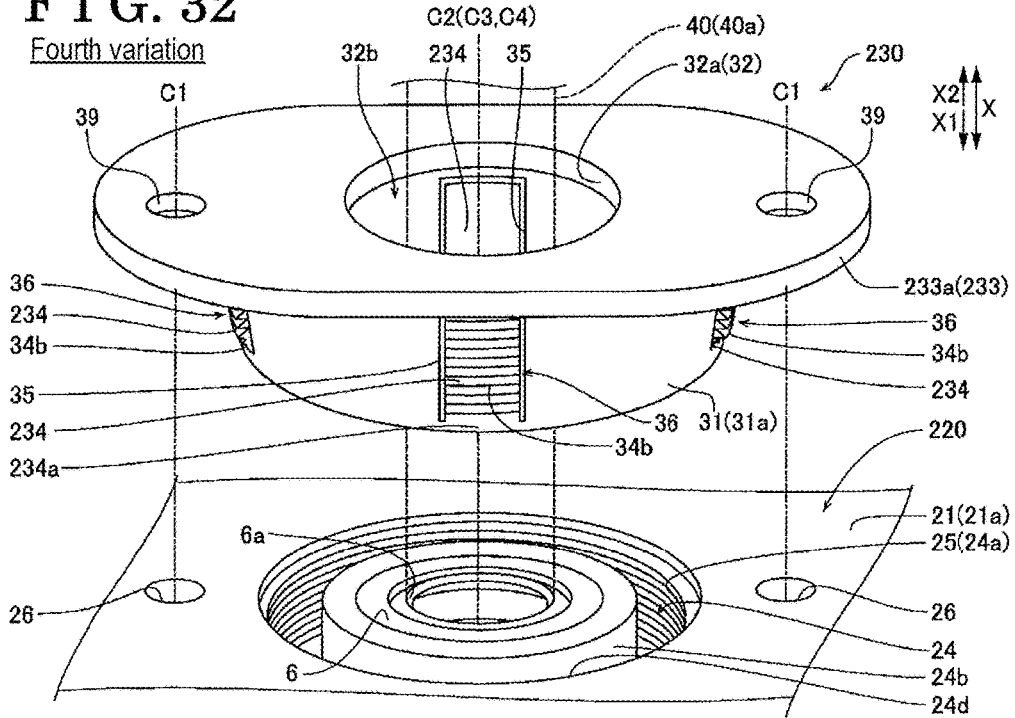
FIG. 32 is an exploded perspective view illustrating a come-off prevention member and a timing chain cover according to a fourth variation of the present invention.

In addition, in a forth variation illustrated in FIG. 32, unlike the aforementioned second embodiment in which the engagement portions 34 of the come-off prevention member 30 extended along the central axis C4, engagement portions 234 of a come-off prevention member 30 can be inclined towards the radially outer side (in the direction away from the central axis C4) from a distal end side to a base side. That is, the come-off prevention member 230 includes the body portion 31, the inner side flange portion 32 and an outer side flange portion 233. An outer edge portion 233*a* of the outer side flange portion 233 is formed in a substantially elliptic shape (a track shape) in a planar view, and is configured in such a manner that a tool including an adjustable wrench, for example, is placed along a long-side direction of the track shape to pinch the outer edge portion 233*a* to rotate.

In addition, the four engagement portions 234 are provided at equal angular intervals of approximately 90 degrees around the central axis C4 (in a circumferential direction). In addition, in a state before the come-off prevention member 230 is attached to the TCC 20, the engagement portions 234 are inclined towards the radially outer side at a predetermined inclination angle towards the X1 side the X2 side. In addition, each engagement portions 234 is configured in such a manner that the base side (the X2 side) is elastically deformable towards the radially inner side and outer side while a distal end portion 234*a* serving as the fulcrum point. In the fourth variation, in a case where the engagement portions 234 are made to engage with the circumferential groove 24, a force towards the radially outer side can be generated to the engagement portions 234, and accordingly the threaded portions 36 of the engagement portions 234 can be engaged with the threaded portion 25 of the circumferential groove 24 more closely.

In addition, in the first and second embodiments, the through holes 26 (226) are provided as the pair, however, the present invention is not limited thereto. In the present invention, one through hole 26 or three or more through holes 26 may be provided. In a case where the three through holes 26 are provided, the through holes 26 can be arranged to surround the oil seal securing portion 23 at intervals of approximately 120 degrees relative to the central axis C1. Alternatively, the plural through holes 26 do not need to be provided at equal angular intervals.

In addition, in the variation of the first embodiment, the example where the flange 7*b* is provided at the X2 side of the collar member 207 which is in contact with the inner surface 21*a* of the TCC 20, while the flange portion is not provided at the X1 side which is in contact with the surface 2*b* of the engine main body 10 is described. However, the present invention is not limited thereto. That is, a flange-shaped portion which is in contact with the surface of the engine main body may be provided at the collar member, while the flange-shaped portion that is in contact with the inner surface of the TCC may not be provided at the collar member.

In addition, in the first and second embodiments, the examples where the oil seal 6 is prevented from falling off from the X1 side by the come-off prevention portion 23*b* of the TCC 20 (220) are described, however, the present invention is not limited thereto. The come-off prevention portion 23*b* does not need to be provided in a case where a change in the internal pressure of the space portion inside the TCC is small.

In addition, the example where the flange portion 98 of the fastening bolt 95 restricts the oil seal 6 from falling off from the X2 side is described in the first embodiment, and the example where the flange portion 381*a* of the flange nut 381 restricts the oil seal 6 from falling off from the X2 side is described in the second embodiment, however, the present invention is not limited thereto. In a case where the change in the internal pressure of the space portion inside the TCC is small, the flange portion of the fastening bolt does not need to project towards the through hole 26, for example.

In addition, in the first and second embodiments, the example where the TCC 20 (220) is formed by the polyamide resin is described, however, the present invention is not limited thereto. In the present embodiment, "the cover member" of the present invention may be made of a resin material other than the polyamide or "the cover member" of the present invention may be made of a metal material, for example.

In addition, in the first and second embodiments, the example case is described to which the TCC 20 (220) covering, from the lateral side, the valve train timing member driven by the timing chain 4 is applied. However, the present embodiment is not limited thereto. The present invention may be applied to a case where a timing belt cover covering a wet type timing belt from the lateral side is attached to the engine main body 10.

In addition, in the first and second embodiments, the example where the TCC 20 (220) is provided with the through hole 22*b* formed in a true circular shape in a planar view is described, however, the present embodiment is not limited thereto. The TCC 20 (220) may be provided with the through hole including a track shape (an elongated circular shape) or an oval shape, of which a long axis is extended in the direction of the arrow A (the arrow B) (refer to FIG. 3) in a planar view.

In addition, in the first and second embodiments, the example is described where the seal portion 52b is provided with the distal end portion 53b including the protrusion-and-recess configuration formed by the saw-tooth portions 54b that are asymmetric relative to the vertical line L5 to the seal surface 10c of the engine main body 10, however, the present embodiment is not limited thereto. That is, as long as the seal portion can be configured to prevent "the deviation", which is the effect of this invention, the distal end portion that is in contact with the seal surface 10c and thus comes to be deformed may include a configuration other than the above-described configurations.

In addition, in the first and second embodiments, the example is described where the seal member 50 (250) is applied when the TCC 20 (220) is made to face, in the horizontal direction, the side end portion 10a of the engine main body 10 extending in the upper and lower direction and is attached thereto. However, the present invention is not limited thereto. For example, even in a case where the head cover is attached to the cylinder head from above, the seal member provided with the seal portion 52b or 352b may be applied to a region of which a seal surface sealing an opening portion includes a portion that is a vertical surface and which is formed in a narrow-width shape extended in the horizontal direction.

In addition, in the second embodiment, the example where the circumferential groove 24 is provided at the TCC 220 and the come-off prevention member 30 engages with the circumferential groove 24 is described, however, the present invention is not limited thereto. For example, a protruding wall portion formed in a circumferential manner and protruding towards an outer side (towards the come-off prevention member 30) may be provided at the TCC 220 instead of the circumferential groove 24, and the four engagement portions 34 (the threaded portions 36) formed at the outer circumferential surface of the body portion 31 of the come-off prevention member 30 may be configured to (threadedly) engage with the threaded portion 25 formed at an inner circumferential surface of the wall portion of the TCC 220. Thus, even in a case where the groove portions including a sufficient depth cannot be provided because a thickness of the main body portion 21 of the TCC 220 is small, the come-off prevention member 30 can be fixed at the TCC 220 reliably due to the protruding wall portion provided at the threaded portion 25.

In addition, in the second embodiment, the example is described where the thread ridges of the threaded portion 25 of the TCC 220 protrude from the inner circumferential surface 24a vertically and the thread ridges of the threaded portions 36 of the come-off prevention member 30 project vertically from the arc-shaped outer circumferential surface 34b, however, the present invention is not limited thereto. In the present invention, both the thread ridge of the threaded portion of the TCC and the thread ridge of the threaded portion of the come-off prevention member may protrude in a state where both are inclined. Thus, in a case of moving in the direction in which the come-off prevention member is detached from the TCC, a force which is attributed to the moving force and makes the engagement portions 34 elastically deformed in the radial direction can be restricted. Accordingly, the come-off prevention member can be more restricted from coming off relative to the TCC 220.

In addition, in the second embodiment, the example is described where the top portions of the thread ridges at the distal end side of the threaded portion 36 of the come-off prevention member 30 are cut off, however, the present invention is not limited thereto. In the present invention, at the come-off prevention member 30, the top portions of the thread ridges at the distal end side of the threaded portion 36 do not need to be cut off. In addition, in the second embodiment, the example is described where the four engagement portions 34 are provided at the body portion 31 of the come-off prevention member 30, however, the present invention is not limited thereto. In the present invention, the engagement portion 34 may be provided at the come-off prevention member 30, at only one position.

In addition, in the second embodiment, the example is described where the base side (the X2 side) of the engagement portion 34 is configured to elastically deform in the radial direction while the distal end portion 34a that is at a side of the TCC 220 serving as the fulcrum point, however, the present invention is not limited thereto. For example, the engagement portion 34 may be configured in such a manner that the distal end side (a side of the TCC) of the engagement portion 34 is elastically deformable in the radial direction while the base side, which is formed at a side opposite to the TCC 220, serving as the fulcrum point. In this case, a connection portion with the body portion needs to be provided at the base side and the notch groove needs to be formed at three sides except for a side opposite to the TCC 220 (that is, at the X1 side and at both sides of the outer circumferential surface 34b in the circumferential direction in FIG. 23).

In addition, in the first and second embodiments, the example is described where the present invention is applied to the engine 100 which is formed by the gasoline engine and is for the automobile, however, the present invention is not limited thereto. That is, the present invention may be applied to the cover member attachment structure of the internal combustion engine including, for example, a diesel engine and a gas engine. In addition, the present invention may be applied to the cover member attachment structure of the internal combustion engine which is mounted to facility equipment other than the automobile as a driving source.

EXPLANATION OF REFERENCE NUMERALS 1 cylinder head
2 cylinder block
3 crank case
4 timing chain
6 oil seal
7, 207 collar member
8 seal member (seal material)
10 engine main body (internal combustion engine main body)
10c seal surface
10e, 10f a seal region
12, 212, 512 positioning recessed portion
15 attachment section
16 screw hole
20, 220 timing chain cover (TCC) (cover member)
22, 222 attachment portion (edge portion)
22b, 222b through hole (second main body attachment portion)
23 oil seal securing portion (recessed portion)
24 circumferential groove (first engagement portion)
24a inner circumferential surface at an outer side
25 threaded portion (first threaded portion)
26, 226 through hole (first main body attachment portion)
30, 230 come-off prevention member (oil seal come-off prevention member)
31 body portion 32 inner side flange portion (oil seal come-off prevention portion)
33a, 233a outer edge portion
34, 234 engagement portion (second engagement portion)
34b outer circumferential surface
35 notch groove
36 threaded portion (second threaded portion)
40 crankshaft
50, 250, 350 seal portion
52a, 52b, 252a, 352b seal portion
53b, 253a, 353b distal end portion
54b, 254a saw-tooth portion
90, 201, 202, 203 shoulder bolt (second fastening member)
95 fastening bolt (first fastening member)
100 engine (internal combustion engine)
308, 408, 508 fastening member (first fastening member)

The invention claimed is:

1. An internal combustion engine comprising:
an oil seal attached to a crankshaft of an internal combustion engine main body; and
a cover member including an oil seal securing portion for securing the oil seal attached to the crankshaft, the cover member including a first main body attachment portion which is arranged at an inner side relative to an edge portion of the cover member, which is provided between the edge portion and the oil seal securing portion, and which is for attaching the cover member to the internal combustion engine main body by a first fastening member, wherein
the oil seal securing portion includes a recessed portion, the oil seal is inserted in the recessed portion and is secured at the recessed portion,
a portion of the first fastening member which is in contact with a surface of the first main body attachment portion which is at a side opposite to the internal combustion engine main body is provided to project to cover at least part of a portion of the recessed portion of the oil seal securing portion into which the oil seal is inserted, and
the oil seal securing portion is integrally formed with a come-off prevention portion in the recessed portion, and the come-off prevention portion has an annular shape, protrudes toward the crankshaft, and covers part of the oil seal.

2. The internal combustion engine according to claim 1, further comprising:
a seal material sealing between the first fastening member and a vicinity of the first main body attachment portion.

3. The internal combustion engine according to claim 1, wherein the first main body attachment portion includes a plurality of first main body attachment portions provided in such a manner that the oil seal securing portion is interposed between the plurality of first main body attachment portions or in such a manner that the oil seal securing portion is surrounded by the plurality of first main body attachment portions.

4. The internal combustion engine according to claim 1, wherein
the cover member further includes a second main body attachment portion which is arranged along the edge portion of the cover member and which is for attaching the cover member to the internal combustion engine main body with a second fastening member, and
the first main body attachment portion is arranged at the inner side relative to the second main body attachment portion arranged at the edge portion of the cover member.

5. The internal combustion engine according to claim 1, wherein
the cover member further includes a second main body attachment portion which is arranged along the edge portion of the cover member and which is for attaching the cover member to the internal combustion engine main body by a second fastening member, and
an inner diameter of the second main body attachment portion of the cover member is set to include a size which generates a clearance between the second main body attachment portion and the second fastening member inserted in the second main body attachment portion, the clearance includes a size which is absorbable a positional deviation of the second main body attachment portion which is caused by at least one of thermal expansion of the cover member and thermal shrinkage of the cover member.

6. The internal combustion engine according to claim 5, wherein the inner diameter of the second main body attachment portion is set to include a size which generates the clearance between the second main body attachment portion and the second fastening member inserted in the second main body attachment portion, the clearance includes a size which is equal to or larger than an amount of the positional deviation of the second main body attachment portion which is caused by at least one of thermal expansion of the cover member and thermal shrinkage of the cover member.

7. The internal combustion engine according to claim 5, wherein
the second main body attachment portion is provided along the edge portion of the cover member, and
the second main body attachment portion is set in such a manner that the clearance becomes larger as a distance from the oil seal to the respective second main body attachment portion increases.

8. The internal combustion engine according to claim 1, further comprising:
a seal member arranged between the internal combustion engine main body and the cover member, and including a seal portion that is in contact with a seal surface of the internal combustion engine main body, wherein
at least part of the seal portion includes a configuration in which a component of an upward direction reaction force of a reaction force received from the seal surface of the internal combustion engine main body is larger than a component of a downward direction reaction force of the reaction force received from the seal surface of the internal combustion engine main body, a downward direction corresponds to a direction in which gravity force works and an upward direction corresponds to a direction which is opposite to the direction in which the gravity force works.

9. The internal combustion engine according to claim 8, wherein
in a case where the seal member is elastically deformed in a state where the cover member is attached to a lateral side of the internal combustion engine main body via the seal member, at least part of the seal portion is configured to deform in such a manner that the part of the seal portion includes the configuration in which the component of the upward direction reaction force received from the seal surface of the internal combustion engine main body is larger than the component of the downward direction reaction force received from the seal surface.

10. The internal combustion engine according to claim 1, wherein the cover member further includes a first engagement portion provided to surround the oil seal securing portion,
- the oil seal come-off prevention member is further provided, the oil seal come-off prevention member includes a second engagement portion engaging with the first engagement portion of the cover member, and an oil seal come-off prevention portion for preventing the oil seal from coming off,
- the first engagement portion of the cover member includes a first threaded portion, and
- the second engagement portion of the oil seal come-off prevention member includes a second threaded portion which threadedly engages with the first threaded portion, the second engagement portion is configured to be elastically deformable in a radial direction.

11. The internal combustion engine according to claim 10, wherein a rotational direction when the second threaded portion of the oil seal come-off prevention member is detached relative to the first threaded portion is configured to be a direction which is opposite to a rotational direction of a rotational shaft to which the oil seal is attached.

12. The internal combustion engine according to claim 1, wherein the cover member is made of resin.

13. A cover member attachment structure for an internal combustion engine, the cover member attachment structure comprising:
- a cover member including an oil seal securing portion for securing an oil seal attached to a crankshaft of an internal combustion engine, the cover member including a first main body attachment portion which is arranged at an inner side relative to an edge portion of the cover member, which is provided between the edge portion and the oil seal securing portion, and which is for attaching the cover member to an internal combustion engine main body by a first fastening member, wherein
- the oil seal securing portion includes a recessed portion, the oil seal is inserted in the recessed portion and is secured at the recessed portion,
- a portion of the first fastening member which is in contact with a surface of the first main body attachment portion which is at a side opposite to the internal combustion engine main body is provided to project to cover at least part of a portion of the recessed portion of the oil seal securing portion into which the oil seal is inserted, and
- the oil seal securing portion is integrally formed with a come-off prevention portion in the recessed portion, and the come-off prevention portion has an annular shape, protrudes toward the crankshaft, and covers part of the oil seal.

14. The internal combustion engine according to claim 1, wherein, along the crankshaft, the oil seal is sandwiched between the portion of the first fastening member which is in contact with the surface of the first main body attachment portion which is at the side opposite to the internal combustion engine main body and the come-off prevention portion of the oil seal securing portion.

15. The cover member attachment structure according to claim 13, wherein, along the crankshaft, the oil seal is sandwiched between the portion of the first fastening member which is in contact with the surface of the first main body attachment portion which is at the side opposite to the internal combustion engine main body and the come-off prevention portion of the oil seal securing portion.

16. The internal combustion engine according to claim 1, wherein the seal member is sandwiched between the cover member and the internal combustion engine main body such that the cover member is secured in a state where the edge portion of the cover member rises from the internal combustion engine main body with a clearance distance.

17. The cover member attachment structure according to claim 13, wherein the seal member is sandwiched between the cover member and the internal combustion engine main body such that the cover member is secured in a state where the edge portion of the cover member rises from the internal combustion engine main body with a clearance distance.

* * * * *